(12) United States Patent
Oh et al.

(10) Patent No.: US 12,177,410 B2
(45) Date of Patent: Dec. 24, 2024

(54) METHOD FOR TRANSMITTING 360 VIDEO, METHOD FOR RECEIVING 360 VIDEO, 360 VIDEO TRANSMITTING DEVICE, AND 360 VIDEO RECEIVING DEVICE

(71) Applicant: LG Electronics Inc., Seoul (KR)

(72) Inventors: Hyunmook Oh, Seoul (KR); Sejin Oh, Seoul (KR); Eunseok Ryu, Seoul (KR); Jongbeom Jeong, Seoul (KR); Dongmin Jang, Seoul (KR); Soonbin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 86 days.

(21) Appl. No.: 17/610,614

(22) PCT Filed: Mar. 23, 2020

(86) PCT No.: PCT/KR2020/003942
§ 371 (c)(1),
(2) Date: Nov. 11, 2021

(87) PCT Pub. No.: WO2020/242027
PCT Pub. Date: Dec. 3, 2020

(65) Prior Publication Data
US 2022/0217314 A1      Jul. 7, 2022

(30) Foreign Application Priority Data
May 24, 2019   (KR) ......................... 10-2019-0061488

(51) Int. Cl.
*H04N 13/161*      (2018.01)
*G06T 19/00*       (2011.01)
(Continued)

(52) U.S. Cl.
CPC ......... *H04N 13/117* (2018.05); *G06T 19/006* (2013.01); *H04N 13/161* (2018.05); *H04N 13/178* (2018.05); *H04N 13/194* (2018.05)

(58) Field of Classification Search
None
See application file for complete search history.

(56) References Cited

U.S. PATENT DOCUMENTS

| 10,027,888 | B1 * | 7/2018 | Mackraz | G06V 10/25 |
| 2014/0168362 | A1 * | 6/2014 | Hannuksela | H04N 13/161 |
| | | | | 348/43 |

(Continued)

FOREIGN PATENT DOCUMENTS

| KR | 20180082312 | 7/2018 |
| KR | 20190021229 | 3/2019 |

(Continued)

OTHER PUBLICATIONS

WO-2017204491-A1, Oh et al, Transmiting / Receiving 360 degree video, Nov. 2017 (Year: 2017).*

(Continued)

*Primary Examiner* — Steven Z Elbinger
(74) *Attorney, Agent, or Firm* — Fish & Richardson P.C.

(57) ABSTRACT

A method for transmitting video, according to embodiments, comprises: a pre-processing step of processing video data; a step of encoding the video data; and/or a step of transmitting a bitstream including the video data. A method for receiving video, according to embodiments, comprises the steps of: receiving video data; decoding the video data; and/or rendering the video data.

8 Claims, 31 Drawing Sheets

(51) Int. Cl.
*H04N 13/117* (2018.01)
*H04N 13/178* (2018.01)
*H04N 13/194* (2018.01)

(56) References Cited

U.S. PATENT DOCUMENTS

| | | | | |
|---|---|---|---|---|
| 2014/0245367 | A1* | 8/2014 | Sasaki | H04N 21/2343 |
| | | | | 725/109 |
| 2019/0068946 | A1* | 2/2019 | Stockhammer | H04N 21/816 |
| 2019/0356898 | A1* | 11/2019 | Choi | H04N 13/178 |
| 2020/0143516 | A1* | 5/2020 | Martin | G06T 3/4092 |

FOREIGN PATENT DOCUMENTS

| | | |
|---|---|---|
| WO | WO2019008221 | 1/2019 |
| WO | WO2019013384 | 1/2019 |

OTHER PUBLICATIONS

International Search Report and Written Opinion in International Appln. No. PCT/KR2020/003942, dated Jul. 8, 2020, 18 pages (with English translation).

\* cited by examiner

FIG. 7
(a) 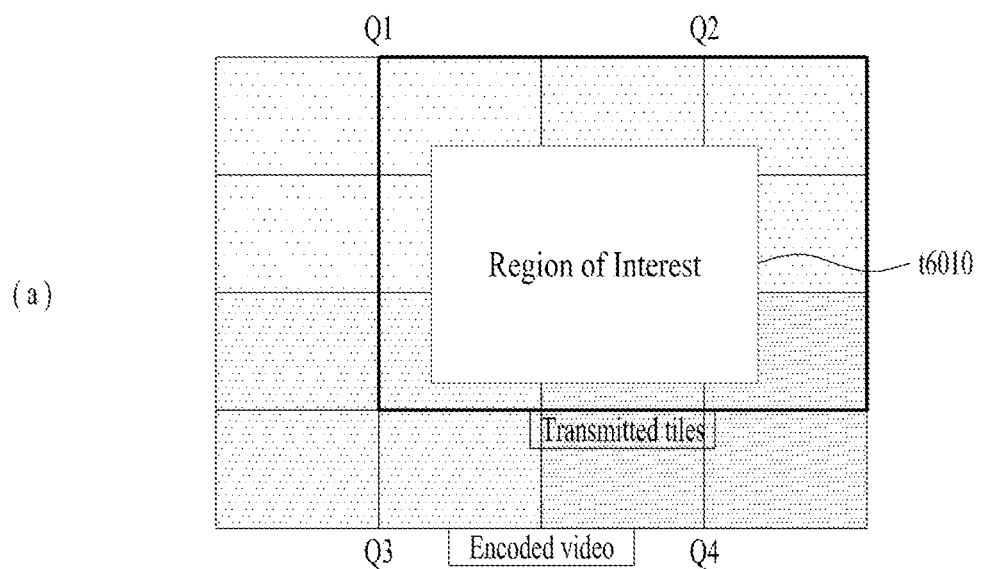
(b) 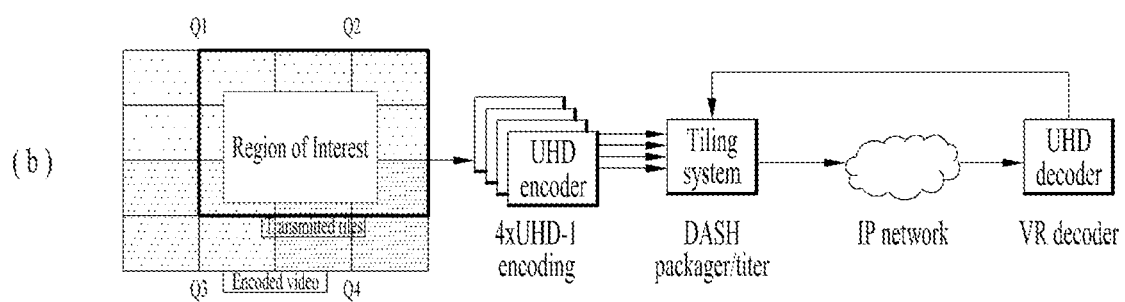

FIG. 8

```
.....
        <Default metadata>
unsigned    int(8)      vr_geometry;
unsigned    int(8)      projection_schme;
        <Stereoscopic related metadata>
unsigned    int(1)      is_stereoscopic;
unsigned    int(3)      stereo_mode;
        <Initial View related metadata>
signed      int(8)      initial_view_yaw_degree;
signed      int(8)      initial_view_pitch_degree;
signed      int(8)      initial_view_roll_degree;
        < ROI related metadata>
unsigned int(1)         2d_roi_range_flag;
unsigned int(1)         3d_roi_range_flag;
if (2d_roi_region_flag ==1) {
   unsigned int(16) min_top_left_x;
   unsigned int(16) max_top_left_x;
   unsigned int(16) min_top_left_y;
   unsigned int(16) max_top_left_y;
   unsigned int(16) min_width;
   unsigned int(16) max_width;
   unsigned int(16) min_height;
   unsigned int(16) max_height;
   unsigned int(16) min_x;
   unsigned int(16) max_x;
   unsigned int(16) min_y;
   unsigned int(16) max_y;
}
if (3d_roi_region_flag ==1) {
   unsigned int(16) min_yaw;
   unsigned int(16) max_yaw;
   unsigned int(16) min_pitch;
   unsigned int(16) max_pitch;
   unsigned int(16) min_roll;
   unsigned int(16) max_roll;
   unsigned int(16) min_field_of_view;
   unsigned int(16) max_field_of_view;
}
        <Field Of View related metadata>
unsigned int(1)         content_fov_flag;
if (content_fov_flag == 1)  {
   unsigned int(16)     content_fov;
}
        <Cropped Region related metadata>
unsigned int(1)         is_cropped_region;
if(is_cropped_region == 1)  {
   unsigned int(16)     cr_region_left_top_x;
   unsigned int(16)     cr_region_left_top_y;
   unsigned int(16)     cr_region_width;
   unsigned int(16)     cr_region_height;
}
.....
```

(a)          (b)          (c)

FIG. 25
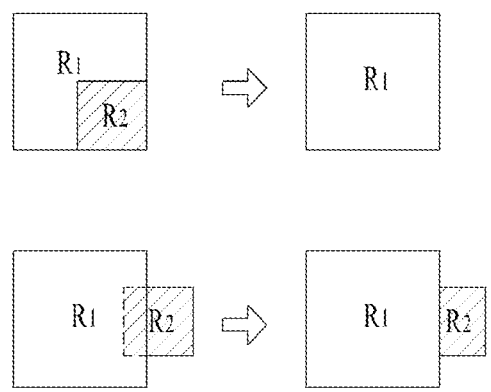
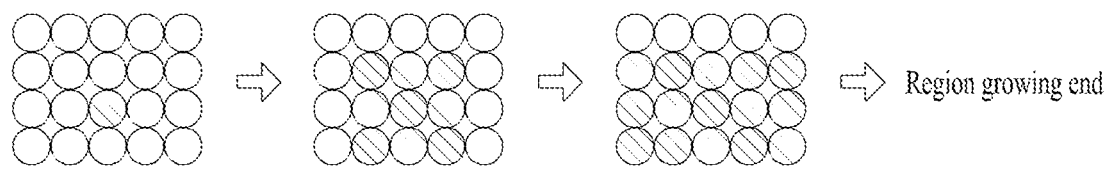

FIG. 27
No refinement
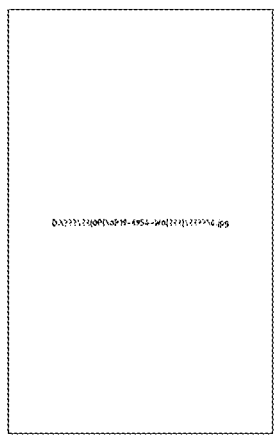
With refinement
All frames
| Class | QP | Bitrate (Mbps) | |
|---|---|---|---|
| | | No refinement | With refinement |
| A | 20 | 11.5 | 7.2 |
| | 25 | 8.5 | 5.0 |
| | 28 | 6.3 | 3.5 |
| | 32 | 4.2 | 2.1 |
| B | 14 | 13.3 | 9.8 |
| | 20 | 10.7 | 7.6 |
| | 26 | 8.0 | 5.6 |
| | 29 | 6.0 | 4.2 |

METHOD FOR TRANSMITTING 360 VIDEO, METHOD FOR RECEIVING 360 VIDEO, 360 VIDEO TRANSMITTING DEVICE, AND 360 VIDEO RECEIVING DEVICE

CROSS-REFERENCE TO RELATED APPLICATIONS

This application is a National Stage application under 35 U.S.C. § 371 of International Application No. PCT/KR2020/003942, filed on Mar. 23, 2020, which claims the benefit of Korean Application No. 10-2019-0061488, filed on May 24, 2019. The disclosures of the prior applications are incorporated by reference in their entirety.

TECHNICAL FIELD

Embodiments relate to a method for transmitting a 360 video, a method for receiving a 360 video, a device for transmitting a 360 video, and a device for receiving a 360 video.

BACKGROUND ART

A virtual reality (VR) system provides a user with a sense of being in an electronically projected environment. The system for providing VR may be further improved to provide higher quality images and stereophonic sound. A VR system may allow a user to interactively consume VR content.

DISCLOSURE

Technical Problem

The VR system needs to be improved in order to more efficiently provide a VR environment to users. To this end, data transmission efficiency for transmitting a large amount of data such as VR content, robustness between transmission and reception networks, network flexibility in consideration of mobile reception devices, and methods for efficient playback and signaling need to be proposed.

In addition, since general TTML (Timed Text Markup Language)-based subtitles or bitmap-based subtitles are not produced in consideration of 360 video, subtitle-related features and subtitle-related signaling information need to be further extended to be suitable for a use case of VR service in order to provide subtitles suitable for 360 video.

Technical Solution

In accordance with the object of the present disclosure, provided herein are a method for transmitting a 360 video, a method for receiving a 360 video, a device for transmitting a 360 video, and a device for receiving a 360 video.

A video transmission method according to embodiments of the present disclosure may include:
pre-processing video data; encoding the pre-processed video data; and/or transmitting the encoded video data.

A video reception method according to embodiments of the present disclosure may include: receiving video data, decoding video data; and/or rendering video data.

Advantageous Effects

According to embodiments, 360 content may be efficiently transmitted in an environment supporting next-generation hybrid broadcasting that employs a terrestrial broadcasting network and an Internet network.

Embodiments may provide a method for providing an interactive experience for a user's consumption of 360 content.

Embodiments may provide a signaling method to accurately reflect the intention of the 360 content producer in the user's consumption of 360 content.

Embodiments may provide a method for efficiently increasing a transmission capacity and ensuring delivery of necessary information in delivering 360 content.

DESCRIPTION OF DRAWINGS

FIG. 7 illustrates tiles according to an embodiment of the present disclosure.

FIG. 8 illustrates 360-degree video related metadata according to an embodiment of the present disclosure.

FIG. 25 illustrates an example of a method for removing a region overlapping with region growing according to embodiments.

FIG. 27 illustrates an example of a depth map according to embodiments.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

Figure 1:
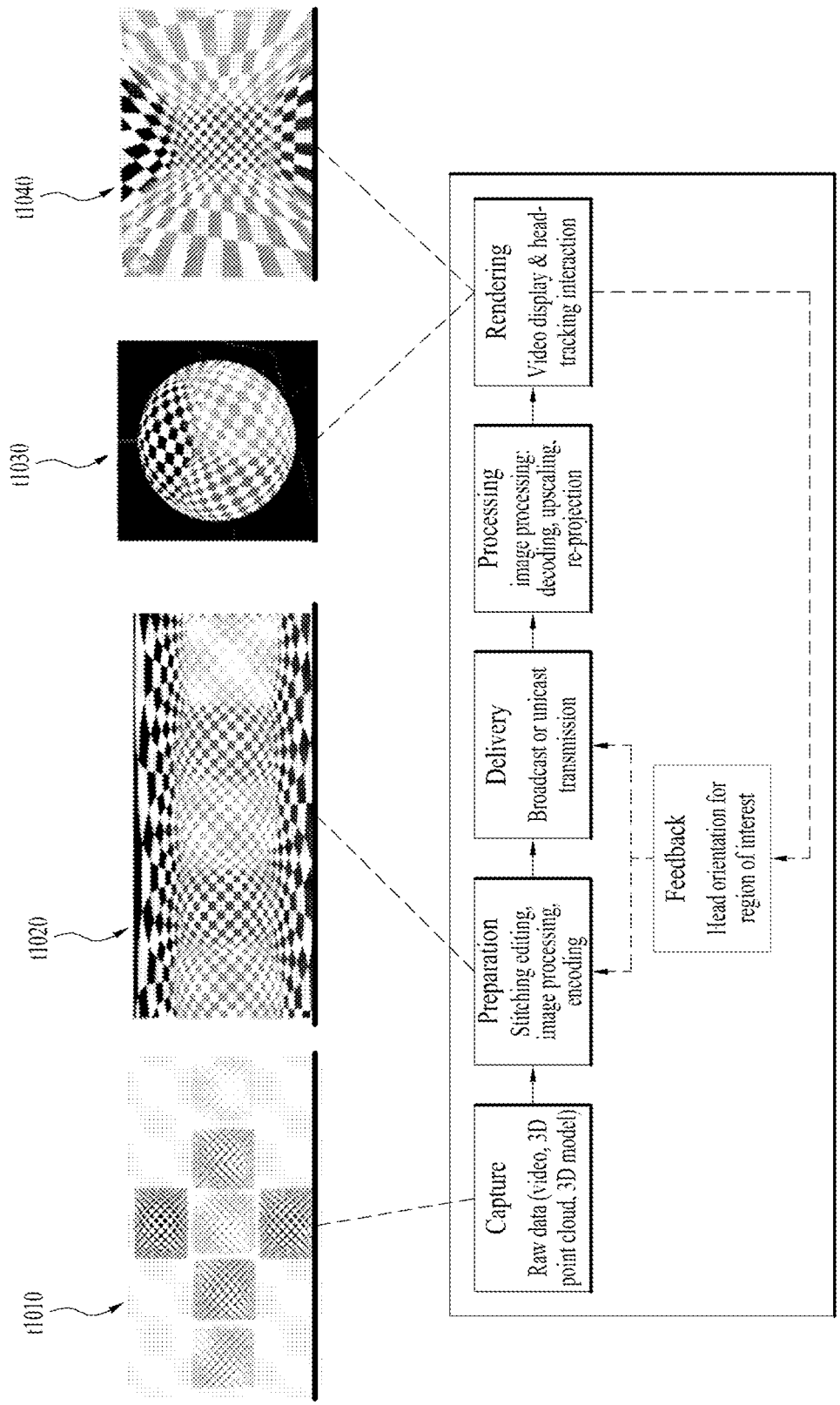
FIG. 1 illustrates an architecture for providing 360 video according to the present disclosure.

FIG. 1 illustrates an architecture for providing 360-degree video according to the present disclosure.

The present disclosure provides a method for providing 360-degree content to provide virtual reality (VR) to users. VR refers to a technique or an environment for replicating an actual or virtual environment. VR artificially provides sensuous experiences to users, and users can experience electronically projected environments.

360-degree content refers to convent for realizing and providing VR and may include 360-degree video and/or 360-degree audio. 360-degree video may refer to video or image content which is necessary to provide VR and is captured or reproduced in all directions (360 degrees). 360-degree video can refer to video or image represented on 3D spaces in various forms according to 3D models. For example, 360-degree video can be represented on a spherical plane. 360-degree audio is audio content for providing VR and can refer to spatial audio content which can be recognized as content having an audio generation source located in a specific space. 360-degree content can be generated, processed and transmitted to users, and users can consume VR experiences using the 360-degree content. 360-degree content/video/image/audio may be referred to as 360 content/video/image/audio, omitting the term "degree" representing a unit, or as VR content/video/image/audio.

The present disclosure proposes a method for effectively providing 360 video. To provide 360 video, first, 360 video can be captured using one or more cameras. The captured 360 video is transmitted through a series of processes, and a reception side can process received data into the original 360 video and render the 360 video. Thus, the 360 video can be provided to a user.

Specifically, a procedure for providing 360 video may include a capture process, a preparation process, a transmission process, a processing process, a rendering process and/or a feedback process.

The capture process may refer to a process of capturing images or videos for a plurality of views through one or more cameras. The shown image/video data t1010 can be generated through the capture process. Each plane of the shown image/video data t1010 can refer to an image/video for each view. The captured images/videos may be called raw data. In the capture process, metadata related to capture can be generated.

For the capture process, a special camera for VR may be used. When 360 video with respect to a virtual space generated using a computer is provided in an embodiment, capture using a camera may not be performed. In this case, the capture process may be replaced by a process of simply generating related data.

The preparation process may be a process of processing the captured images/videos and metadata generated in the capture process. The captured images/videos may be subjected to stitching, projection, region-wise packing and/or encoding in the preparation process.

First, each image/video may pass through a stitching process. The stitching process may be a process of connecting captured images/videos to create a single panorama image/video or a spherical image/video.

Then, the stitched images/videos may pass through a projection process. In the projection process, the stitched images/videos can be projected on a 2D image. This 2D image may be called a 2D image frame. Projection on a 2D image may be represented as mapping to the 2D image. The projected image/video data can have a form of a 2D image t1020 as shown in the figure.

The video data projected on the 2D image can pass through a region-wise packing process in order to increase video coding efficiency. Region-wise packing may refer to a process of dividing video data projected on a 2D image into regions and processing the regions. Here, regions may refer to regions obtained by dividing a 2D image on which 360 video data is projected. Such regions can be obtained by dividing the 2D image equally or arbitrarily according to an embodiment. Regions may be divided according to a projection scheme according to an embodiment. The region-wise packing process is an optional process and thus may be omitted from the preparation process.

According to an embodiment, this process may include a process of rotating the regions or rearranging the regions on the 2D image in order to increase video coding efficiency. For example, the regions can be rotated such that specific sides of regions are positioned in proximity to each other to increase coding efficiency.

According to an embodiment, the this process may include a process of increasing or decreasing the resolution of a specific region in order to differentiate the resolution for regions of the 360 video. For example, the resolution of regions corresponding to a relatively important part of the 360 video can be increased to higher than other regions. The video data projected on the 2D image or the region-wise packed video data can pass through an encoding process using a video codec.

According to an embodiment, the preparation process may additionally include an editing process. In this editing process, the image/video data before or after projection may be edited. In the preparation process, metadata with respect to stitching/projection/encoding/editing may be generated. In addition, metadata with respect to the initial view or region of interest (ROI) of the video data projected on the 2D image may be generated.

The transmission process may be a process of processing and transmitting the image/video data and metadata which have pass through the preparation process. For transmission, processing according to any transmission protocol may be performed. The data that has been processed for transmission can be delivered over a broadcast network and/or broadband. The data may be delivered to the reception side in an on-demand manner. The reception side can receive the data through various paths.

The processing process may refer to a process of decoding the received data and re-projecting the projected image/video data on a 3D model. In this process, the image/video data projected on the 2D image can be re-projected on a 3D space. This process may be called mapping projection. Here, the 3D space on which the data is mapped may have a form depending on a 3D model. For example, 3D models may include a sphere, a cube, a cylinder and a pyramid.

According to an embodiment, the processing process may further include an editing process, an up-scaling process, etc. In the editing process, the image/video data before or after re-projection can be edited. When the image/video data has been reduced, the size of the image/video data can be increased through up-scaling of samples in the up-scaling process. As necessary, the size may be decreased through down-scaling.

The rendering process may refer to a process of rendering and displaying the image/video data re-projected on the 3D space. Re-projection and rendering may be collectively represented as rendering on a 3D mode. The image/video re-projected (or rendered) on the 3D model may have a form t1030 as shown in the figure. The form t1030 corresponds to a case in which the image/video data is re-projected on a spherical 3D model. A user can view a region of the rendered image/video through a VR display or the like. Here, the region viewed by the user may take a form t1040 shown in the figure.

The feedback process may refer to a process of delivering various types of feedback information which can be acquired in the display process to a transmission side. Through the feedback process, interactivity in 360 video consumption can be provided. According to an embodiment, head orientation information, viewport information indicating a region currently viewed by a user, and the like may be delivered to the transmission side in the feedback process. According to an embodiment, a user can interact with content realized in a VR environment. In this case, information related to the interaction may be delivered to the transmission side or a service provider during the feedback process. According to an embodiment, the feedback process may not be performed.

The head orientation information may refer to information about the location, angle and motion of a user's head. On the basis of this information, information about a region of 360 video currently viewed by the user, that is, viewport information can be calculated.

The viewport information may be information about a region of 360 video currently viewed by a user. Gaze analysis may be performed using the viewport information to check a manner in which the user consumes 360 video, a region of the 360 video at which the user gazes, and how long the user gazes at the region. Gaze analysis may be performed by the reception side and the analysis result may be delivered to the transmission side through a feedback channel. a device such as a VR display can extract a viewport region on the basis of the location/direction of a user's head, vertical or horizontal FOV supported by the device.

According to an embodiment, the aforementioned feedback information may be consumed at the reception side as well as being delivered to the transmission side. That is, decoding, re-projection and rendering processes of the reception side can be performed using the aforementioned feedback information. For example, only 360 video for the region currently viewed by the user can be preferentially decoded and rendered using the head orientation information and/or the viewport information.

Here, a viewport or a viewport region can refer to a region of 360 video currently viewed by a user. A viewpoint is a point in 360 video which is viewed by the user and can refer to a center point of a viewport region. That is, a viewport is a region based on a view, and the size and form of the region can be determined by the field of view (FOV), which will be described below.

In the above-described architecture for providing 360 video, image/video data which is subjected to a series of capture/projection/encoding/transmission/decoding/re-projection/rendering processes can be called 360 video data. The term "360 video data" may be used as the concept including metadata or signaling information related to such image/video data.

Figure 2:
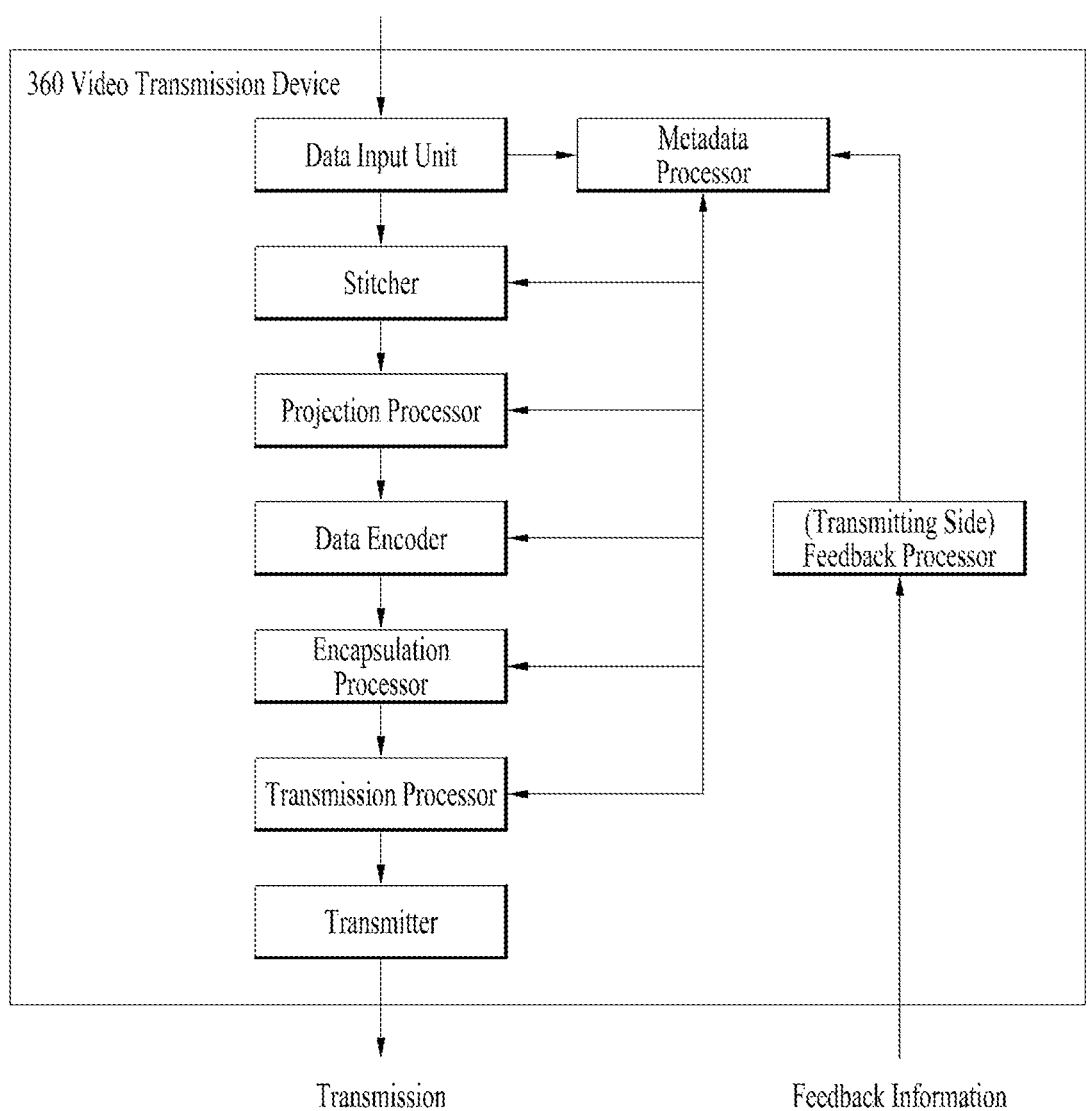
FIG. 2 illustrates a 360-degree video transmission device according to one aspect of the present disclosure.

FIG. 2 illustrates a 360-degree video transmission device according to one aspect of the present disclosure.

According to one aspect, the present disclosure may relate to a 360 video transmission device. The 360 video transmission device according to the present disclosure may perform operations related to the above-described preparation process to the transmission process. The 360 video transmission device according to the present disclosure may include a data input unit, a stitcher, a projection processor, a region-wise packing processor (not shown), a metadata processor, a transmitter feedback processor, a data encoder, an encapsulation processor, a transmission processor and/or a transmitter as internal/external elements.

The data input unit may receive captured images/videos for respective views. The images/videos for the views may be images/videos captured by one or more cameras. In addition, the data input unit may receive metadata generated in a capture process. The data input unit may deliver the received images/videos for the views to the stitcher and deliver the metadata generated in the capture process to a signaling processor.

The stitcher may stitch the captured images/videos for the views. The stitcher may deliver the stitched 360 video data to the projection processor. The stitcher may receive necessary metadata from the metadata processor and use the metadata for stitching operation. The stitcher may deliver the metadata generated in the stitching process to the metadata processor. The metadata in the stitching process may include information indicating whether stitching has been performed, a stitching type, etc.

The projection processor may project the stitched 360 video data on a 2D image. The projection processor may perform projection according to various schemes which will be described below. The projection processor may perform mapping in consideration of the depth of 360 video data for each view. The projection processor may receive metadata necessary for projection from the metadata processor and use the metadata for the projection operation as necessary. The projection processor may deliver metadata generated in a projection process to the metadata processor. The metadata of the projection process may include a projection scheme type.

The region-wise packing processor (not shown) may perform the aforementioned region-wise packing process. That is, the region-wise packing processor may perform a process of dividing the projected 360 video data into regions, rotating or rearranging the regions or changing the resolution of each region. As described above, the region-wise packing process is an optional process, and when region-wise packing is not performed, the region-wise packing processor may be omitted. The region-wise packing processor may receive metadata necessary for region-wise packing from the metadata processor and use the metadata for the region-wise packing operation as necessary. The metadata of the region-wise packing processor may include a degree to which each region is rotated, the size of each region, etc.

The aforementioned stitcher, the projection processor and/or the region-wise packing processor may be realized by one hardware component according to an embodiment.

The metadata processor may process metadata which may be generated in the capture process, the stitching process, the projection process, the region-wise packing process, the encoding process, the encapsulation process and/or the processing process for transmission. The metadata processor may generate 360 video related metadata using such metadata. According to an embodiment, the metadata processor may generate the 360 video related metadata in the form of a signaling table. The 360 video related metadata may be called metadata or 360 video related signaling information according to signaling context. Furthermore, the metadata processor may deliver acquired or generated metadata to internal elements of the 360 video transmission device as necessary. The metadata processor may deliver the 360 video related metadata to the data encoder, the encapsulation processor and/or the transmission processor such that the metadata may be transmitted to the reception side.

The data encoder may encode the 360 video data projected on the 2D image and/or the region-wise packed 360 video data. The 360 video data may be encoded in various formats.

The encapsulation processor may encapsulate the encoded 360 video data and/or 360 video related metadata into a file. Here, the 360 video related metadata may be delivered from the metadata processor. The encapsulation processor may encapsulate the data in a file format such as ISOBMFF, CFF or the like or process the data into a DASH segment. The encapsulation processor may include the 360 video related metadata in a file format according to an embodiment. For example, the 360 video related metadata may be included in boxes of various levels in an ISOBMFF file format or included as data in an additional track in a file. According to an embodiment, the encapsulation processor may encapsulate the 360 video related metadata into a file.

The transmission processor may perform processing for transmission on the 360 video data encapsulated in a file format. The transmission processor may process the 360 video data according to an arbitrary transmission protocol. The processing for transmission may include processing for delivery through a broadcast network and processing for delivery over a broadband. According to an embodiment, the transmission processor may receive 360 video related metadata from the metadata processor in addition to the 360 video data and perform processing for transmission on the 360 video related metadata.

The transmitter may transmit the processed 360 video data and/or the 360 video related metadata over a broadcast network and/or broadband. The transmitter may include an element for transmission over a broadcast network and an element for transmission over a broadband.

According to an embodiment of the 360 video transmission device according to the present disclosure, the 360 video transmission device may further include a data storage unit (not shown) as an internal/external element. The data storage unit may store the encoded 360 video data and/or 360 video related metadata before delivery thereof. Such data may be stored in a file format such as ISOBMFF. When 360 video is transmitted in real time, the data storage unit may not be used. However, 360 video is delivered on demand, in non-real time or over a broadband, encapsulated 360 data may be stored in the data storage unit for a predetermined period and then transmitted.

According to another embodiment of the 360 video transmission device according to the present disclosure, the 360 video transmission device may further include a transmitter feedback processor and/or a network interface (not shown) as internal/external elements. The network interface may receive feedback information from a 360 video reception device according to the present disclosure and deliver the feedback information to the transmitter feedback processor. The transmitter feedback processor may deliver the feedback information to the stitcher, the projection processor, the region-wise packing processor, the data encoder, the encapsulation processor, the metadata processor and/or the transmission processor. The feedback information may be delivered to the metadata processor and then delivered to each internal element according to an embodiment. Upon reception of the feedback information, internal elements may reflect the feedback information in processing of 360 video data.

According to another embodiment of the 360 video transmission device according to the present disclosure, the region-wise packing processor may rotate regions and map the regions on a 2D image. Here, the regions may be rotated in different directions at different angles and mapped on the 2D image. The regions may be rotated in consideration of neighboring parts and stitched parts of the 360 video data on the spherical plane before projection. Information about rotation of the regions, that is, rotation directions and angles may be signaled using 360 video related metadata. According to another embodiment of the 360 video transmission device according to the present disclosure, the data encoder may perform encoding differently on respective regions. The data encoder may encode a specific region with high quality and encode other regions with low quality. The feedback processor at the transmission side may deliver the feedback information received from a 360 video reception device to the data encoder such that the data encoder may use encoding methods differentiated for regions. For example, the transmitter feedback processor may deliver viewport information received from a reception side to the data encoder. The data encoder may encode regions including a region indicated by the viewport information with higher quality (UHD) than other regions.

According to another embodiment of the 360 video transmission device according to the present disclosure, the transmission processor may perform processing for transmission differently on respective regions. The transmission processor may apply different transmission parameters (modulation orders, code rates, etc.) to regions such that data delivered to the regions have different robustnesses.

Here, the transmitter feedback processor may deliver the feedback information received from the 360 video reception device to the transmission processor such that the transmission processor may perform transmission processing differentiated for respective regions. For example, the transmitter feedback processor may deliver viewport information received from the reception side to the transmission processor. The transmission processor may perform transmission processing on regions including a region indicated by the viewport information such that the regions have higher robustness than other regions.

The internal/external elements of the 360 video transmission device according to the present disclosure may be hardware elements realized by hardware. According to an embodiment, the internal/external elements may be modified, omitted, replaced by other elements or integrated with other elements. According to an embodiment, additional elements may be added to the 360 video transmission device.

Figure 3:
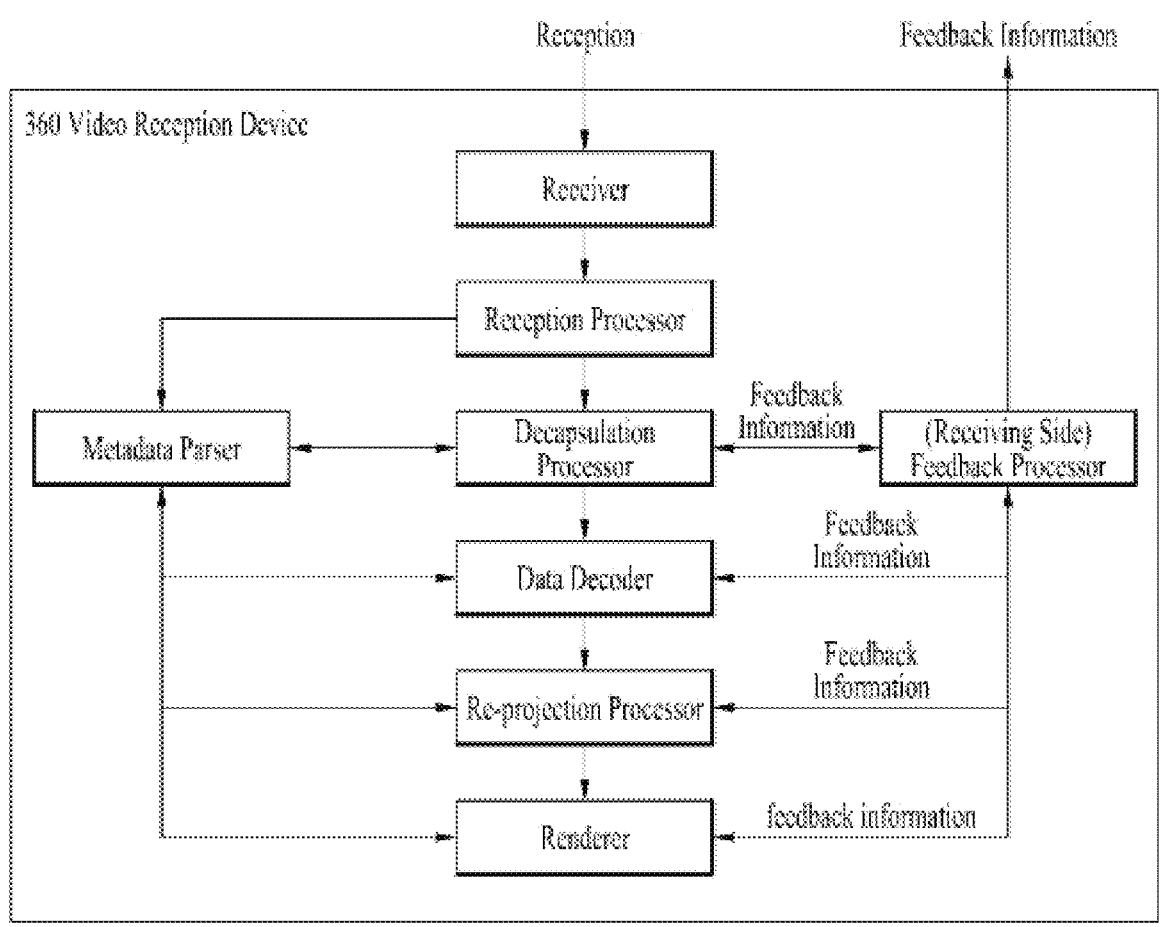
FIG. 3 illustrates a 360-degree video reception device according to another aspect of the present disclosure.

FIG. 3 illustrates a 360-degree video reception device according to another aspect of the present disclosure.

According to another aspect, the present disclosure may relate to a 360 video reception device. The 360 video reception device according to the present disclosure may perform operations related to the above-described processing process and/or the rendering process. The 360 video reception device according to the present disclosure may include a receiver, a reception processor, a decapsulation processor, a data decoder, a metadata parser, a receiver feedback processor, a re-projection processor and/or a renderer as internal/external elements.

The receiver may receive 360 video data transmitted from the 360 video transmission device according to the present disclosure. The receiver may receive the 360 video data through a broadcast network or a broadband according to a transmission channel.

The reception processor may perform processing according to a transmission protocol on the received 360 video data. The reception processor may perform a reverse of the process of the transmission processor. The reception processor may deliver the acquired 360 video data to the decapsulation processor and deliver acquired 360 video related metadata to the metadata parser. The 360 video related metadata acquired by the reception processor may have a form of a signaling table.

The decapsulation processor may decapsulate the 360 video data in a file format received from the reception processor. The decapsulation processor may decapsulate files in ISOBMFF to acquire 360 video data and 360 video related metadata. The acquired 360 video data may be delivered to the data decoder and the acquired 360 video related metadata may be delivered to the metadata parser. The 360 video related metadata acquired by the decapsulation processor may have a form of box or track in a file format. The decapsulation processor may receive metadata necessary for decapsulation from the metadata parser as necessary.

The data decoder may decode the 360 video data. The data decoder may receive metadata necessary for decoding from the metadata parser. The 360 video related metadata acquired in the data decoding process may be delivered to the metadata parser.

The metadata parser may parse/decode the 360 video related metadata. The metadata parser may deliver the acquired metadata to the data decapsulation processor, the data decoder, the re-projection processor and/or the renderer.

The re-projection processor may re-project the decoded 360 video data. The re-projection processor may re-project the 360 video data on a 3D space. The 3D space may have different forms according to used 3D modes. The re-projection processor may receive metadata necessary for re-projection from the metadata parser. For example, the re-projection processor may receive information about the type of a used 3D model and detailed information thereof from the metadata parser. According to an embodiment, the re-projection processor may re-project only 360 video data corresponding to a specific region on the 3D space on the 3D space using the metadata necessary for re-projection.

The renderer may render the re-projected 360 video data. This may be represented as rendering of the 360 video data on a 3D space as described above. When two processes are simultaneously performed in this manner, the re-projection processor and the renderer may be integrated to perform both the processes in the renderer. According to an embodiment, the renderer may render only a region viewed by a user according to view information of the user.

A user may view part of the rendered 360 video through a VR display. The VR display is a device for reproducing 360 video and may be included in the 360 video reception device (tethered) or connected to the 360 video reception device as a separate device (un-tethered).

According to an embodiment of the 360 video reception device according to the present disclosure, the 360 video reception device may further include a (receiver) feedback processor and/or a network interface (not shown) as internal/external elements. The receiver feedback processor may acquire feedback information from the renderer, the re-projection processor, the data decoder, the decapsulation processor and/or the VR display and process the feedback information. The feedback information may include viewport information, head orientation information, gaze information, etc. The network interface may receive the feedback information from the receiver feedback processor and transmit the same to the 360 video transmission device.

As described above, the feedback information may be used by the reception side in addition to being delivered to the transmission side. The receiver feedback processor may deliver the acquired feedback information to internal elements of the 360 video reception device such that the feedback information is reflected in a rendering process. The receiver feedback processor may deliver the feedback information to the renderer, the re-projection processor, the data decoder and/or the decapsulation processor. For example, the renderer may preferentially render a region viewed by a user using the feedback information. In addition, the decapsulation processor and the data decoder may preferentially decapsulate and decode a region viewed by the user or a region to be viewed by the user.

The internal/external elements of the 360 video reception device according to the present disclosure may be hardware elements realized by hardware. According to an embodiment, the internal/external elements may be modified, omitted, replaced by other elements or integrated with other elements. According to an embodiment, additional elements may be added to the 360 video reception device.

Another aspect of the present disclosure may relate to a method of transmitting 360 video and a method of receiving 360 video. The methods of transmitting/receiving 360 video according to the present disclosure may be performed by the above-described 360 video transmission/reception devices or embodiments thereof.

The aforementioned embodiments of the 360 video transmission/reception devices and embodiments of the internal/ external elements thereof may be combined. For example, embodiments of the projection processor and embodiments of the data encoder may be combined to create as many embodiments of the 360 video transmission device as the number of the embodiments. The combined embodiments are also included in the scope of the present disclosure.

Figure 4:
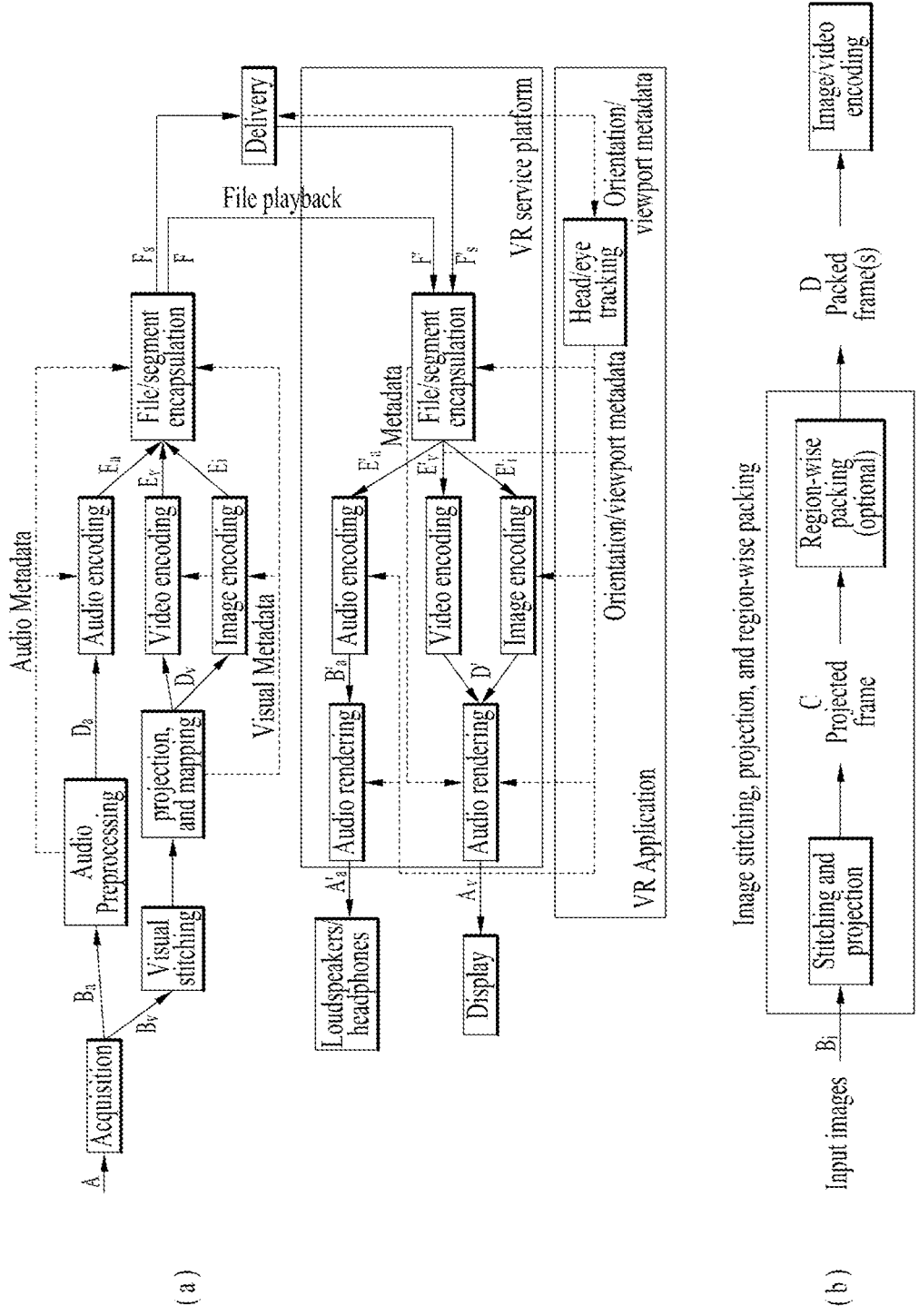
FIG. 4 illustrates a 360-degree video transmission device/360-degree video reception device according to another embodiment of the present disclosure.

FIG. 4 illustrates a 360-degree video transmission device/360-degree video reception device according to another embodiment of the present disclosure.

As described above, 360 content may be provided according to the architecture shown in (a). The 360 content may be provided in the form of a file or in the form of a segment based download or streaming service such as DASH. Here, the 360 content may be called VR content.

As described above, 360 video data and/or 360 audio data may be acquired.

The 360 audio data may be subjected to audio preprocessing and audio encoding. In these processes, audio related metadata may be generated, and the encoded audio and audio related metadata may be subjected to processing for transmission (file/segment encapsulation).

The 360 video data may pass through the aforementioned processes. The stitcher of the 360 video transmission device may stitch the 360 video data (visual stitching). This process may be omitted and performed at the reception side according to an embodiment. The projection processor of the 360 video transmission device may project the 360 video data on a 2D image (projection and mapping (packing)).

The stitching and projection processes are shown in (b) in detail. In (b), when the 360 video data (input images) is delivered, stitching and projection may be performed thereon. The projection process may be regarded as projecting the stitched 360 video data on a 3D space and arranging the projected 360 video data on a 2D image. In the specification, this process may be represented as projecting the 360 video data on a 2D image. Here, the 3D space may be a sphere or a cube. The 3D space may be identical to the 3D space used for re-projection at the reception side.

The 2D image may also be called a projected frame (C). Region-wise packing may be optionally performed on the 2D image. When region-wise packing is performed, the locations, forms and sizes of regions may be indicated such that the regions on the 2D image may be mapped on a packed frame (D). When region-wise packing is not performed, the projected frame may be identical to the packed frame. Regions will be described below. The projection process and the region-wise packing process may be represented as projecting regions of the 360 video data on a 2D image. The 360 video data may be directly converted into the packed frame without an intermediate process according to design.

In (a), the projected 360 video data may be image-encoded or video-encoded. Since the same content may be present for different viewpoints, the same content may be encoded into different bit streams. The encoded 360 video data may be processed into a file format such as ISOBMFF according to the aforementioned encapsulation processor. Alternatively, the encapsulation processor may process the encoded 360 video data into segments. The segments may be included in an individual track for DASH based transmission.

Along with processing of the 360 video data, 360 video related metadata may be generated as described above. This metadata may be included in a video stream or a file format and delivered. The metadata may be used for encoding, file format encapsulation, processing for transmission, etc.

The 360 audio/video data may pass through processing for transmission according to the transmission protocol and then may be transmitted. The aforementioned 360 video reception device may receive the 360 audio/video data over a broadcast network or broadband.

In (a), a VR service platform may correspond to an embodiment of the aforementioned 360 video reception device. In (a), loudspeakers/headphones, display and head/eye tracking components are performed by an external device or a VR application of the 360 video reception device. According to an embodiment, the 360 video reception device may include all of these components. According to an embodiment, the head/eye tracking component may correspond to the aforementioned receiver feedback processor.

The 360 video reception device may perform processing for reception (file/segment decapsulation) on the 360 audio/video data. The 360 audio data may be subjected to audio decoding and audio rendering and provided to a user through a speaker/headphone.

The 360 video data may be subjected to image decoding or video decoding and visual rendering and provided to the user through a display. Here, the display may be a display supporting VR or a normal display.

As described above, the rendering process may be regarded as a process of re-projecting 360 video data on a 3D space and rendering the re-projected 360 video data. This may be represented as rendering of the 360 video data on the 3D space.

The head/eye tracking component may acquire and process head orientation information, gaze information and viewport information of a user. This has been described above.

A VR application which communicates with the aforementioned processes of the reception side may be present at the reception side.

Figure 5:
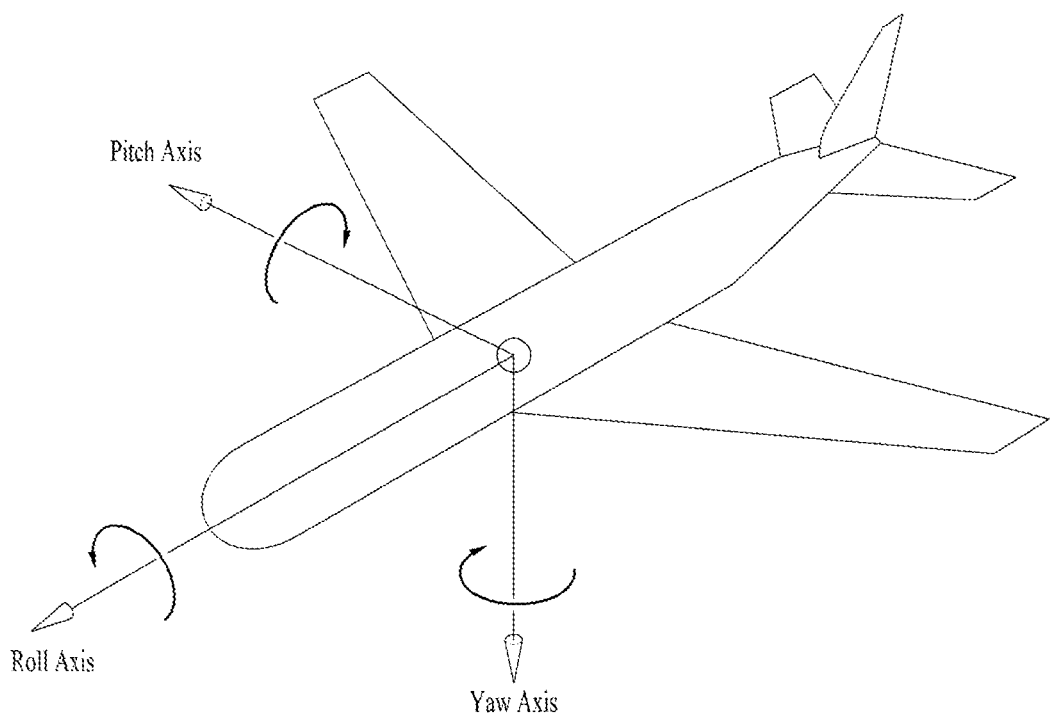
FIG. 5 illustrates the concept of aircraft principal axes for describing a 3D space of the present disclosure.

FIG. 5 illustrates the concept of aircraft principal axes for describing a 3D space of the present disclosure.

In the present disclosure, the concept of aircraft principal axes may be used to represent a specific point, location, direction, spacing and region in a 3D space.

That is, in the present disclosure, the concept of aircraft principal axes may be used to describe a 3D space before projection or after re-projection and to signal the same. According to an embodiment, a method using X, Y and Z axes or a spherical coordinate system may be used.

An aircraft may feely rotate in the three dimension. Axes which form the three dimension are called pitch, yaw and roll axes. In the specification, these may be represented as pitch, yaw and roll or a pitch direction, a yaw direction and a roll direction.

The pitch axis may refer to a reference axis of a direction in which the front end of the aircraft rotates up and down. In the shown concept of aircraft principal axes, the pitch axis may refer to an axis connected between wings of the aircraft.

The yaw axis may refer to a reference axis of a direction in which the front end of the aircraft rotates to the left/right. In the shown concept of aircraft principal axes, the yaw axis may refer to an axis connected from the top to the bottom of the aircraft.

The roll axis may refer to an axis connected from the front end to the tail of the aircraft in the shown concept of aircraft principal axes, and rotation in the roll direction may refer to rotation based on the roll axis.

As described above, a 3D space in the present disclosure may be described using the concept of pitch, yaw and roll.

Figure 6:
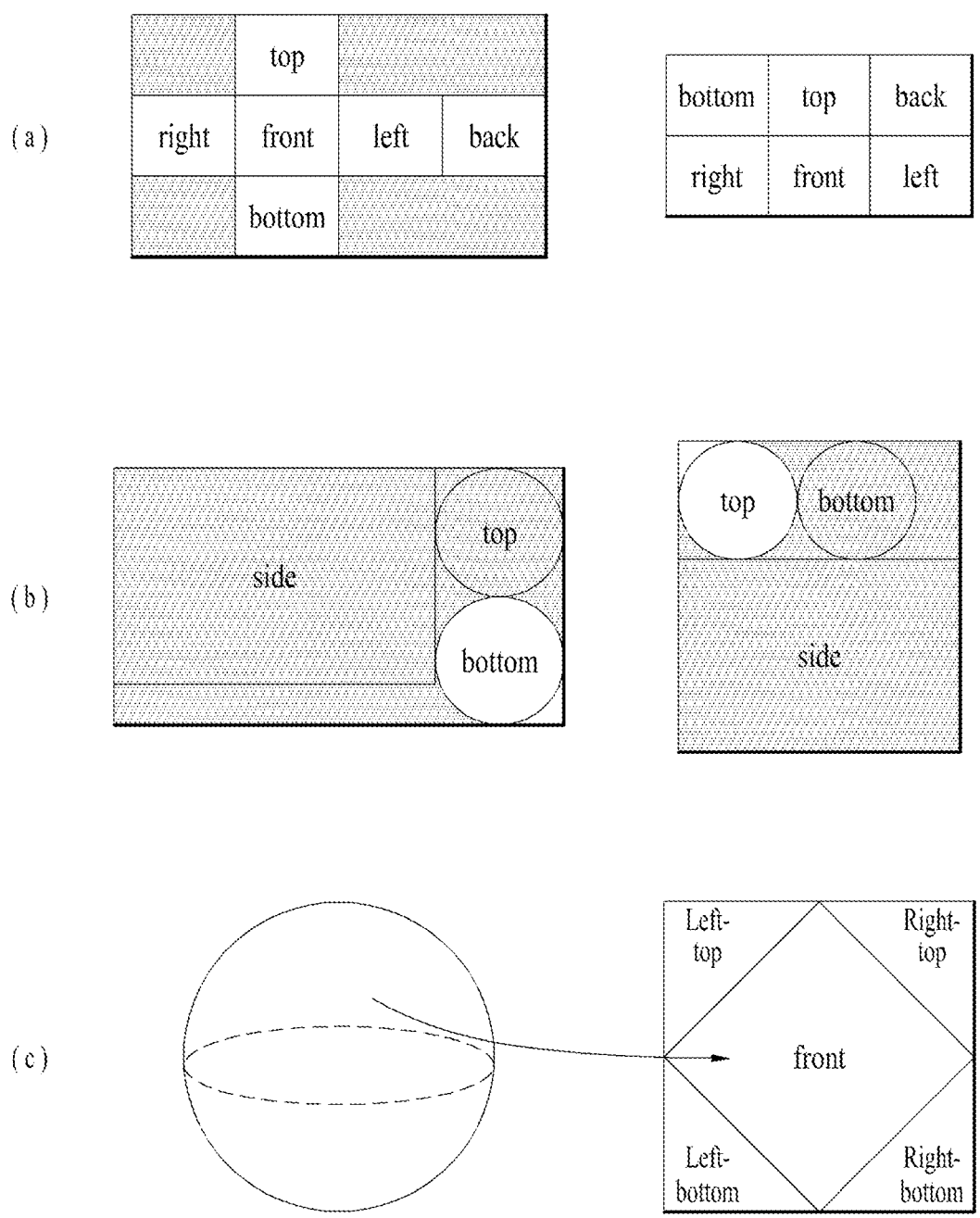
FIG. 6 illustrates projection schemes according to an embodiment of the present disclosure.

FIG. 6 illustrates projection schemes according to an embodiment of the present disclosure.

As described above, the projection processor of the 360 video transmission device according to the present disclosure may project stitched 360 video data on a 2D image. In this process, various projection schemes may be used.

According to another embodiment of the 360 video transmission device according to the present disclosure, the projection processor may perform projection using a cubic projection scheme. For example, stitched video data may be represented on a spherical plane. The projection processor may segment the 360 video data into a cube and project the same on the 2D image. The 360 video data on the spherical plane may correspond to planes of the cube and be projected on the 2D image as shown in (a).

According to another embodiment of the 360 video transmission device according to the present disclosure, the projection processor may perform projection using a cylindrical projection scheme. Similarly, if stitched video data may be represented on a spherical plane, the projection processor may segment the 360 video data into a cylinder and project the same on the 2D image. The 360 video data on the spherical plane may correspond to the side, top and bottom of the cylinder and be projected on the 2D image as shown in (b).

According to another embodiment of the 360 video transmission device according to the present disclosure, the projection processor may perform projection using a pyramid projection scheme. Similarly, if stitched video data may be represented on a spherical plane, the projection processor may regard the 360 video data as a pyramid form and project the same on the 2D image. The 360 video data on the spherical plane may correspond to the front, left top, left bottom, right top and right bottom of the pyramid and be projected on the 2D image as shown in (c).

According to an embodiment, the projection processor may perform projection using an equirectangular projection scheme and a panoramic projection scheme in addition to the aforementioned schemes.

As described above, regions may refer to regions obtained by dividing a 2D image on which 360 video data is projected. Such regions need not correspond to respective sides of the 2D image projected according to a projection scheme. However, regions may be divided such that the sides of the projected 2D image correspond to the regions and region-wise packing may be performed according to an embodiment. Regions may be divided such that a plurality of sides may correspond to one region or one side may correspond to a plurality of regions according to an embodiment. In this case, the regions may depend on projection schemes. For example, the top, bottom, front, left, right and back sides of the cube may be respective regions in (a). The side, top and bottom of the cylinder may be respective regions in (b). The front, left top, left bottom, right top and right bottom sides of the pyramid may be respective regions in (c).

FIG. 7 illustrates tiles according to an embodiment of the present disclosure.

360 video data projected on a 2D image or region-wise packed 360 video data may be divided into one or more tiles. (a) shows that one 2D image is divided into 16 tiles. Here, the 2D image may be the aforementioned projected frame or packed frame. According to another embodiment of the 360 video transmission device according to the present disclosure, the data encoder may independently encode the tiles.

The aforementioned region-wise packing may be discriminated from tiling. The aforementioned region-wise packing may refer to a process of dividing 360 video data projected on a 2D image into regions and processing the regions in order to increase coding efficiency or adjusting resolution. Tiling may refer to a process through which the data encoder divides a projected frame or a packed frame into tiles and independently encode the tiles. When 360 video is provided, a user does not simultaneously use all parts of the 360 video. Tiling enables only tiles corresponding to important part or specific part, such as a viewport currently viewed by the user, to be transmitted or consumed to or by a reception side on a limited bandwidth. Through tiling, a limited bandwidth may be used more efficiently and the reception side may reduce computational load compared to a case in which the entire 360 video data is processed simultaneously.

A region and a tile are discriminated from each other and thus they need not be identical. However, a region and a tile may refer to the same area according to an embodiment. Region-wise packing may be performed to tiles and thus regions may correspond to tiles according to an embodiment. Furthermore, when sides according to a projection scheme correspond to regions, each side, region and tile according to the projection scheme may refer to the same area according to an embodiment. A region may be called a VR region and a tile may be called a tile region according to context.

Region of Interest (ROI) may refer to a region of interest of users, which is provided by a 360 content provider. When 360 video is produced, the 360 content provider may produce the 360 video in consideration of a specific region which is expected to be a region of interest of users. According to an embodiment, ROI may correspond to a region in which important content of the 360 video is reproduced.

According to another embodiment of the 360 video transmission/reception devices according to the present disclosure, the receiver feedback processor may extract and collect viewport information and deliver the same to the transmitter feedback processor. In this process, the viewport information may be delivered using network interfaces of both sides. In the 2D image shown in (a), a viewport t6010 is displayed. Here, the viewport may be displayed over nine tiles of the 2D images.

In this case, the 360 video transmission device may further include a tiling system. According to an embodiment, the tiling system may be located following the data encoder (b), may be included in the aforementioned data encoder or transmission processor, or may be included in the 360 video transmission device as a separate internal/external element.

The tiling system may receive viewport information from the transmitter feedback processor. The tiling system may select only tiles included in a viewport region and transmit the same. In the 2D image shown in (a), only nine tiles including the viewport region t6010 among 16 tiles may be transmitted. Here, the tiling system may transmit tiles in a unicast manner over a broadband because the viewport region is different for users.

In this case, the transmitter feedback processor may deliver the viewport information to the data encoder. The data encoder may encode the tiles including the viewport region with higher quality than other tiles.

Furthermore, the transmitter feedback processor may deliver the viewport information to the metadata processor. The metadata processor may deliver metadata related to the viewport region to each internal element of the 360 video transmission device or include the metadata in 360 video related metadata.

By using this tiling method, transmission bandwidths may be saved and processes differentiated for tiles may be performed to achieve efficient data processing/transmission.

The above-described embodiments related to the viewport region may be applied to specific regions other than the viewport region in a similar manner. For example, the aforementioned processes performed on the viewport region may be performed on a region determined to be a region in which users are interested through the aforementioned gaze analysis, ROI, and a region (initial view, initial viewpoint) initially reproduced when a user views 360 video through a VR display.

According to another embodiment of the 360 video transmission device according to the present disclosure, the transmission processor may perform processing for transmission differently on tiles. The transmission processor may apply different transmission parameters (modulation orders, code rates, etc.) to tiles such that data delivered for the tiles has different robustnesses.

Here, the transmitter feedback processor may deliver feedback information received from the 360 video reception device to the transmission processor such that the transmission processor may perform transmission processing differentiated for tiles. For example, the transmitter feedback processor may deliver the viewport information received from the reception side to the transmission processor. The transmission processor may perform transmission processing such that tiles including the corresponding viewport region have higher robustness than other tiles.

FIG. 8 illustrates 360-degree video related metadata according to an embodiment of the present disclosure.

The aforementioned 360 video related metadata may include various types of metadata related to 360 video. The 360 video related metadata may be called 360 video related signaling information according to context. The 360 video related metadata may be included in an additional signaling table and transmitted, included in a DASH MPD and transmitted, or included in a file format such as ISOBMFF in the form of box and delivered. When the 360 video related metadata is included in the form of box, the 360 video related metadata may be included in various levels such as a file, fragment, track, sample entry, sample, etc. and may include metadata about data of the corresponding level.

According to an embodiment, part of the metadata, which will be described below, may be configured in the form of a signaling table and delivered, and the remaining part may be included in a file format in the form of a box or a track.

According to an embodiment of the 360 video related metadata, the 360 video related metadata may include basic metadata related to a projection scheme, stereoscopic related metadata, initial view/initial viewpoint related metadata, ROI related metadata, FOV (Field of View) related metadata and/or cropped region related metadata. According to an embodiment, the 360 video related metadata may include additional metadata in addition to the aforementioned metadata.

Embodiments of the 360 video related metadata according to the present disclosure may include at least one of the aforementioned basic metadata, stereoscopic related metadata, initial view/initial viewpoint related metadata, ROI related metadata, FOV related metadata, cropped region related metadata and/or additional metadata. Embodiments of the 360 video related metadata according to the present disclosure may be configured in various manners depending on the number of cases of metadata included therein. According to an embodiment, the 360 video related metadata may further include additional metadata in addition to the aforementioned metadata.

The basic metadata may include 3D model related information, projection scheme related information and the like. The basic metadata may include a vr_geometry field, a projection_scheme field, etc. According to an embodiment, the basic metadata may further include additional information.

The vr_geometry field may indicate the type of a 3D model supported by the corresponding 360 video data. When the 360 video data is re-projected on a 3D space as described above, the 3D space may have a form according to a 3D model indicated by the vr_geometry field. According to an embodiment, a 3D model used for rendering may differ from the 3D model used for re-projection, indicated by the vr_geometry field. In this case, the basic metadata may further include a field which indicates the 3D model used for rendering. When the field has values of 0, 1, 2 and 3, the 3D space may conform to 3D models of a sphere, a cube, a cylinder and a pyramid. When the field has the remaining values, the field may be reserved for future use. According to an embodiment, the 360 video related metadata may further include detailed information about the 3D model indicated by the field. Here, the detailed information about the 3D model may refer to the radius of a sphere, the height of a cylinder, etc. for example. This field may be omitted.

The projection_scheme field may indicate a projection scheme used when the 360 video data is projected on a 2D image. When the field has values of 0, 1, 2, 3, 4, and 5, the field indicates that the equirectangular projection scheme, cubic projection scheme, cylindrical projection scheme, tile-based projection scheme, pyramid projection scheme and panoramic projection scheme are used. When the field has a value of 6, the field indicates that the 360 video data is directly projected on the 2D image without stitching. When the field has the remaining values, the field may be reserved for future use. According to an embodiment, the 360 video related metadata may further include detailed information about regions generated according to a projection scheme specified by the field. Here, the detailed information about regions may refer to information indicating whether regions have been rotated, the radius of the top region of a cylinder, etc. for example.

The stereoscopic related metadata may include information about 3D related properties of the 360 video data. The stereoscopic related metadata may include an is_stereoscopic field and/or a stereo_mode field. According to an embodiment, the stereoscopic related metadata may further include additional information.

The is_stereoscopic field may indicate whether the 360 video data supports 3D. When the field is 1, the 360 video data supports 3D. When the field is 0, the 360 video data does not support 3D. This field may be omitted.

The stereo_mode field may indicate 3D layout supported by the corresponding 360 video. Whether the 360 video supports 3D may be indicated only using this field. In this case, the is_stereoscopic field may be omitted. When the field is 0, the 360 video may be a mono mode. That is, the projected 2D image may include only one mono view. In this case, the 360 video may not support 3D.

When this field is 1 and 2, the 360 video may conform to left-right layout and top-bottom layout. The left-right layout and top-bottom layout may be called a side-by-side format and a top-bottom format. In the case of the left-right layout, 2D images on which left image/right image are projected may be positioned at the left/right on an image frame. In the case of the top-bottom layout, 2D images on which left image/right image are projected may be positioned at the top/bottom on an image frame. When the field has the remaining values, the field may be reserved for future use.

The initial view/initial viewpoint related metadata may include information about a view (initial view) which is viewed by a user when initially reproducing 360 video. The initial view/initial viewpoint related metadata may include an initial_view_yaw_degree field, an initial_view_pitch_degree field and/or an initial_view_roll_degree field. According to an embodiment, the initial view/initial viewpoint related metadata may further include additional information.

The initial_view_yaw_degree field, initial_view_pitch_degree field and initial_view_roll_degree field may indicate an initial view when the 360 video is reproduced. That is, the center point of a viewport which is initially viewed when the 360 video is reproduced may be indicated by these three fields. The fields may indicate the center point using a direction (sign) and a degree (angle) of rotation on the basis of yaw, pitch and roll axes. Here, the viewport which is initially viewed when the 360 video is reproduced according to FOV. The width and height of the initial viewport based on the indicated initial view may be determined through FOV. That is, the 360 video reception apparatus may provide a specific region of the 360 video as an initial viewport to a user using the three fields and FOV information.

According to an embodiment, the initial view indicated by the initial view/initial viewpoint related metadata may be changed per scene. That is, scenes of the 360 video change as 360 content proceeds with time. The initial view or initial viewport which is initially viewed by a user may change for each scene of the 360 video. In this case, the initial view/initial viewpoint related metadata may indicate the initial view per scene. To this end, the initial view/initial viewpoint related metadata may further include a scene identifier for identifying a scene to which the initial view is applied. In addition, since FOV may change per scene of the 360 video, the initial view/initial viewpoint related metadata may further include FOV information per scene which indicates FOV corresponding to the relative scene.

The ROI related metadata may include information related to the aforementioned ROI. The ROI related metadata may include a 2d_roi_range_flag field and/or a 3d_roi_range_flag field. These two fields may indicate whether the ROI related metadata includes fields which represent ROI on the basis of a 2D image or fields which represent ROI on the basis of a 3D space. According to an embodiment, the ROI related metadata may further include additional information such as differentiate encoding information depending on ROI and differentiate transmission processing information depending on ROI.

When the ROI related metadata includes fields which represent ROI on the basis of a 2D image, the ROI related metadata may include a min_top_left_x field, a max_top_left_x field, a min_top_left_y field, a max_top_left_y field, a min_width field, a max_width field, a min_height field, a max_height field, a min_x field, a max_x field, a min_y field and/or a max_y field.

The min_top_left_x field, max_top_left_x field, min_top_left_y field, max_top_left_y field may represent minimum/maximum values of the coordinates of the left top end of the ROI. These fields may sequentially indicate a minimum x coordinate, a maximum x coordinate, a minimum y coordinate and a maximum y coordinate of the left top end.

The min_width field, max_width field, min_height field and max_height field may indicate minimum/maximum values of the width and height of the ROI. These fields may sequentially indicate a minimum value and a maximum value of the width and a minimum value and a maximum value of the height.

The min_x field, max_x field, min_y field and max_y field may indicate minimum and maximum values of coordinates in the ROI. These fields may sequentially indicate a minimum x coordinate, a maximum x coordinate, a minimum y coordinate and a maximum y coordinate of coordinates in the ROI. These fields may be omitted.

When ROI related metadata includes fields which indicate ROI on the basis of coordinates on a 3D rendering space, the ROI related metadata may include a min_yaw field, a max_yaw field, a min_pitch field, a max_pitch field, a min_roll field, a max_roll field, a min_field_of_view field and/or a max_field_of_view field.

The min_yaw field, max_yaw field, min_pitch field, max_pitch field, min_roll field and max_roll field may indicate a region occupied by ROI on a 3D space using minimum/maximum values of yaw, pitch and roll. These fields may sequentially indicate a minimum value of yaw-axis based reference rotation amount, a maximum value of yaw-axis based reference rotation amount, a minimum value of pitch-axis based reference rotation amount, a maximum value of pitch-axis based reference rotation amount, a minimum value of roll-axis based reference rotation amount, and a maximum value of roll-axis based reference rotation amount.

The min_field_of_view field and max_field_of_view field may indicate minimum/maximum values of FOV of the corresponding 360 video data. FOV may refer to the range of view displayed at once when 360 video is reproduced. The min_field_of_view field and max_field_of_view field may indicate minimum and maximum values of FOV. These fields may be omitted. These fields may be included in FOV related metadata which will be described below.

The FOV related metadata may include the aforementioned FOV related information. The FOV related metadata may include a content_fov_flag field and/or a content_fov field. According to an embodiment, the FOV related metadata may further include additional information such as the aforementioned minimum/maximum value related information of FOV.

The content_fov_flag field may indicate whether corresponding 360 video includes information about FOV intended when the 360 video is produced. When this field value is 1, a content_fov field may be present.

The content_fov field may indicate information about FOV intended when the 360 video is produced. According to an embodiment, a region displayed to a user at once in the 360 video may be determined according to vertical or horizontal FOV of the 360 video reception apparatus. Alternatively, a region displayed to a user at once in the 360 video may be determined by reflecting FOV information of this field according to an embodiment.

Cropped region related metadata may include information about a region including 360 video data in an image frame. The image frame may include a 360 video data projected active video area and other areas. Here, the active video area may be called a cropped region or a default display region. The active video area is viewed as 360 video on an actual VR display and the 360 video reception apparatus or the VR display may process/display only the active video area. For example, when the aspect ratio of the image frame is 4:3, only an area of the image frame other than an upper part and a lower part of the image frame may include 360 video data. This area may be called the active video area.

The cropped region related metadata may include an is_cropped_region field, a cr_region_left_top_x field, a cr_region_left_top_y field, a cr_region_width field and/or a cr_region_height field. According to an embodiment, the cropped region related metadata may further include additional information.

The is_cropped_region field may be a flag which indicates whether the entire area of an image frame is used by the 360 video reception apparatus or the VR display. That is, this field may indicate whether the entire image frame indicates an active video area. When only part of the image frame is an active video area, the following four fields may be added.

A cr_region_left_top_x field, a cr_region_left_top_y field, a cr_region_width field and a cr_region_height field may indicate an active video area in an image frame. These fields may indicate the x coordinate of the left top, the y coordinate of the left top, the width and the height of the active video area. The width and the height may be represented in units of pixel.

Figure 9:
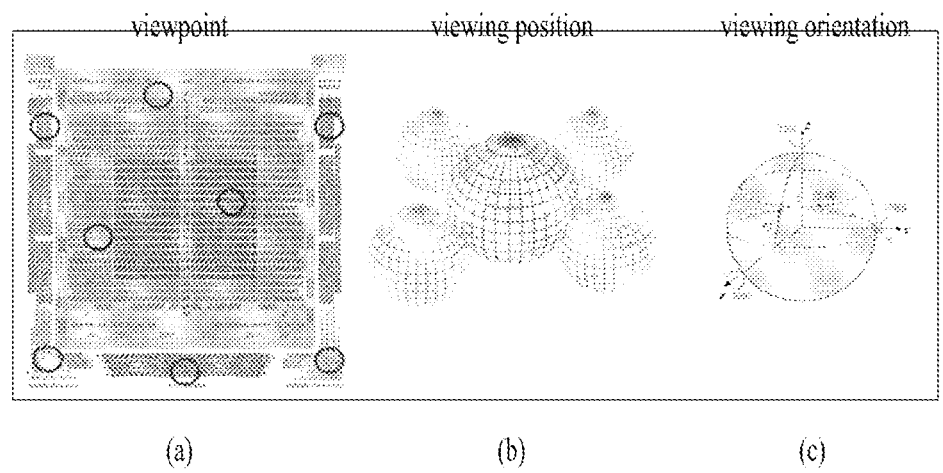
FIG. 9 illustrates a viewpoint and a viewing position that are additionally defined in the 3DoF+VR system.

FIG. 9 illustrates a viewpoint and viewing location additionally defined in a 3DoF+VR system.

The 360 video based VR system according to embodiments may provide visual/auditory experiences for different viewing orientations with respect to a location of a user for 360 video based on the 360 video processing process described above. This method may be referred to as three degree of freedom (3DoF) plus. Specifically, the VR system that provides visual/auditory experiences for different orientations in a fixed location of a user may be referred to as a 3DoF based VR system.

The VR system that may provide extended visual/auditory experiences for different orientations in different viewpoints and different viewing locations in the same time zone may be referred to as a 3DoF+ or 3DoF plus based VR system.

1) Assuming a space such as (a) (an example of art center), different locations (an example of art center marked with a red circle) may be considered as the respective viewpoints. Here, video/audio provided by the respective viewpoints existing in the same space as in the example may have the same time flow.

2) In this case, different visual/auditory experiences may be provided according to a viewpoint change (head motion) of a user in a specific location. That is, spheres of various viewing locations may be assumed as shown in (b) for a specific viewpoint, and video/audio/text information in which a relative location of each viewpoint is reflected may be provided.

3) Visual/auditory information of various orientations such as the existing 3DoF may be delivered at a specific viewpoint of a specific location as shown in (c). In this case, additional various sources as well as main sources (video/audio/text) may be provided in combination, and this may be associated with a viewing orientation of a user or information may be delivered independently.

Figure 10:
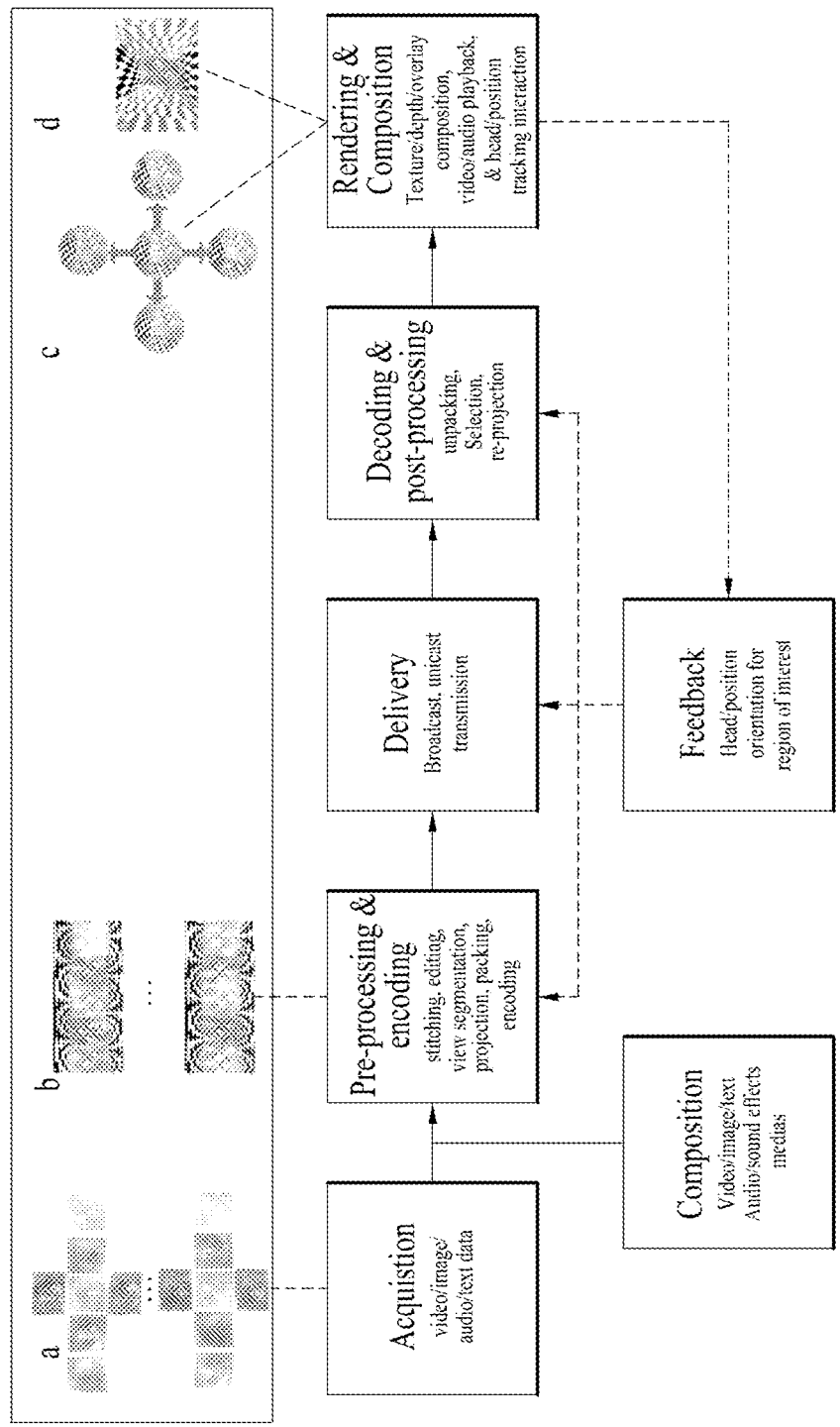
FIG. 10 illustrates a method of implementing 360-degree video signal processing and a related transmission/reception device based on a 3DoF+ system.

FIG. 10 is a view showing a method for implementing 360-degree video signal processing and a related transmission device/reception device based on 3DoF+ system.

FIG. 10 is an example of 3DoF+ end-to-end system flow chart including video acquisition, pre-processing, transmission, (post)processing, rendering and feedback processes of 3DoF+.

1) Acquisition: may mean a process of acquiring 360-degree video through capture, composition or generation of 360-degree video. Various kinds of video/audio information according to head motion may be acquired for a plurality of locations through this process. In this case, video information may include depth information as well as visual information (texture). At this time, a plurality of kinds of information of different viewing locations according to different viewpoints may be acquired as in the example of video information of a.

2) Composition: may define a method for composition to include video (video/image, etc.) through external media, voice (audio/effect sound, etc.) and text (caption, etc.) as well as information acquired through the video/audio input module in user experiences.

3) Pre-processing: is a preparation (pre-processing) process for transmission/delivery of the acquired 360-degree video, and may include stitching, projection, region wise packing and/or encoding process. That is, this process may include pre-processing and encoding processes for modifying/complementing data such as video/audio/text information according to a producer's intention. For example, the pre-processing process of the video may include mapping (stitching) of the acquired visual information onto 360 sphere, editing such as removing a region boundary, reducing difference in color/brightness or providing visual effect of video, view segmentation according to viewpoint, a projection for mapping video on 360 sphere into 2D image, region-wise packing for rearranging video according to a region, and encoding for compressing video information. A plurality of projection videos of different viewing locations according to different viewpoints may be generated like example in view of video of B.

4) Delivery: may mean a process of processing and transmitting video/audio data and metadata subjected to the preparation process (pre-processing). As a method for delivering a plurality of video/audio data and related metadata of different viewing locations according to different viewpoints, a broadcast network or a communication network may be used, or unidirectional delivery method may be used.

5) Post-processing & composition: may mean a post-processing process for decoding and finally reproducing received/stored video/audio/text data. For example, the post-processing process may include unpacking for unpacking a packed video and re-projection for restoring 2D projected image to 3D sphere image as described above.

6) Rendering: may mean a process of rendering and displaying re-projected image/video data on a 3D space. In this process, the process may be reconfigured to finally output video/audio signals. A viewing orientation, viewing location/head location and viewpoint, in which a user's region of interest exists, may be subjected to tracking, and necessary video/audio/text information may selectively be used according to this information. At this time, in case of video signal, different viewing locations may be selected according to the user's region of interest as shown in c, and video in a specific orientation of a specific viewpoint at a specific location may finally be output as shown in d.

7) Feedback: may mean a process of delivering various kinds of feedback information, which may be acquired during a display process, to a transmission side. In this embodiment, a viewing orientation, a viewing location, and a viewpoint, which corresponds to a user's region of interest, may be estimated, and feedback may be delivered to reproduce video/audio based on the estimated result.

Figure 11:
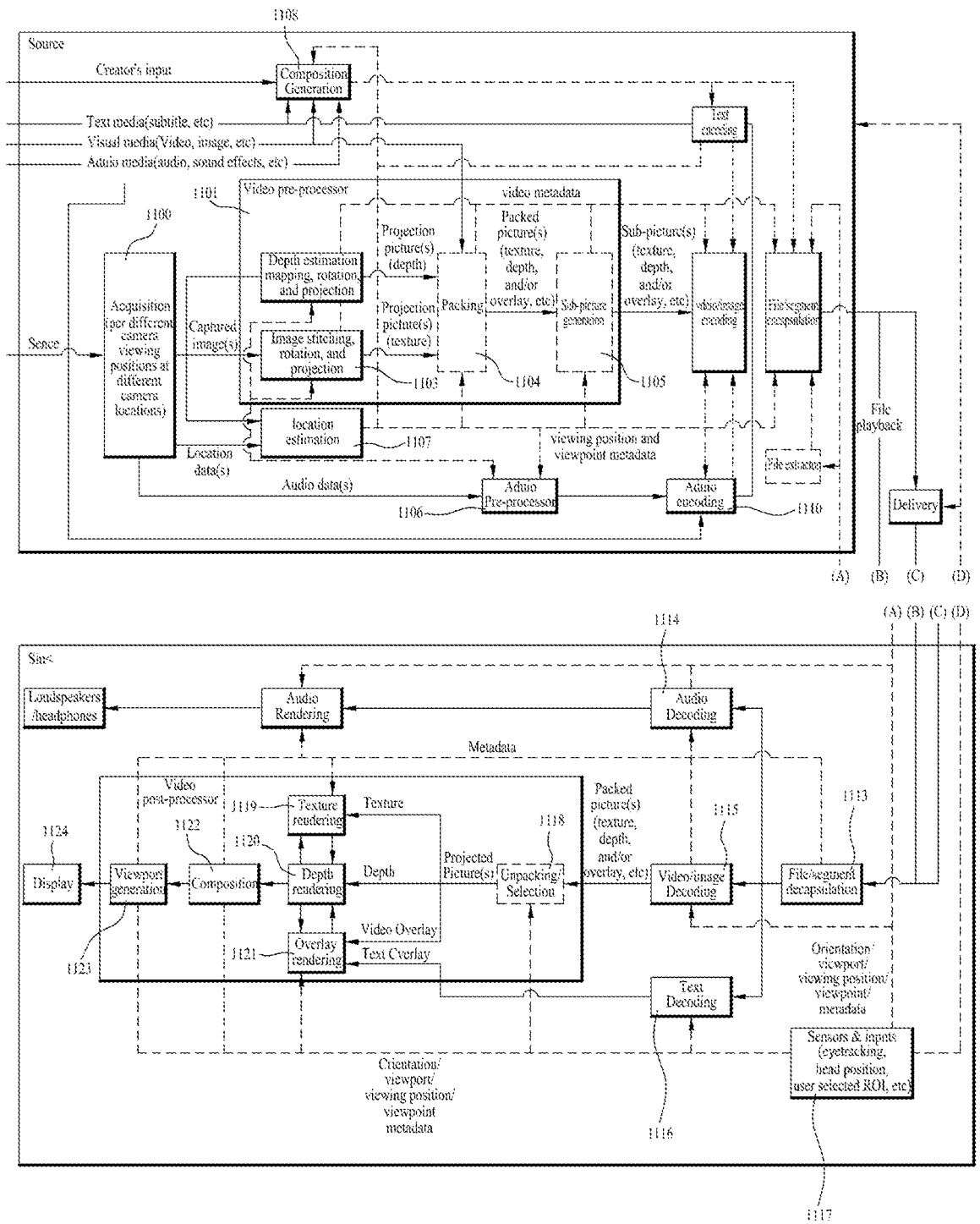
FIG. 11 shows the structure of a 3DoF+ end-to-end system.

FIG. 11 shows the structure of a 3DoF+ end-to-end system.

FIG. 11 illustrates a 3DoF+ end-to-end system architecture. As described above by the architecture of FIG. 11, 3DoF+360 content may be provided. Each component may correspond to hardware, software, a processor, and/or a combination thereof. The transmission device of FIG. 11 is a detailed representation of the transmission device of FIG.

2, and they may reference/correspond to each other in a complementary manner. The reception device of FIG. 11 is a detailed representation of the reception device of FIG. 2, and they may reference/correspond to each other in a complementary manner.

The 360 video transmission device (which may also be referred to as a source) may include a part for acquisition of 360 video (image)/audio data (an acquisition unit), a part configured to process the acquired data (a video/audio pre-processor), a part configured to compose additional information (a composition generation unit), a part configured to encode text, audio and projected 360-degree video (an encoding unit), and a part configured to encapsulate the encoded data (an encapsulation unit). As described above, the encoded data may be output in the form of a bitstream. The encoded data may be encapsulated in a file format such as ISOBMFF or CFF, or may be processed in the form of a DASH segment or the like. The encoded data may be transmitted to the 360 video reception device through a digital storage medium. Although not explicitly shown, the data may be processed for transmission through a transmission processor and be then transmitted over a broadcasting network, a broadband, or the like as described above.

The data acquisition unit 1100 may acquire different kinds of information simultaneously or successively depending on a sensor orientation (a viewing orientation in the case of a video), a sensor position of the sensor for information acquisition (a viewing position in the case of a video), and an information acquisition position of the sensor (a viewpoint in the case of a video). In this operation, the unit may acquire video, image, audio, location information, and the like.

The data acquired by the data acquisition unit 1100 may include a scene, an image, a view, a picture, an image/video, audio, and the like, and may be referred to as image data or video data. The acquisition unit 1100 may acquire data for various camera viewing positions of various camera positions.

A device/method for performing a process prior to encoding the data may be referred to as a pre-processor/pre-processing.

The pre-processor 1101 may include a depth processor 1102, an image processor 1103, a packer 1104, and/or a sub-picture generator 1105.

The depth processor 1102 may estimate, match, rotate, and project the depth data acquired by the acquisition unit 1100. The respective processes may be selectively combined. Also, the audio pre-processor 1106 may pre-process the audio data acquired by the acquisition unit 1100. The pre-processed audio data may be input to the depth processor 1102. The depth processor 1102 may estimate, map, rotate, or project the depth based on the audio data. The depth processor 1102 may be referred to as an estimator, a mapper, a rotator, or a projector. The depth processor 1102 may generate projected pictures. A picture may be data including a depth and may be referred to as a depth. The depth processor 1102 may estimate/map/rotate/project the depth data based on the image data, the audio data, and the like.

The image processor 1103 may receive the image data from the acquisition unit 1100, and may stitch, rotate, or project the image data. The respective processes may be selectively combined. The image processor 1103 may stitch/rotate/project an image based on the audio data pre-processed by the audio pre-processor 1106. The image processor 1103 may generate projected pictures. A picture may be data including a texture, and may be referred to as a texture.

The depth processor 1102 and/or the image processor 1103 may generate video metadata containing signaling information related to each process and deliver the same to the video/image encoder.

The packer 1104 may pack (merge) projection pictures including depth and/or projection pictures including texture into a packing picture in order to efficiently transmit the pictures. In this operation, the packing may be performed based on visual media or the like. Video metadata containing signaling information related to the packing may be generated. The packing picture may include a texture, a depth, and additional data (overlay). The overlay refers to an overlapping area between pictures packed according to the packing.

The sub-picture generator 1105 may receive the packing picture and generate sub-pictures from the packing picture. A sub-picture may represent a partial picture included in the picture. The sub-picture generator 1105 may divide the packing picture into one or more sub-pictures based on the viewing position, viewpoint metadata, and the like. The sub-picture generator 1105 may generate video metadata containing signaling information about the sub-picture process.

The packer 1104 and/or the sub-picture generator 1105 may be selectively applied according to embodiments.

The location estimator 1107 may be operatively coupled to the video pre-processor 1101 to receive location data from the acquisition unit 1100 and estimate the location data based on the image data. The predicted/estimated location data may be delivered to the composition generator 1108.

The composition generator 1108 may be operatively coupled to the pre-processor to receive an input signal, text media (subtitles, etc.), visual media (video, images, etc.), audio media (audio, sound effects, etc.) from outside the source, generate information about configuration of the data, and provide the information to the file/segment encapsulator. Thus, the transmission device (source) may transmit the information about the data configuration to the reception device (sink).

The text encoder 1109 may encode the text media based on the location, composition information, audio data, and the like. The encoded text data may be delivered to the video/image encoder.

The audio encoder 1110 may encode the pre-processed audio data. The audio encoder 1110 may encode the audio data based on the encoded video/image data. The encoded audio data may be transmitted to the video/image encoder, the text encoder, and the like.

The video/image encoder 1111 may encode a packing picture including texture, depth, and auxiliary information, a sub-picture (or a sub-picture), audio data, text data, video metadata, and the like.

The file/segment encapsulator 1112 may generate a file/segment including a video/image, metadata, and auxiliary information based on the encoded video/image data, video metadata, composition information, eye tracking provided by the file extractor as feedback information of the reception device, head position, user-selected ROI information, and the like.

The transmission device may transmit data based on the file or based on DASH.

Specifically, in the case of image data, texture and depth information may be acquired, and different video pre-processing may be performed according to characteristics of each component. For example, in the case of texture information, a 360 omnidirectional image may be constructed using images of different viewing orientations of the same viewing position acquired at the same position using the image sensor location information, To this end, an image stitching process may be performed. Also, projection and/or region-wise packing for changing an image to a format for encoding may be performed. In the case of a depth image, an image may be generally acquired through a depth camera. In this case, a depth image may be created in a form such as texture. Alternatively, depth data may be generated based on separately measured data. After an image for each component is generated, it may be additionally transformed (packed) into a video format for efficient compression, or a process (sub-picture generation) of dividing the image into actually necessary parts and reconstructing the image may be performed. Information on the video composition used in the video pre-processing stage is delivered as video metadata.

When additionally given video/audio/text information is provided together with the acquired data (or data for main service), it is necessary to provide information for synthesizing the aforementioned information in the final playback. The composition generation unit generates information needed to synthesize, at the final playback stage, externally generated media data (video/image in the case of video, audio/sound effects in the case of audio, subtitles in the case of text) based on the producer's intention. This information is delivered as composition metadata.

The video/audio/text information obtained through individual processing is compressed using each encoder and encapsulated into a file or segment depending on the application. In this case, only necessary information may be extracted (by the file extractor) according to a video, file, or segment configuration method.

In addition, information for reconstructing each data in the receiver is delivered at the codec or file format/system level. The information may include information for video/audio reconstruction (video/audio metadata), composition information for overlay (composition metadata), and video/audio reproducible position (viewpoint), and viewing position information (viewing position and viewpoint metadata) for each position. Such information may also be generated through a separate metadata processor.

The 360 video reception device (which may be referred to as a sink) may include a part (file/segment decapsulation unit) configured to decapsulate the received file or segment, and a part (decoding unit) configured to generate video/audio/text information from a bitstream, a part (post-processor) configured to reconstruct the image/audio/text in a form for playback, a part (tracking unit) configured to track the user's ROI, and a display serving as a playback device.

The reception device may perform the reverse process of the operations of the transmission device.

The reception device may receive data including video/image/audio/metadata/text/auxiliary information (which may be referred to simply as video data) in the form of a file and/or DASH delivery.

The file/segment decapsulator 1113 may decapsulate the file/segment. Audio data, video/image data, text data, and the like may be decapsulated from the file/segment. A bitstream generated through decapsulation may be divided into video/audio/text, and the like by the type of data such that the data may be individually decoded into a reproducible form.

The audio decoder 1114 may decode the audio data.

The video/image decoder 1115 may decode the video/image data. The video/image decoder 1115 may decode/generate packing pictures including text, depth, and/or overlay transmitted from the transmission device.

The text decoder 1116 may decode the text data.

The sensor and the input unit or the tracker 1117 may generate information such as the viewpoint of the user's region of interest, the viewing position at the viewpoint, and the viewing orientation at the viewing position based on the sensor and user input information. This information may be used by each module of the 360 video reception device in selecting or extracting a region of interest, or may be used in a post-processing process for highlighting the region of interest. Also, when the information is transmitted to the 360 video transmission device, it may be used for file selection (by the file extractor) or sub-picture selection for efficient use of the bandwidth and for various image reconstruction methods (viewport/viewing position/viewpoint dependent processing) based on the region of interest. The orientation, viewport, viewing position, metadata, eye tracking, head position, user-selected ROI information, etc. may be fed back to the transmission device, and may be provided for audio decoding, video/image decoding, and text decoding, and also be provided for unpacking/selection, unpacking texture/depth/overlay rendering, composition, viewport generation, and the like.

The unpacker/selector 1118 may correspond to the packer of the transmission device, and may perform the reverse process of the operation of the packer. Upon receiving a packing picture, the unpacker/selector may unpack and select projected pictures from the packing picture. The process of unpacking/selecting may be optional according to embodiments. The unpacking/selecting may be performed based on the orientation/viewport/viewing position/viewpoint/metadata.

The texture renderer 1119, the depth renderer 1120, and the overlay renderer 1121 may render texture data, depth data, and video overlay data from the projected pictures, respectively. Texture/depth/overlay rendering may be performed based on the metadata included in the file/segment and the orientation/viewport/viewing position/viewpoint/metadata received from the tracker. The overlay renderer 1121 may render video overlay data and/or texture overlay data.

The composer 1122 may adjust the configuration of the rendered texture/depth/video and text overlay based on the metadata, the orientation/viewport/viewing position/viewpoint/metadata, and the like.

The viewport generator 1123 may generate viewport information about data that is configured based on the metadata, the orientation/viewport/viewing position/viewpoint/metadata, and the like.

The displayer 1124 may provide a viewport-based service to a user by displaying video data including video/image/texture/depth/text based on the viewport.

The process (e.g., unpacking/selecting or viewport generation) after the decoding by the reception device may correspond to video post-processing or a video post-processor.

After audio decoding 1114, the audio data may be rendered and provided to a user through a speaker/headphone or the like, along with the video data.

Specifically, the decoded image signal may be processed using various processing methods according to the image construction method. When image packing is performed by the 360 video transmission device, it is necessary to reconstruct the image based on the information transmitted through the metadata. To this end, video metadata generated by the 360 video transmission device may be used. In addition, when the decoded image includes images of multiple viewpoints, multiple viewing positions, or various viewing orientations, information matching the viewpoint, viewing position, and viewing orientation of the user's ROI generated through tracking may be selected and processed. In this operation, the viewing position and viewpoint metadata generated by the transmission terminal may be used. In addition, when multiple components are delivered for a specific viewpoint, viewing position, and viewing orientation, or video information for overlay is separately delivered, a rendering process may be included according to each case. The video data (texture, depth, overlay) obtained through a separate rendering process is processed through a composition process. In this operation, the composition metadata generated by the transmission terminal may be used. Finally, information for playback at the viewport may be generated according to the user's ROI.

A reproducible voice signal is generated from the decoded voice signal through the audio renderer and/or post-processing process. In this operation, information that meets the user's needs may be generated based on the information on the user's ROI and the metadata delivered to the 360 video reception device.

The decoded text signal is delivered to the overlay renderer and processed into text-based overlay information such as subtitles. When necessary, a separate text post-processing process may be included.

Figure 12:
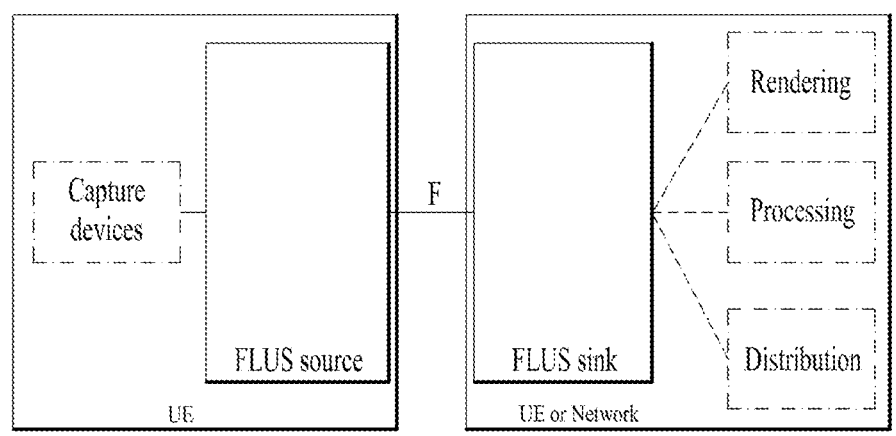
FIG. 12 shows the structure of Framework for Live Uplink Streaming (FLUS).

FIG. 12 illustrates an architecture of a Frame for Live Uplink Streaming (FLUS).

The detailed blocks of the transmitting side and the receiving side may be categorized into functions of a source and a sink in FLUS (Framework for Live Uplink Streaming). In this case, the information acquisition unit may implement the function of the source, and the function of the sink may be implemented on a network as described below. Alternatively, the source/sink may be implemented within a network node. The network node may include a user equipment (UE). The UE may include the aforementioned 360-degree video transmission device or the aforementioned 360-degree reception device.

The transmission/reception processing process based on the architecture described above may be represented as follows. The transmission/reception processing process described below is based on the video signal processing process. When the other signals such as audio or text are processed, the parts marked with italic may be omitted or may be modified so as to be suitable for the audio or text processing process.

Figure 13:
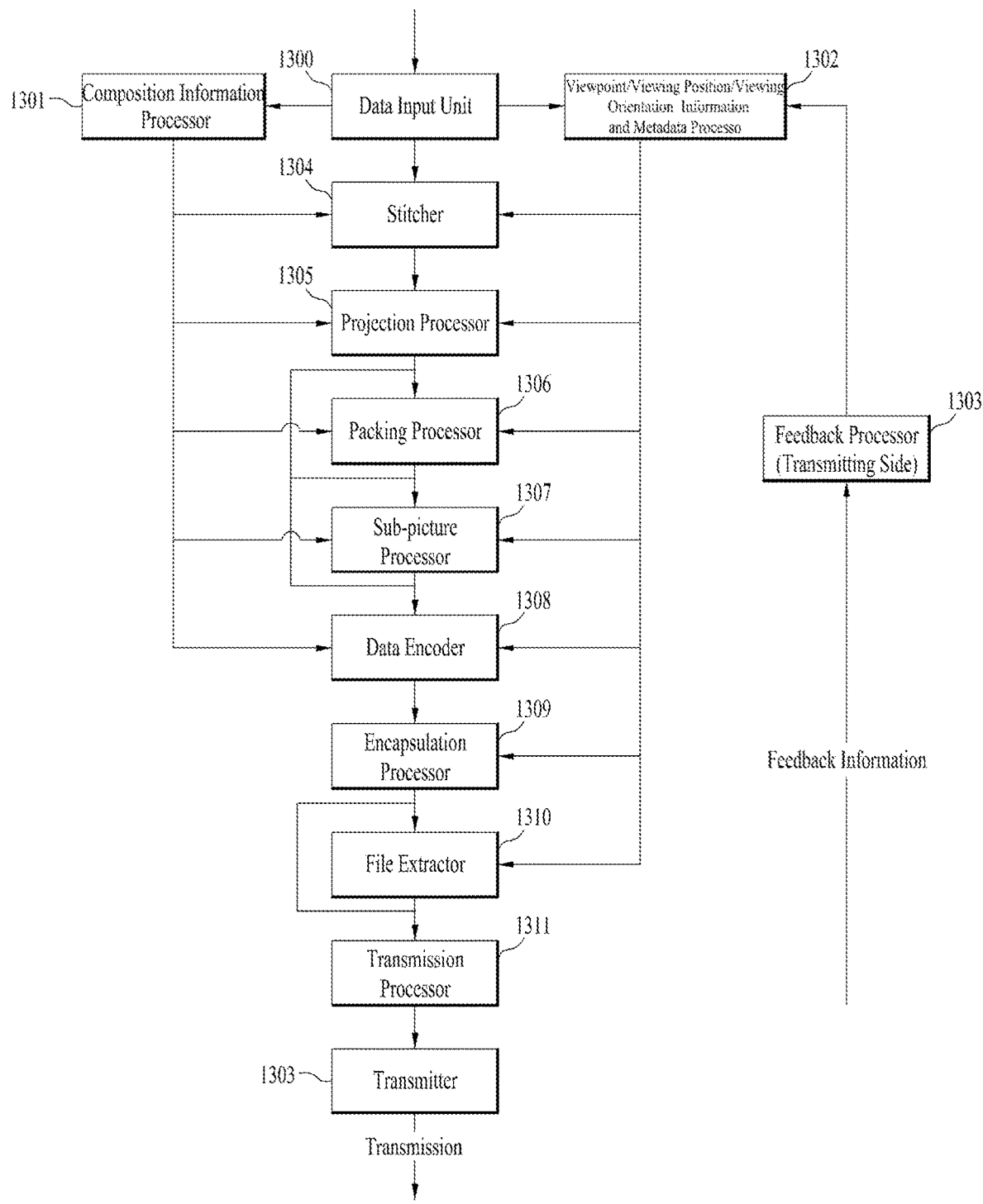
FIG. 13 illustrates the configuration of a 3DoF+ transmission terminal.

FIG. 13 illustrates the configuration of a 3DoF+ transmission terminal.

The configuration of the transmission device/method (source) of FIG. 11 described above may be represented as shown in the figure. Each component may correspond to hardware, software, processor, and/or a combination thereof. For details of the operation of the transmission device of FIG. 13, reference may be made to the description of FIG. 11. The components/component devices may be selectively combined and implemented according to embodiments.

The data input unit 1300 may receive data. For example, 360 3DOF+ video data may be input.

A composition information processor 1301 may generate information on the configuration of data and transmit the same to a projector 1305, a packer 1306, a sub-picture controller 1307, a data encoder 1308, and the like.

A metadata processor 1302 may generate viewpoint/viewing position/viewing orientation information and metadata related thereto based on the input video data and/or feedback information, and transmit the same to the components of the transmission device. Each component (component device) may process an operation based on the metadata.

A feedback controller (feedback processor) 1303 may receive feedback information related to tracking from the receiving side and transmit the same to the transmission device.

The stitcher 1304 may perform a merging process of concatenating the acquired video data.

The projector (projection processor) 1305 may project the stitched video data into a picture. For example, when the stitcher continuously concatenates 360 video/image data in a 3D spherical coordinate system, the projector may project the 360 video/image data into a (2D) picture.

The packer (packing processor) 1306 may pack (merge) the projected pictures into one or more packed pictures. This is a process of merging the pictures into fewer pictures for efficiently encoding and transmission of a plurality of pictures.

The sub-picture processor 1307 may generate a plurality of sub-pictures by dividing the packed picture into regions in order to efficiently encode/transmit the packed picture.

The data encoder 1308 may encode the picture data based on the composition information, viewpoint/viewing position/viewing orientation/metadata, and the like.

The encapsulator (encapsulation processor) 1309 may encapsulate the viewpoint/viewing position/viewing orientation/metadata and the encoded data. It may selectively encapsulate the encoded data based on the viewpoint/viewing position/viewing orientation/metadata.

The file extractor 1310 may extract the encapsulated data in the form of a file.

The transmission processor 1311 may perform necessary processing before final transmission. Setting for efficient transmission may be additionally performed.

The transmitter 1312 may finally transmit the data to the reception device. The data may be transmitted in the form of a file/segment/bitstream.

Specifically, when the input data is a camera output image, the transmission terminal (the 360 video transmission device) may perform stitching for construction of a sphere image for each viewpoint/viewing position/component. Once the sphere image is constructed for each viewpoint/viewing position/component, projection into a 2D image may be performed for coding. Depending on the application, packing for generating an integrated image from a plurality of images or sub-picture generation for dividing the image into images of sub-regions may be performed. As described above, the region-wise packing process is optional and thus may not be performed. In this case, the packing processor may be omitted. When the input data is additional information of image/audio/text, a method for displaying the additional information by adding the additional information to the central image may be indicated, and the added data may also be transmitted. A bitstream may be generated by compressing the generated image and the added data in an encoding process and may be transformed into a file format for transmission or storage through an encapsulation process. Then, a process of extracting a file required by the receiver according to the request of the application or the system may be performed. The generated bitstream may be transformed into a transmission format through a transmission processor and then transmitted. In this case, the feedback processor at the transmitting side may process the viewpoint/viewing position/viewing orientation information and necessary metadata based on the information transmitted from the reception terminal, and transmit the same to the related transmitter.

Figure 14:
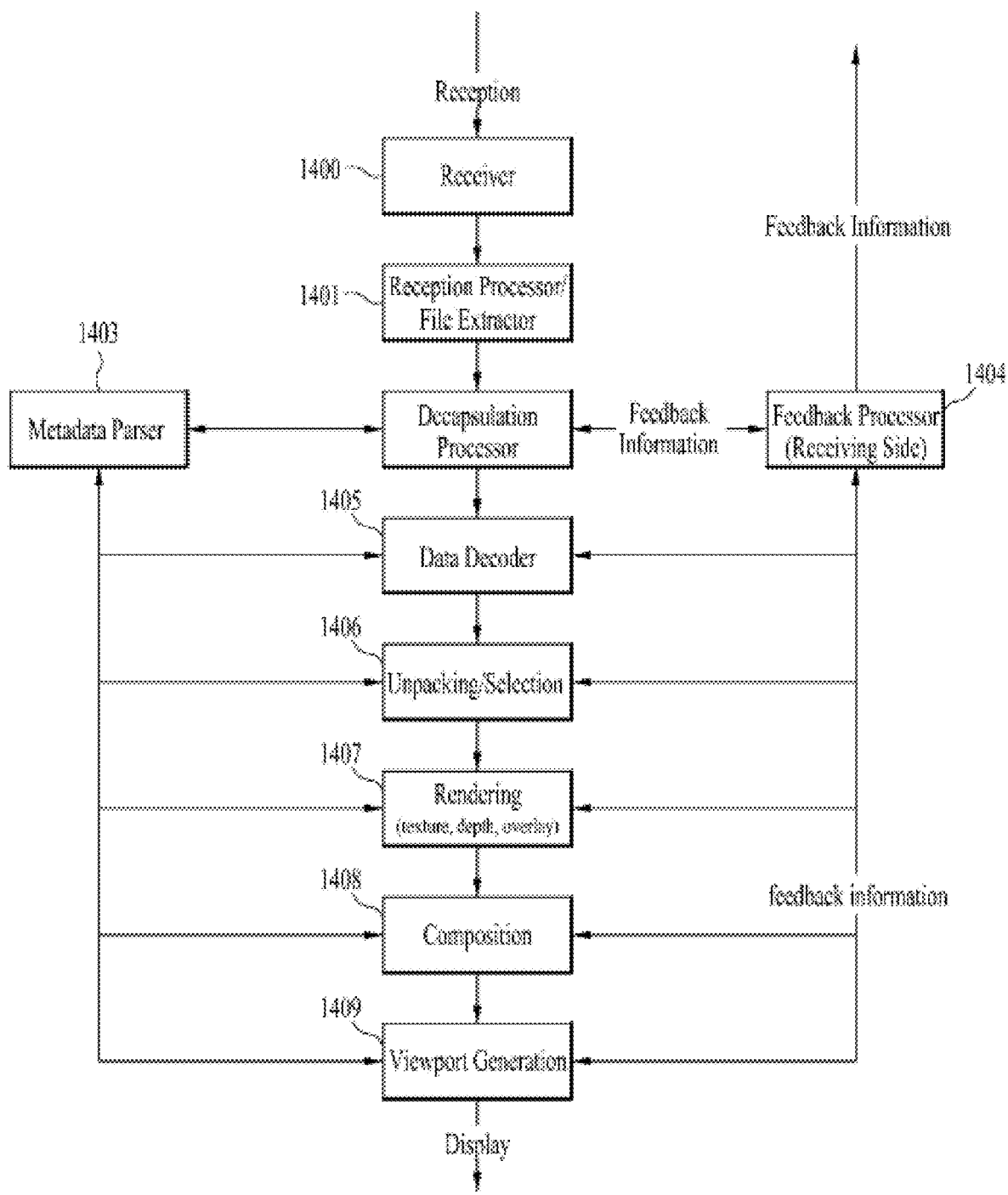
FIG. 14 illustrates the configuration of a 3DoF+ reception terminal.

FIG. 14 illustrates the configuration of a 3DoF+ reception terminal.

The configuration of the reception device/method (sink) of FIG. 11 described above may be represented as shown in the figure. Each component may correspond to hardware, software, a processor, and/or a combination thereof. For details of the operation of the reception device of FIG. 14, reference may be made to the description of FIG. 11. The components/component devices may be selectively combined and implemented according to embodiments. Each operation of the reception device may follow the reverse process of the operations of the transmission device.

The receiver 1400 may receive data transmitted by the transmitter in the form of a file/segment/bitstream.

The reception controller/file extractor 1401 may perform processing related to the reception process and extract (acquire) the received file.

The decapsulator 1402 may decapsulate the file/segment.

The metadata parser 1403 may parse (acquire) metadata from the received bitstream and file/segment. Then, the parser 1403 may transmit the metadata to each component device of the reception device.

The feedback controller (feedback processor) 1404 may acquire information (feedback information) about the orientation/viewport/viewing position/viewpoint, and the like from the user, and deliver the same to each component of the reception device and/or each component of the transmission device. Based on the feedback information, the transmission/reception device may encode/decode an image desired by the user and provide the same.

The data decoder 1405 may decode the decapsulated image data. The decoding process may be processed based on the metadata, feedback information, and the like acquired from the metadata parser.

The unpacker/selector 1406 may unpack the packed picture included in the decoded image data and select specific picture(s) from among the unpacked pictures. The operation of the unpacker/selector may be optional according to the type of image and the policy of the transmission/reception device. The unpacking/selecting process may be performed based on the metadata acquired from the metadata parser, the feedback information, and the like.

The renderer 1407 may render image data such as video/image/audio/text including a texture, a depth, and an overlay. The rendering process may be processed based on the metadata acquired from the metadata parser, the feedback information, and the like.

The composer 1408 may set the configuration of the rendered image data before displaying the image data. The composition process may be processed based on the metadata acquired from the metadata parser, the feedback information (particularly, information on the configuration of image data), and the like.

The viewport generator 1409 may generate a viewport to be displayed before displaying the image data. This operation is intended to provide the user with an image that matches the user's viewport.

The displayer 1410 may display the image based on the viewport information.

Specifically, upon receiving a bitstream transmitted from the transmission terminal, the reception terminal (the 360 video reception device) may extract a necessary file. A video stream in the generated file format may be selected based on the viewpoint/viewing position/viewing orientation information and the video metadata transmitted from the feedback processor. The selected bitstream may be reconstructed into image information through a decoder. In the case of a packed image, unpacking may be performed based on the packing information transmitted by the metadata. When the packing process is omitted at the transmitting side, unpacking at the receiving side may also be omitted. In addition, when necessary, a process of selecting an image suitable for the viewpoint/viewing position/viewing orientation transmitted from the feedback processor and a necessary component may be performed. A rendering process of reconstructing the image texture, depth, and overlay information into a format suitable for reproduction may be performed. Before generating final images, a composition process of integrating information from different layers may be performed, and an image suitable for a display viewport may be generated and reproduced.

Figure 15:
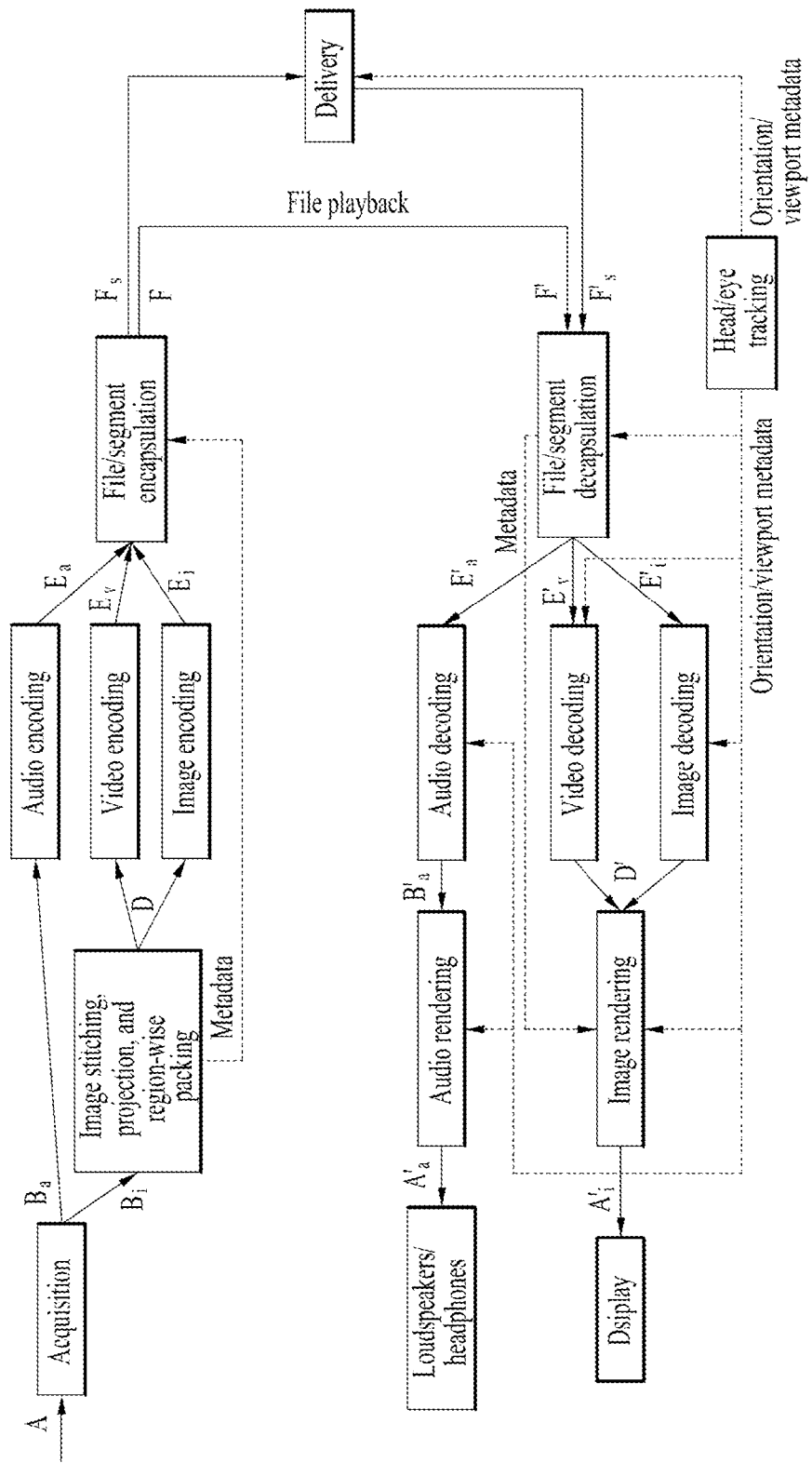
FIG. 15 shows an OMAF structure.

FIG. 15 shows an OMAF structure.

The configuration of the transmission/reception device/process in FIG. 15 is a summary of the architecture of the device/process in FIGS. 2, 3, 11, 13 and 14. Each component device of FIG. 15 may be and interpreted based on the descriptions of FIGS. 2, 3, 11, 13 and 14.

The 360 video based VR system may provide visual/auditory experiences for different viewing orientations with respect to a position of a user for 360-degree video based on the 360-degree video processing process. A service for providing visual/auditory experiences for different orientations at a fixed position of a user for 360-degree video may be referred to as a 3DoF based service. A service for providing extended visual/auditory experiences for different orientations in a random viewpoint and viewing position in the same time zone may be referred to as a 6DoF (six degree of freedom) based service.

A file format for 3DoF service has a structure in which a position for rendering, information of a file to be transmitted, and decoding information may be varied depending on the head/eye tracking module as shown in FIG. 15. However, this structure is not suitable for transmission of a media file of 6DoF in which rendering information/transmission details and decoding information are varied depending on the position of the user, and therefore needs to be modified.

A video transmission method according to embodiments may include pre-processing video data, encoding the video data, and/or transmitting a bitstream containing the video data.

A video reception method according to embodiments may include receiving video data, decoding the video data, and/or rendering the video data.

For the pre-processing, transmission, reception, decoding, and rendering operations according to the embodiments, refer to the detailed descriptions of the components in FIGS. 2, 3, 11, 13 to 15, and 18 to 20.

According to embodiments of the present disclosure, a video transmission method may include: pre-processing video data; encoding the pre-processed video data; and transmitting the encoded video data.

According to embodiments of the present disclosure, a video reception device may include: a receiver configured to receive video data; a decoder configured to decode the video data; and a renderer configured to render the video data.

Figure 16:
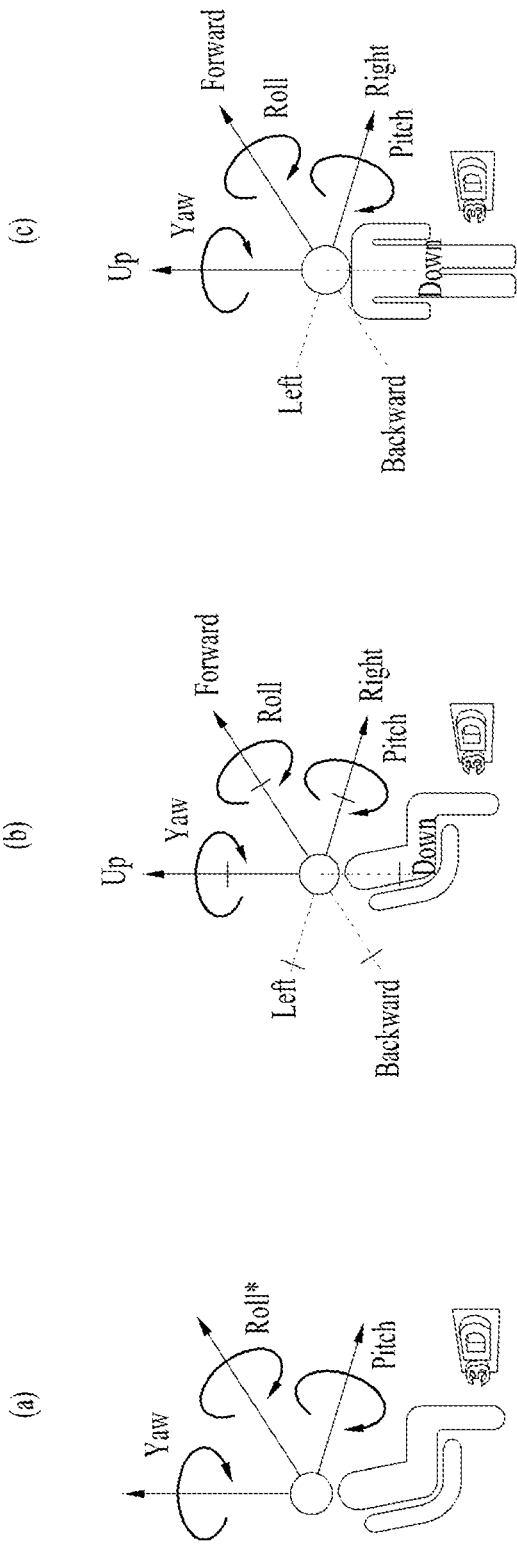
FIG. 16 shows a type of media according to movement of a user.

FIG. 16 shows a type of media according to movement of a user.

The present disclosure provides a method for providing 6DoF content to provide a user with experiences of immersive media/realistic media. The immersive media/realistic media is a concept extended from a virtual environment. The conventional 360 content provides only the concept of rotation with the position of the user fixed as shown in (a). On the other hand, the immersive media/realistic media may represent an environment or content capable of providing a user with more sensory experiences such as movement/ rotation of the user in a virtual space by providing another concept of movement for the user experiencing the content, as shown in (b) or (c).

(a) illustrates a media experience obtained when a view of a user is rotated with the position of the user fixed.

(b) illustrates a media experience obtained when the user's head is additionally allowed to move with the position of the user fixed.

(c) illustrates a media experience obtained when the position of the user is allowed to move.

Realistic media content may include 6DoF video and 6DoF audio for providing the corresponding content, wherein the 6DoF video may represent a video or image captured or reproduced as 3DoF or 360-degree video newly formed every time a movement needed to provide the realistic media content is made. 6DoF content may represent a video or image displayed in a 3D space. When the position is fixed within the content, the corresponding content may be represented in various types of 3D spaces as in the case of the conventional 360-degree video. For example, the content may be displayed on a spherical surface. If movement within the content is allowed to be freely made, a 3D space may be newly formed around the user on a moving path every time the movement is made and the user may experience content of the corresponding position. For example, when the user experiences an image displayed on a spherical surface at a position where the user views the image for the first time, and actually moves in the 3D space, a new image on the spherical surface may be formed based on the changed position and the user may consume the content. Similarly, 6DoF audio is audio content for providing content to allow the user to experience realistic media, and may represent content for newly forming and consuming spatial audio according to movement to a position where sound is consumed.

The present disclosure provides a method for effectively providing 6DoF video. The 6DoF video may be captured at different positions by two or more cameras. The captured video may be transmitted through a series of processes, and the reception terminal may process and render some of the received data into 360-degree video having an initial position of the user as an origin. When the user moves to another position, the reception terminal may process and render new 360-degree video based on the position to which the user moves, whereby the 6DoF video may be provided to the user.

Hereinafter, a transmission method and a reception method for providing 6DoF video services will be described.

Figure 17:
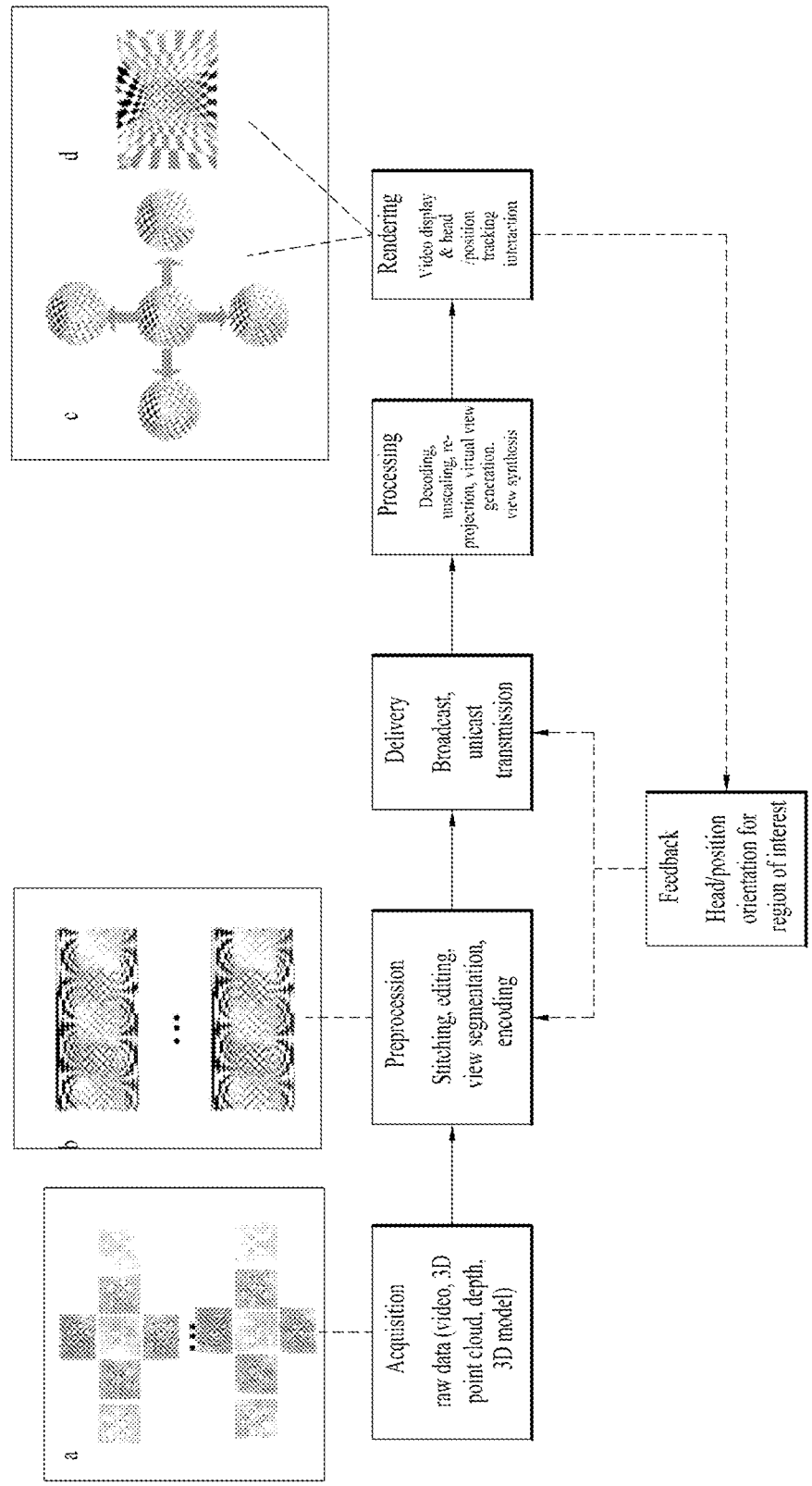
FIG. 17 shows an overall architecture for providing 6DoF video.

FIG. 17 shows an overall architecture for providing 6DoF video.

A series of processes described above will be described in detail based on FIG. 17. First, in an acquisition step, HDCA (High Density Camera Array), Lenslet (microlens) camera, or the like may be used to capture 6DoF content, and 6DoF video may be acquired by a new device designed to capture the 6DoF video. Multiple image/video data sets may generated from the acquired video according to a position of a camera capturing the video as shown in FIG. 3-(a). In the capturing process, metadata such as internal/external setup values of the camera may be generated. For images generated by a computer, not the camera, the capturing process may be omitted. The pre-processing process of the acquired video may be a process of processing the captured image/ video and the metadata delivered through the capturing process. This process may correspond to all types of pre-processing steps for processing the content to be transmitted, such as a stitching process, a color correction process, a projection process, a view segmentation process for segmenting views into a primary view and a secondary view to enhance coding efficiency, and an encoding process.

The stitching process may be a process of creating an image/video by connecting images captured in the directions of 360 degrees at a position of each camera in the form of panorama or sphere based on the position of each camera. Projection represents a process of projecting the image obtained through the stitching process into a 2D image as shown in FIG. 3-(b), and may be described as being mapped to a 2D image. The image mapped at the position of each camera may be segmented into a primary view and a secondary view such that a different resolution may be applied for each view to enhance video coding efficiency. Also, by changing the arrangement or resolution of the mapped image within the primary view, coding efficiency may be enhanced. The secondary view may not exist depending on the capture environment. The secondary view may represent an image/video to be reproduced during a movement of a user from the primary view to another primary view, and may have resolution lower than that of the primary view or may have the same resolution as that of the primary view if necessary. In some cases, the secondary view may be newly generated as virtual information by the receiver.

In some embodiments, the pre-processing process may further include an editing process. In this process, editing of image/video data may be further performed before and after projection, and metadata may be generated even during the pre-processing process. Also, metadata about an initial view that is to be first reproduced in providing the image/video, an initial position, and an ROI of the user may be generated.

The media transmission step may be a process of processing and transmitting the image/video data and the metadata acquired in the pre-processing process. Processing according to a random transmission protocol may be performed for transmission, and the pre-processed data may be delivered over a broadcast network and/or a broadband. The pre-processed data may be delivered to the reception terminal on demand.

The processing process may include all steps performed before image generation for playback of the image/video, including decoding of the received image/video data and metadata, re-projection, which may be called mapping or projection onto a 3D model, and a virtual view generation and synthesis process. The mapped 3D model or projection map may include a sphere, a cube, a cylinder or a pyramid as in the case of the existing 360-degree video, or may be a modified type of the projection map of the existing 360-degree video. In some cases, it may be a projection map of a free type.

The virtual view generation and synthesis process may be a process of generating and synthesizing image/video data to be reproduced when the user moves between the primary view and the secondary view or between primary views. The process of processing the metadata delivered during the capture and pre-processing processes may be required to generate a virtual view. In some cases, only a part of the 360 image/video may be generated/synthesized at the virtual view.

In some embodiments, the processing process may further include an editing process, an up-scaling process, and a down-scaling process. Additional editing required before reproduction may be applied to the editing process after the processing process. The process of up-scaling or down-scaling the received images/videos may be performed, if necessary.

The rendering process may be a process of rendering image/video that is transmitted or generated and re-projected, such that the image/video may be displayed. In a case, the rendering and re-projection processes may be collectively referred to as rendering. Therefore, the rendering process may include the re-projection process. There may be a plurality of re-projection results in the form of a 360 degree video/image centered on the user and a 360 degree video/image formed around the position to the user moves according to the movement direction, as shown in FIG. 3-(c). The user may view a part of the region of the 360 degree video/image according to a display device. In this case, the region viewed by the user may take a form as shown in FIG. 3-(d). When the user moves, not all the 360 degree videos/images may be rendered, but only the image corresponding to the viewing position of the user may be rendered. Also, metadata about the position and the movement direction of the user may be delivered to predict the movement and additionally render a video/image for a position to which the user is to move.

The feedback process may be a process of delivering various kinds of feedback information, which may be acquired in the display process, to the transmitting side. Interactivity between 6DoF content and the user may occur through the feedback process. In some embodiments, the user's head/position orientation and information on a viewport where the user currently views may be delivered in the feedback process. The corresponding information may be delivered to the transmitting side or a service provider during the feedback process. In some embodiments, the feedback process may not be performed.

The user's position information may mean information on the user's head position, angle, movement and moving distance. Information on a viewport where the user views may be calculated based on the corresponding information.

Figure 18:
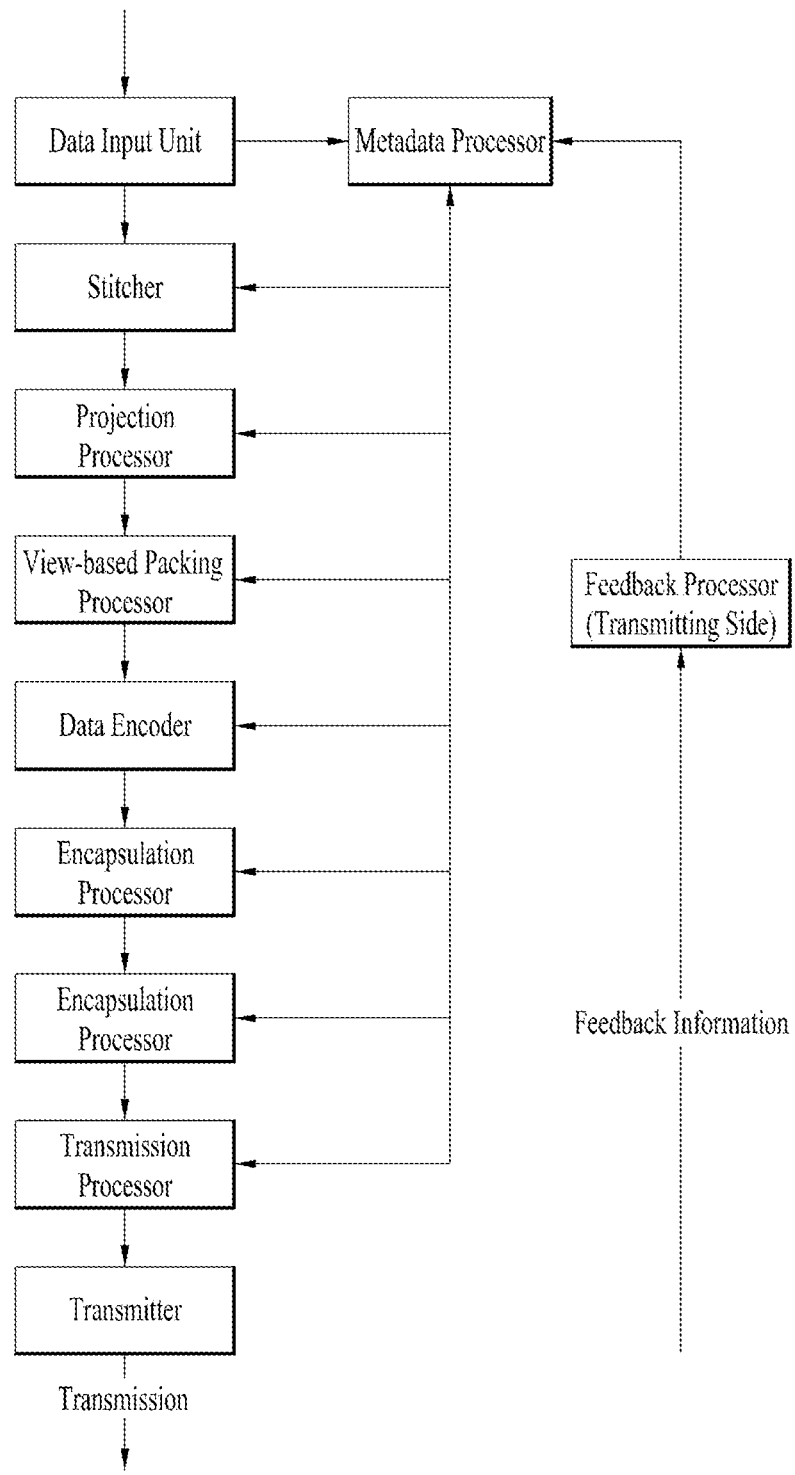
FIG. 18 illustrates the configuration of a transmission device for providing a 6DoF video service.

FIG. 18 illustrates the configuration of a transmission device for providing a 6DoF video service.

The present disclosure may relate to a 6DoF video transmission device at the transmitting side. The 6DoF video transmission device according to the present disclosure may perform the aforementioned preparation processes and operations. The 6DoF video/image transmission device according to the present disclosure may include a data input unit, a depth information processor (not shown), a stitcher, a projection processor, a view segmentation processor, a packing processor per view, a metadata processor, a feedback processor, a data encoder, an encapsulation processor, a transmission-processor, and/or a transmitter as internal/external components.

The data input unit may receive image/video/depth information/audio data per view captured by one or more cameras at one or more positions. The data input unit may receive metadata generated during the capturing process together with the video/image/depth information/audio data. The data input unit may deliver the input video/image data per view to the stitcher and deliver the metadata generated during the capturing process to the metadata processor.

The stitcher may perform stitching for image/video per captured view/position. The stitcher may deliver the stitched 360 degree video data to the processor. The stitcher may perform stitching for the metadata delivered from the metadata processor if necessary. The stitcher may deliver the metadata generated during the stitching process to the metadata processor. The stitcher may vary a video/image stitching position by using a position value delivered from the depth information processor (not shown). The stitcher may deliver the metadata generated during the stitching process to the metadata processor. The delivered metadata may include information as to whether stitching has been performed, a stitching type, IDs of a primary view and a secondary view, and position information on a corresponding view.

The projection processor may perform projection for the stitched 6DoF video data to 2D image frame. The projection processor may obtain different types of results according to a scheme, and the corresponding scheme may similar to the projection scheme of the existing 360 degree video, or a scheme newly proposed for 6DoF may be applied to the corresponding scheme. Also, different schemes may be applied to the respective views. The depth information processor may deliver depth information to the projection processor to vary a mapping resultant value. The projection processor may receive metadata required for projection from the metadata processor and use the metadata for a projection task if necessary, and may deliver the metadata generated during the projection process to the metadata processor. The corresponding metadata may include a type of a scheme, information as to whether projection has been performed, ID of 2D frame after projection for a primary view and a secondary view, and position information per view.

The packing processor per view may segment view into a primary view and a secondary view as described above and perform region wise packing within each view. That is, the packing processor per view may categorize 6DoF video data projected per view/position into a primary view and a secondary view and allow the primary view and the secondary view to have their respective resolutions different from each other so as to enhance coding efficiency, or may vary rotation and rearrangement of the video data of each view and vary resolution per region categorized within each view. The process of categorizing the primary view and the second view may be optional and thus omitted. The process of varying resolution per region and arrangement may selectively be performed. When the packing processor per view is performed, packing may be performed using the information delivered from the metadata processor, and the metadata generated during the packing process may be delivered to the metadata processor. The metadata defined in the packing process per view may be ID of each view for categorizing each view into a primary view and a secondary view, a size applied per region within a view, and a rotation position value per region.

The stitcher, the projection processor and/or the packing processor per view described as above may occur in an ingest server within one or more hardware components or streaming/download services in some embodiments.

The metadata processor may process metadata, which may occur in the capturing process, the stitching process, the projection process, the packing process per view, the encoding process, the encapsulation process and/or the transmission process. The metadata processor may generate new metadata for 6DoF video service by using the metadata delivered from each process. In some embodiments, the metadata processor may generate new metadata in the form of signaling table. The metadata processor may deliver the delivered metadata and the metadata newly generated/processed therein to another components. The metadata processor may deliver the metadata generated or delivered to the data encoder, the encapsulation processor and/or the transmission-processor to finally transmit the metadata to the reception terminal.

The data encoder may encode the 6DoF video data projected on the 2D image frame and/or the view/region-wise packed video data. The video data may be encoded in various formats, and encoded result values per view may be delivered separately if category per view is made.

The encapsulation processor may encapsulate the encoded 6DoF video data and/or the related metadata in the form of a file. The related metadata may be received from the aforementioned metadata processor. The encapsulation processor may encapsulate the corresponding data in a file format of ISOBMFF or OMAF, or may process the corresponding data in the form of a DASH segment, or may process the corresponding data in a new type file format. The metadata may be included in various levels of boxes in the file format, or may be included as data in a separate track, or may separately be encapsulated per view. The metadata required per view and the corresponding video information may be encapsulated together.

The transmission processor may perform additional processing for transmission on the encapsulated video data according to the format. The corresponding processing may be performed using the metadata received from the metadata processor. The transmitter may transmit the data and/or the metadata received from the transmission-processor through a broadcast network and/or a broadband. The transmission-processor may include components required during transmission through the broadcast network and/or the broadband.

The feedback processor (transmitting side) may further include a network interface (not shown). The network interface may receive feedback information from the reception device, which will be described later in the present disclosure, and may deliver the feedback information to the feedback processor (transmitting side). The feedback processor may deliver the information received from the reception terminal to the stitcher, the projection processor, the packing processor per view, the encoder, the encapsulation processor and/or the transmission-processor. The feedback processor may deliver the information to the metadata processor so that the metadata processor may deliver the information to the other components or generate/process new metadata and then deliver the generated/processed metadata to the other components. According to another embodiment, the feedback processor may deliver position/view information received from the network interface to the metadata processor, and the metadata processor may deliver the corresponding position/view information to the projection processor, the packing processor per view, the encapsulation processor and/or the data encoder to transmit only information suitable for current view/position of the user and peripheral information, thereby enhancing coding efficiency.

The components of the aforementioned 6DoF video transmission device may be hardware components implemented by hardware. In some embodiments, the respective components may be modified or omitted or new components may be added thereto, or may be replaced with or incorporated into the other components.

Figure 19:
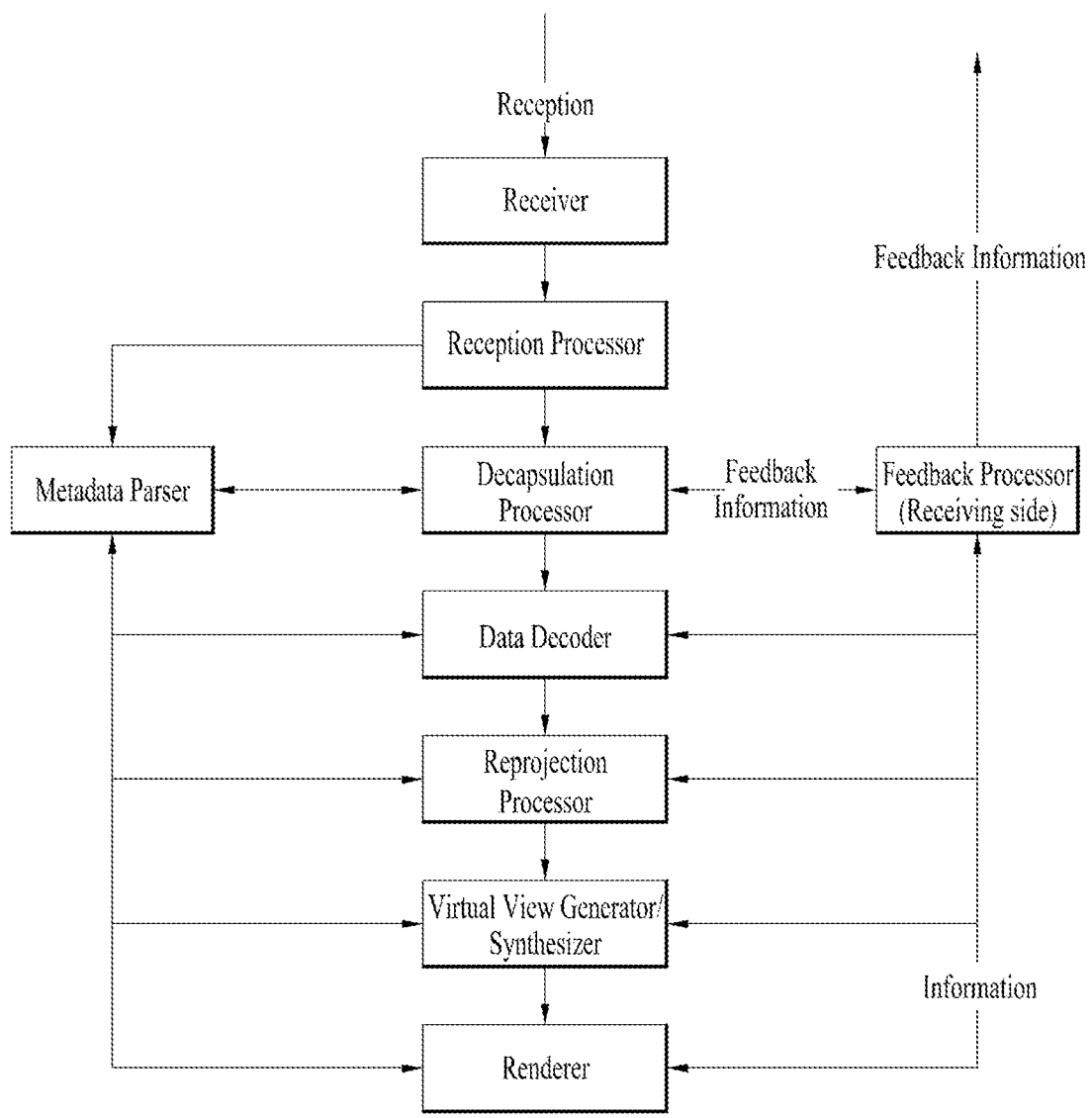
FIG. 19 illustrates the configuration of a 6DoF video reception device.

FIG. 19 illustrates the configuration of a 6DoF video reception device.

The present disclosure may be related to the reception device. According to the present disclosure, the 6DoF video reception device may include a receiver, a reception processor, a decapsulation processor, a metadata parser, a feedback processor, a data decoder, a re-projection processor, a virtual view generator/synthesizer and/or a renderer as components.

The receiver may receive video data from the aforementioned 6DoF transmission device. The receiver may receive the video data through a broadcast network or a broadband according to a channel through which the video data are transmitted.

The reception processor may perform processing according to a transmission protocol for the received 6DoF video data. The reception processor may perform an inverse processing of the process performed in the transmission processor or perform processing according to a protocol processing method to acquire data obtained at a previous step of the transmission processor. The reception processor may deliver the acquired data to the decapsulation-processor, and may deliver metadata information received from the receiver to the metadata parser.

The decapsulation-processor may decapsulate the 6DoF video data received in the form of file from the reception-processor. The decapsulation-processor may decapsulate the files to be matched with the corresponding file format to acquire 6DoF video and/or metadata. The acquired 6DoF video data may be delivered to the data decoder, and the acquired 6DoF metadata may be delivered to the metadata parser. The decapsulation-processor may receive metadata necessary for decapsulation from the metadata parser, when necessary.

The data decoder may decode the 6DoF video data. The data decoder may receive metadata necessary for decoding from the metadata parser. The metadata acquired during the data decoding process may be delivered to the metadata parser and then processed.

The metadata parser may parse/decode the 6DoF video-related metadata. The metadata parser may deliver the acquired metadata to the decapsulation-processor, the data decoder, the re-projection processor, the virtual view generator/synthesizer and/or the renderer.

The re-projection processor may re-project the decoded 6DoF video data. The re-projection processor may re-project the 6DoF video data per view/position in a 3D space. The 3D space may have different forms depending on the 3D models that are used, or may be re-projected on the same type of 3D model through a conversion process. The re-projection processor may receive metadata necessary for re-projection from the metadata parser. The re-projection processor may deliver the metadata defined during the re-projection process to the metadata parser. For example, the re-projection processor may receive 3D model of the 6DoF video data per view/position from the metadata parser. If 3D model of video data is different per view/position and video data of all views are re-projected in the same 3D model, the re-projection processor may deliver the type of the 3D model that is applied, to the metadata parser. In some embodiments, the re-projection processor may re-project only a specific area in the 3D space using the metadata for re-projection, or may re-project one or more specific areas.

The virtual view generator/synthesizer may generate video data, which are not included in the 6DoF video data re-projected by being transmitted and received on the 3D space but need to be reproduced, in a virtual view area by using given data, and may compose video data in a new view/position based on the virtual view. The virtual view generator/synthesizer may use data of the depth information processor (not shown) when generating video data of a new view. The virtual view generator/synthesizer may generate/compose the specific area received from the metadata parser and a portion of a peripheral virtual view area, which is not received. The virtual view generator/synthesizer may selectively be performed, and is performed when there is no video information corresponding to a necessary view and position.

The renderer may render the 6DoF video data delivered from the re-projection unit and the virtual view generator/synthesizer. As described above, all the processes occurring in the re-projection unit or the virtual view generator/synthesizer on the 3D space may be incorporated within the renderer such that the renderer may perform these processes. In some embodiments, the renderer may render only a portion that is being viewed by a user and a portion on a predicted path according to the user's view/position information.

In the present disclosure, the feedback processor (reception terminal) and/or the network interface (not shown) may be included as additional components. The feedback processor of the reception terminal may acquire and process feedback information from the renderer, the virtual view generator/synthesizer, the re-projection processor, the data decoder, the decapsulation unit and/or the VR display. The feedback information may include viewport information, head and position orientation information, gaze information, and gesture information. The network interface may receive the feedback information from the feedback processor, and may transmit the feedback information to the transmitter. The feedback information may be consumed in each component of the reception terminal. For example, the decapsulation processor may receive position/viewpoint information of the user from the feedback processor, and may perform decapsulation, decoding, re-projection and rendering for corresponding position information if there is the corresponding position information in the received 6DoF video. If there is no corresponding position information, the 6DoF video located near the corresponding position may be subjected to decapsulation, decoding, re-projection, virtual view generation/synthesis, and rendering.

The components of the aforementioned 6DoF video reception device may be hardware components implemented by hardware. In some embodiments, the respective components may be modified or omitted or new components may be added thereto, or may be replaced with or incorporated into the other components.

Figure 20:
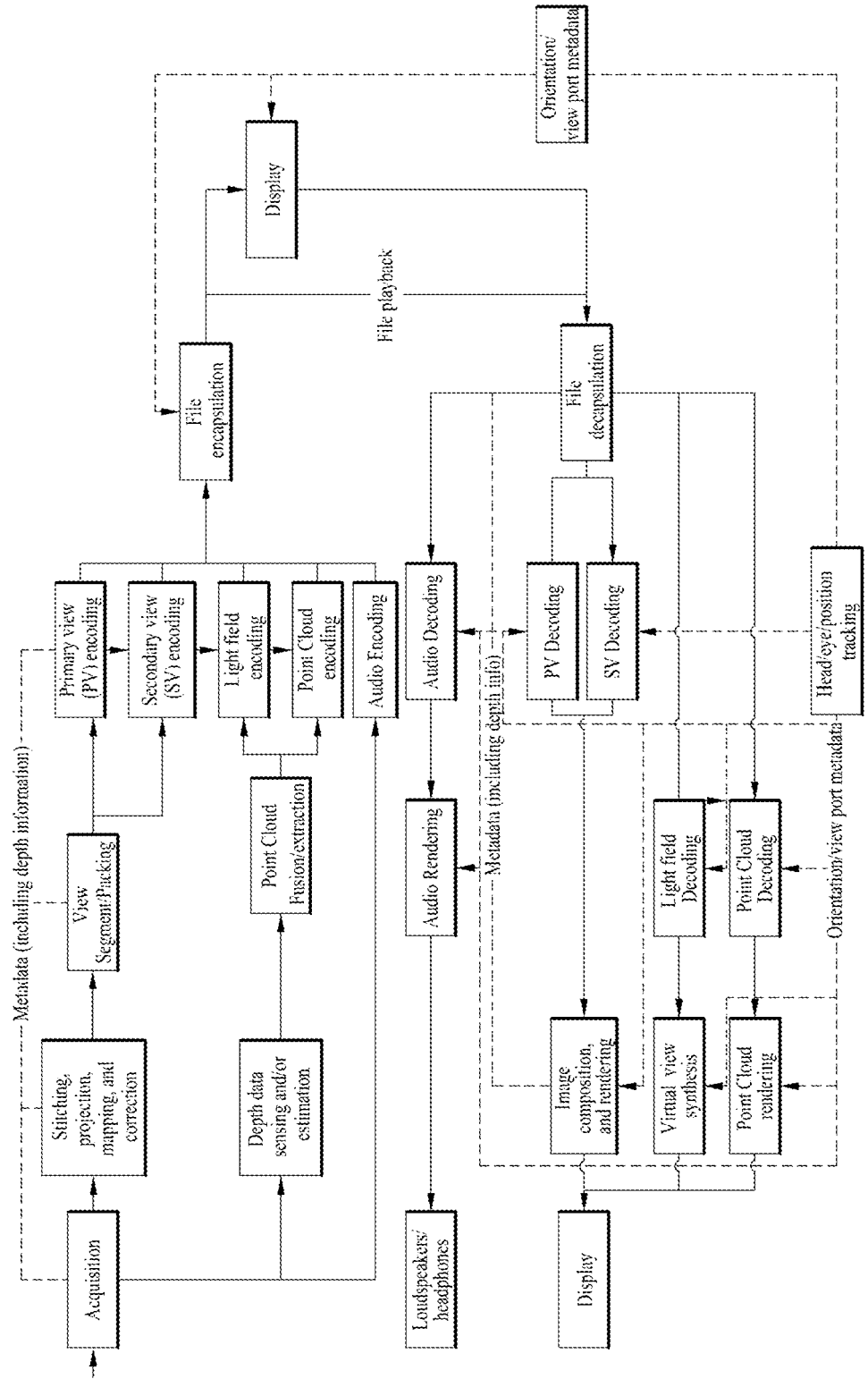
FIG. 20 illustrates the configuration of a 6DoF video transmission/reception device.

FIG. 20 illustrates a configuration of a 6DoF video transmission/reception device.

6DoF contents may be provided in the form of a file or a segment-based download or streaming service such as DASH, or a new file format or streaming/download service method may be used. In this case, 6DoF contents may be called immersive media contents, light field contents, or point cloud contents.

As described above, each process for providing a corresponding file and streaming/download services may be described in detail as follows.

Acquisition: is an output obtained after being captured from a camera for acquiring multi view/stereo/depth image, and two or more videos/images and audio data are obtained, and a depth map in each scene may be acquired if there is a depth camera.

Audio encoding: 6DoF audio data may be subjected to audio pre-processing and encoding. In this process, metadata may be generated, and related metadata may be subjected to encapsulation/encoding for transmission.

Stitching, projection, mapping, and correction: 6DoF video data may be subjected to editing, stitching and projection of the image acquired at various positions as described above. Some of these processes may be performed according to the embodiment, or all of the processes may be omitted and then may be performed by the reception terminal.

View segmentation/packing: As described above, the view segmentation/packing processor may segment images of a primary view (PV), which are required by the reception terminal, based on the stitched image and pack the segmented images and then perform pre-processing for packing the other images as secondary views. Size, resolution, etc. of the primary view and the secondary views may be controlled during the packing process to enhance coding efficiency. Resolution may be varied even within the same view depending on a condition per region, or rotation and rearrangement may be performed depending on the region.

Depth sensing and/or estimation: is intended to perform a process of extracting a depth map from two or more acquired videos if there is no depth camera. If there is a depth camera, a process of storing position information as to a depth of each object included in each image in image acquisition position may be performed.

Point cloud fusion/extraction: a process of modifying a previously acquired depth map to data capable of being encoded may be performed. For example, a pre-processing of allocating a position value of each object of image on 3D by modifying the depth map to a point cloud data type may be performed, and a data type capable of expressing 3D space information not the pointer cloud data type may be applied.

PV encoding/SV encoding/light field/point cloud encoding: each view may previously be packed or depth information and/or position information may be subjected to image encoding or video encoding. The same contents of the same view may be encoded by bitstreams different per region. There may be a media format such as new codec which will be defined in MPEG-I, HEVC-3D and OMAF++.

File encapsulation: The encoded 6DoF video data may be processed in a file format such as ISOBMFF by file-encapsulation which is the encapsulation processor. Alternatively, the encoded 6DoF video data may be processed into segments.

Metadata (including depth information): Like the 6DoF vide data processing, the metadata generated during stitching, projection, view segmentation/packing, encoding, and encapsulation may be delivered to the metadata processor, or the metadata generated by the metadata processor may be delivered to each process. Also, the metadata generated by the transmitting side may be generated as one track or file during the encapsulation process and then delivered to the reception terminal. The reception terminal may receive the metadata stored in a separate file or in a track within the file through a broadcast network or a broadband.

Delivery: file and/or segments may be included in a separate track for transmission based on a new model having DASH or similar function. At this time, MPEG DASH, MMT and/or new standard may be applied for transmission.

File decapsulation: The reception device may perform processing for 6DoF video/audio data reception.

Audio decoding/audio rendering/loudspeakers/headphones: The 6DoF audio data may be provided to a user through a speaker or headphone after being subjected to audio decoding and rendering.

PV/SV/light field/point cloud decoding: The 6DoF video data may be image or video decoded. As a codec applied to decoding, a codec newly proposed for 6DoF in HEVC-3D, OMAF++ and MPEG may be applied. At this time, a primary view PV and a secondary view SV are segmented from each other and thus video or image may be decoded within each view packing, or may be decoded regardless of view segmentation. Also, after light field and point cloud decoding are performed, feedback of head, position and eye tracking is delivered and then image or video of a peripheral view in which a user is located may be segmented and decoded.

Head/eye/position tracking: a user's head, position, gaze, viewport information, etc. may be acquired and processed as described above.

Point cloud rendering: when captured video/image data are re-projected on a 3D space, a 3D spatial position is configured, and a process of generating a 3D space of a virtual view to which a user may move is performed although the virtual view is failed to be obtained from the received video/image data.

Virtual view synthesis: a process of generating and synthesizing video data of a new view is performed using 6DoF video data already acquired near a user's position/view if there is no 6DoF video data in a space in which the user is located, as described above. In some embodiments, the virtual view generation and/or synthesis process may be omitted.

Image composition and rendering: as a process of rendering image based on a user's position, video data decoded according to the user's position and eyes may be used or video and image near the user, which are made by the virtual view generation/synthesis, may be rendered.

Figure 21:
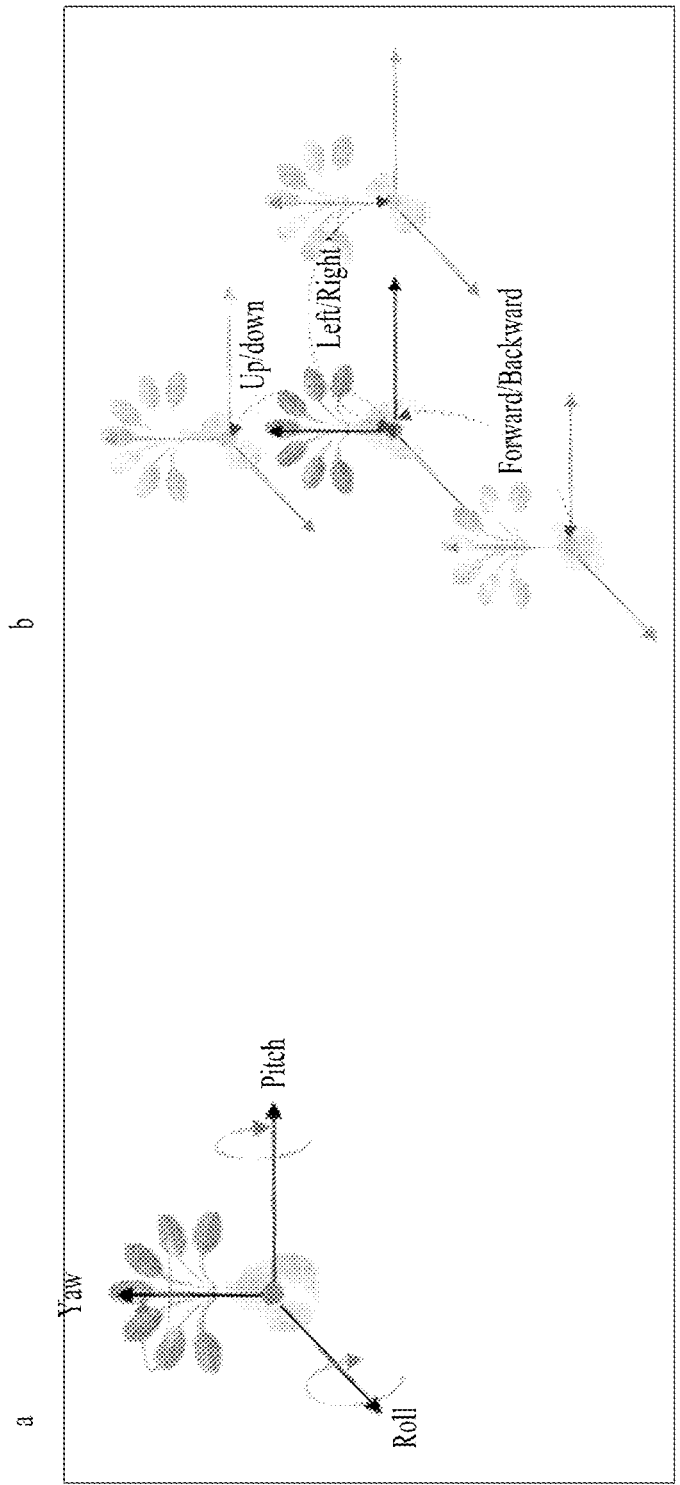
FIG. 21 shows a 6DoF space.

FIG. 21 shows a 6DoF space.

In the present disclosure, a 6DoF space before projection or after re-projection will be described and the concept of FIG. 21 may be used to perform corresponding signaling.

The 6DoF space may categorize an orientation of movement into two types, rational and translation, unlike the case that the 360 degree video or 3DoF space is described by yaw, pitch and roll. Rational movement may be described by yaw, pitch and roll as described in the orientation of the existing 3DoF like 'a', and may be called orientation movement. On the other hand, translation movement may be called position movement as described in 'b'. Movement of a center axis may be described by definition of one axis or more to indicate a moving orientation of the axis among Left/Right orientation, Forward/Backward orientation, and Up/down orientation.

The present disclosure proposes an architecture for 6DoF video service and streaming, and also proposes basic metadata for file storage and signaling for future use in the invention for 6DoF related metadata and signaling extension.

Metadata generated in each process may be extended based on the proposed 6DoF transceiver architecture.

Metadata generated among the processes of the proposed architecture may be proposed.

6DoF video related parameter of contents for providing 6DoF video services by later addition/correction/extension based on the proposed metadata may be stored in a file such as ISOBMFF and signaled.

6DoF video metadata may be stored and signaled through SEI or VUI of 6DoF video stream by later addition/correction/extension based on the proposed metadata.

Region (meaning in region-wise packing): Region may mean a region where 360 video data projected on 2D image is located in a packed frame through region-wise packing. In this case, the region may refer to a region used in region-wise packing depending on the context. As described above, regions may be identified by equally dividing 2D image, or may be identified by being randomly divided according to a projection scheme.

Region (general meaning): Unlike the region in the aforementioned region-wise packing, the terminology, region may be used as a dictionary definition. In this case, the region may mean 'area', 'zone', 'portion', etc. For example, when the region means a region of a face which will be described later, the expression 'one region of a corresponding face' may be used. In this case, the region is different from the region in the aforementioned region-wise packing, and both regions may indicate their respective areas different from each other.

Picture: may mean the entire 2D image in which 360 degree video data are projected. In some embodiments, a projected frame or a packed frame may be the picture.

Sub-picture: A sub-picture may mean a portion of the aforementioned picture. For example, the picture may be segmented into several sub-pictures to perform tiling. At this time, each sub-picture may be a tile. In detail, an operation of reconfiguring tile or MCTS as a picture type compatible with the existing HEVC may be referred to as MCTS extraction. A result of MCTS extraction may be a sub-picture of a picture to which the original tile or MCTS belongs.

Tile: A tile is a sub-concept of a sub-picture, and the sub-picture may be used as a tile for tiling. That is, the sub-picture and the tile in tiling may be the same concept. Specifically, the tile may be a tool enabling parallel decoding or a tool for independent decoding in VR. In VR, a tile may mean a Motion Constrained Tile Set (MCTS) that restricts a range of temporal inter prediction to a current tile internal range. Therefore, the tile herein may be called MCTS.

Spherical region: spherical region or sphere region may mean one region on a spherical surface when 360 degree video data are rendered on a 3D space (for example, spherical surface) at the reception terminal. In this case, the spherical region is regardless of the region in the region-wise packing. That is, the spherical region does not need to mean the same region defined in the region-wise packing. The spherical region is a terminology used to mean a portion on a rendered spherical surface, and in this case, 'region' may mean 'region' as a dictionary definition. According to the context, the spherical region may simply be called region.

Face: Face may be a term referring to each face according to a projection scheme. For example, if cube map projection is used, a front face, a rear face, side face, an upper face, or a lower face may be called face.

A method/device according to the embodiments may be interpreted as a video transmission method/device and/or a video reception method/device according to the embodiments.

In addition, the video transmission method/device according to the embodiments may be interpreted as encoding (encoder), coding (coder), or transmission (transmission apparatus), and vice versa.

Similarly, the video reception method/device according to the embodiments may be interpreted as decoding (decoder) or reception (reception apparatus), and vice versa.

The method/device according to the embodiments may provide the following effects through one operation or a combination between one or more operations according to the embodiments.

Specifically, as interest in 360 video streaming technology for virtual reality increases, opinions on media technologies have been presented. Accordingly, the MPEG-I group, which is a subgroup of the moving picture experts group (MPEG), is standardizing the 3DoF+ technology, which allows users to enjoy the video by freely moving between viewing positions while the user's location is fixed. The embodiments describe a system for 3DoF+360 video image transmission and a technique for selecting a specific block according to a threshold in a process called partitioning among the technical elements of the system. Before the packing process of merging necessary image information into one image on a block-by-block basis, the ratio of image information contained in the corresponding block may be calculated. When it is determined that the information is insufficient, the block may not be transmitted. Thereby, the number of blocks transmitted may be reduced, and bandwidth may be saved in the transmission operation. In addition, according to various parameter options such as block size and threshold setting, 360 images may be flexibly transmitted according to the purpose, which is expected to save bandwidth.

Although research is being actively conducted on virtual reality transmission technology, real-time processing is still difficult due to the requirement to transmit ultra-high-definition images for smooth real-time playback. Accordingly, the method/device according to the embodiments provides an efficient image processing method for smooth transmission of 360 images. Particularly, the embodiments discloses 3DoF+ processing technology, which is a limited immersive media technology by which a user may view a 360 image by moving a viewing position, but is not allowed to move from one location to another. In order to provide 360 images according to the movement of the user's head, multiple high-definition images are required because they must contain image information about multiple viewing positions. Simply transmitting multiple high-definition images makes it impossible to enjoy media smoothly because the bandwidth required is too large. Accordingly, the method/device according to the embodiments may provide technical objects and effects of efficiently processing and transmitting multiple high-definition images with limited resources.

In addition, in order to provide a 3DoF+ multi-viewing position video service, 360 images for each viewing position must be transmitted and received. In this regard, as many encoders and decoders as the number of positions of the respective images are required, places a burden on the transceiver in an actual service scenario. In this regard, the method/device according to the embodiments may reduce the number of encoders and decoders for actual service.

In the present disclosure, data may be interpreted as image data, video data, or the like, and may be interpreted as data for a multi-view image service, 360 video data, or the like. 360 video data may be referred to simply as video data, video, or the like.

In recent years, 360 video streaming technology for immersive media is rapidly developing. However, there are currently limitations in computing power and bandwidth to provide high-quality virtual reality video. To standardize immersive media, the VR video standardization stage may be classified into 3 degrees of freedom (DoF), 3DoF+, and 6DoF according to the user's degree of freedom. In 3DoF+, multiple high-quality VR videos must be transmitted to provide 360 images from individual viewing positions. In particular, the embodiments propose a method/device/system for transmission of 3DoF+360 video images and technical elements thereof. Through a pruning operation of removing redundancy between multi-view videos, the bandwidth required for transmission after encoding each video may be reduced. In addition, through a packing operation, necessary information may be extracted from a video from which redundancy is removed, on a block-by-block basis and merged into on one image. Thereby, required decoders and bandwidth may be reduced, and computing operation may be optimized.

Also, embodiments may be applied to a head-mounted display (HMD), which is an image providing device that may be mounted on various types of heads, and a 360 camera capable of acquiring immersive content. Embodiments provide an immersive experience to the extent that the user does not feel a sense of difference in virtual reality, and provide very high-definition 360 images of ultra high-definition (UHD) or higher and a low motion delay.

Most of the currently commercialized virtual reality technologies support 3DoF, which provides users with limited immersive content. Embodiments deal with a 3DoF+ processing technology that provides limited degrees of freedom to 3DoF by providing an image corresponding to a motion of a user sitting in a chair. In order to provide a virtual image according to the user's head movement, multiple high-quality 360 videos should be transmitted, which requires high computing power and bandwidth. However, it is not easy to meet this requirement with the computing power of virtual reality devices currently on the market. Accordingly, the embodiments provide a method for processing a high-quality image corresponding to multiple views with a limited computing power.

According to embodiments, in order to provide a 3DoF+ multi-view image service, 360 images for each viewing position are transmitted and received. For this operation, as many encoders and decoders as the number of positions of the respective images are required, which may be a burden on the transceiver in an actual service scenario. Embodiments provide a method for reducing the number of encoders and decoders for an actual service.

In addition, embodiments propose a use case of providing an image corresponding to a user's movement in response to a request for a user adaptive virtual reality service. Embodiments for the immersive virtual reality service relate to a technology for receiving images of a scene captured from multiple viewing positions, and synthesizing and providing a virtual image corresponding to the user's viewing positions. Advanced video coding (AVC) or HEVC, which is currently widely used for video transmission, assumes only compression of an individual video, and accordingly may seldom provide a satisfactory video to users due to bandwidth limitations in compressing and transmitting multiple videos at the same time. Embodiments may address this issue. In addition, as the service should synthesize a virtual view by decoding multiple bitstreams at the same time, a large computational processing power is required for the client. To address issue, a model that adds a technology for efficiently compressing multi-view images to an existing codec such as multi-view HEVC (MV-HEVC) has been proposed. However, this model is currently not widely used as it requires a decoder different from the existing decoder and has difficulties in supporting hardware acceleration, while raising issues such as fragmentation of the platform. To address such issues, embodiments may provide a method/device capable of efficiently compressing and transmitting a multi-view image.

Accordingly, MPEG-I has discussed the necessity of a software platform to support 3DoF+, and proposes embodiments corresponding thereto. For example, a technique called pruning for removing redundancy between multiple images and a technique called packing for merging images from which redundancy has been removed into one image are proposed. According to 3DoF+ CfP reflecting the discussion, the software platform to be standardized in MPEG-I employs the HEVC codec to compress 3DoF+ video, and necessary metadata will be standardized in MPEG-I part 7.

The pruning technique according to the embodiments may reduce the bandwidth by removing redundancy between images obtained by cameras that photograph the same scene at different positions and angles. An image used as a reference in removing the redundancy is called a central view, which is placed in the middle to best represent all images. If an image is already present at the position, it may be used. If there is no image or a higher-definition image is needed, it may be synthesized with a reference view synthesizer (RVS), a standard view synthesis tool for 3DoF+. In the present disclosure, the RVS may be referred to as a view synthesizer.

Although the bitrate, which is the size of a file to be transmitted per second, is reduced by pruning, the bitrate wasted due to the empty space produced by removing the redundancy and the decoder corresponding to multiple bitstreams are still a heavy burden on the client. In order to address this issue, the packing technique according to the embodiments includes an operation of collecting only meaningful parts of images obtained by removing redundancy and merging the same into one image or fewer images than the existing images. Packing may reduce the number of decoders, thereby reducing the burden on the client and saving the bandwidth.

Figure 22:
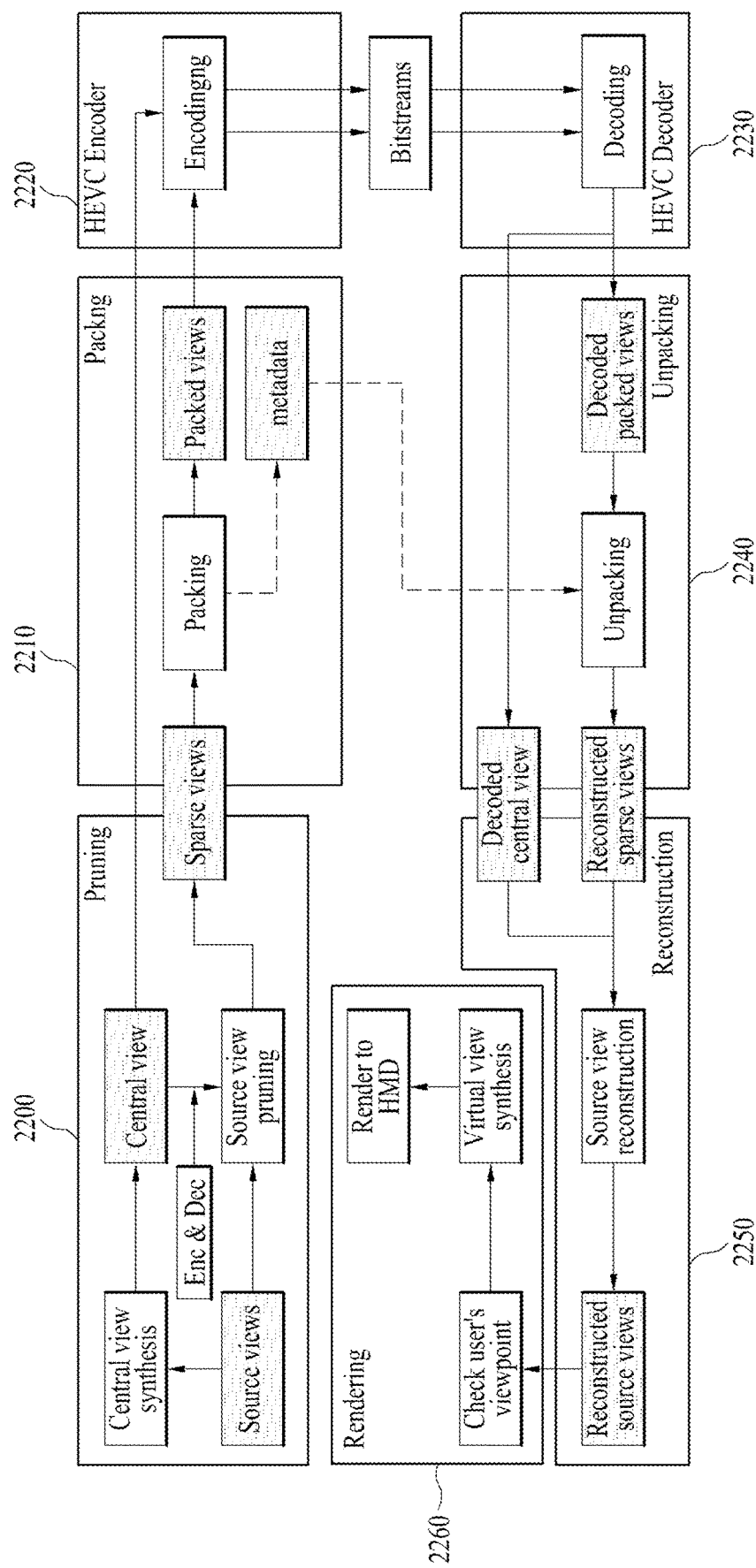
FIG. 22 illustrates an exemplary transmission device and reception device for 3DoF+360 video/image compression according to embodiments.

FIG. 22 illustrates an exemplary transmission device and reception device for 3DoF+360 video/image compression according to embodiments.

The 3DoF+360 video image compression transmission device of the figure may correspond to the video transmission device/method according to the embodiments, and the 3DoF+360 video image compression reception device may correspond to the video reception device/method according to the embodiments. Each component according to the embodiments may correspond to hardware, software, software, and/or a combination thereof, and will be described below.

The video transmission device may include a pruner (pruning), a packer (packing), and/or an encoder, and the video reception device may include a decoder, an unpacker (unpacking), a reconstructor (reconstruction), and/or a renderer (rendering).

The components according to the embodiments described below may provide a 3DoF+ scheme according to the requirements in MPEG-I. Various kinds of software/hardware related to 3DoF+ may be combined together.

Each component/process of FIG. 22 may be included in or additionally extended/connected to the apparatus/process of FIGS. 2, 3, 11, 13, 14, and 18 to 20. With reference to the apparatus/processor of FIGS. 2, 3, 11, 13, 14, and 18 to 20, FIG. 22 more specifically shows a pre-processor (pruner, packer, etc.) before encoding and a post-processor (unpacker, reconstructor, renderer etc.) after decoding. The description of FIG. 22 may be combined with the description of FIGS. 2, 3, 11, 13, 14, and 18 to 20 to complement each other.

The pruner (pruning) 2200 receives multiple high-quality 360 images as input to cover all regions according to the movement of the user's viewing position. Here, the high-quality 360 images may have image information overlapping with each other according to the acquisition location. The process of removing overlapping image information and processing each 360 image to make the image contain only necessary information is called pruning.

For example, a plurality of input 360 images (which may be simply referred to as data, views, or the like) may be expressed as one or more source views. According to embodiments, the source view may be referred to as a first view, a second view, or the like for the purpose of distinction.

The central view synthesizer (center view synthesizer) of the pruner may receive source view(s) and synthesize a central view. The central view according to the embodiments refers to a view when the user's viewport is positioned at the center. Since the central view may contain the most important data or meaningful data, the center view may be synthesized and generated from the source views. The pruner/center view synthesizer receives 360 images acquired at multiple viewpoints, and generates a central view that includes the most common points of all images. The central view is an image including the most common points of all images and may have a central viewpoint. When the central view is included in the input source view, the method/device according to the embodiments may use the received central view. When the central view is not included in the source view, the method/device may generate a central view from the source view.

The central view may be included in a bitstream along with views which are transmitted to the encoder and encoded and packed and metadata, and then transmitted to the reception device.

The source view pruner of the pruner may receive source view(s) and perform pruning between the source views. The pruning process according to the embodiments refers to removing redundant data (redundancy) between the source views. Since the source views may contain similar data based on the viewports of adjacent users, a burden may be placed on the system when the transmission device encodes and transmits all source views and the reception device decodes all the source views. In order to address this technical issue, the method/device (the pruner, the source view pruner of the pruner, etc.) according to the embodiments may prune the source views. The source views may be pruned to create sparse view(s). A sparse view according to the embodiments refers to a view obtained by pruning (removing) redundancy of the source views.

In other words, the central view (which may be referred to by various names such as a center view and a first view) is intended to allow the transmission/reception device to move between multiple viewpoints by warping from the central view to each source view (each 360 image). Here, regions where no warping is performed are regions/images that cannot be represented by the central view. Accordingly, the non-warping region is the region/data that may be presented only from source views. Accordingly, the transmission device/pruner according to the embodiments may provide both the central view and the source views. In order to transmit source views efficiently, all redundant regions/data present in the respective source views are removed (source view pruning) and sparse views having independent information/regions/data between the source views is generated. This operation is pruning.

Also, while pruning the source views, the source views may be pruned based on the center view (central view). This is because, when compared to the center view, a lot of redundancy overlapping with the central view may be present in adjacent source views.

The encoder and decoder of the pruner may encode/decode the center view and provide the to the source view pruner to enable pruning of source views.

The partitioner (partitioning) may be arranged between the pruner 2200 and the packer 2210, or may be included in the packer 2210. The partitioning process may be included in the packing process.

The partitioning is an operation related to packing, which is a process of collecting and merging only image information necessary for encoder-friendly compression of independent 360 images obtained through the pruning process into one image.

Specifically, the process of selecting necessary image information in merging the images into one image (which may be called a view, data, or the like) is partitioning. The partitioning according to the embodiments may calculate necessary image information on a per rectangular block basis, and adjust the result value from the calculation according to a threshold, thereby reducing the size of an image to be finally transmitted and saving bandwidth. The partitioner may check image information included in the sparse view based on the block generated as a result of pruning and reduce the image information according to the threshold. Details of the block-based partitioning according to the embodiments will be described below.

The packer (packing) 2210 aligns image information selected through the partitioning in one image, merges the image information, and encodes and transmits the image. The transmitted image is reconstructed by the client and divided into independent images according to the partitioning criteria. In this case, metadata information for reconstructing the merged images is also transmitted. As a result, 3DoF+ technology may be realized using these images. Also, since necessary image information is merged into one image and transmitted, efficient image transmission may be implemented.

For example, the packer packs sparse views (i.e., views obtained through partitioning) into one picture. As a result, packed views are generated, and metadata containing information needed to reconstruct (unpack) the packed views is also generated. The metadata contains information about the packing process. The metadata may be encoded together with the packed views by the encoder and carried in a bitstream. Alternatively, according to embodiments, the metadata may be transmitted to the reception device through a path separate from the packed views.

The packing by the packer may be performed on source views (sparse views) rather than the center view. The method/device according to the embodiments may encode and transmit the center view, which is an image containing the largest amount of meaningful information, and may pack sparse views, which are obtained by removing redundancy of source views corresponding to views adjacent to the center view, into one image, which may be encoded and transmitted. This is because the center view and the pruned/packed view enable efficient transmission by allowing multiple images to be merged into a minimum number of images. According to embodiments, the center view and the sparse views may be may packed into one image to be transmitted.

The encoder (HEVC encoder) 2220 may encode the packed views and/or the metadata based on the High Efficiency Video Codec (HEVC) scheme. As a result, a bitstream is generated. The encoder or a transmitter connected to the encoder may transmit the bitstream to the reception device.

Hereinafter, each component of the reception device/method according to the embodiments will be described. The reception process according to the embodiments may correspond to a reverse process of the transmission process according to the embodiments.

The decoder (HEVC decoder) 2230 receives a bitstream from the encoder or the transmitter and decodes an image (which may be referred to as packed views, data, or the like) included in the bitstream based on HEVC.

The unpacker 2240 receives the decoded packed views from the decoder and performs unpacking, which is a reverse process of packing. A view packed in one image (which may correspond to a picture) may be divided into a plurality of images (pictures) again.

The reconstructor 2250 may reconstruct the decoded views. The decoded views include a decoded center view and decoded unpacked sparse views. The reconstructor 2250 may perform the reverse process of the pruning 2200. The reconstructor or the source view reconstructor of the reconstructor may reconstruct the source view from the sparse views. As a sparse view is generated and transmitted through pruning to remove redundancy between source views, the receiving side may reconstruct the source views from the sparse views in a reverse process. The process of reconstructing the source view may be performed based on the central view and/or the sparse view(s). The reconstructor delivers the reconstructed source views and/or central view to the renderer 2260.

The renderer 2260 may display/render a 3DoF+360 video image. The renderer 260 may receive the reconstructed source views and/or the central view, and check the user's viewpoint. The renderer may receive the user's viewpoint from the user, or may receive the same from the video transmission/reception system. The renderer may synthesize a virtual view based on the user's viewpoint and the reconstructed source views. For example, the source views may include images for various viewpoints, and the renderer may synthesize a view matching the user's viewpoint from the source views in order to render an image matching the user's viewpoint. For example, when there is no view that the user wants to see, a view corresponding to a virtual viewpoint may be generated from the received view. The renderer may render 360 video image data based on a header mounted display (HMD).

In the present specification, the source view according to embodiments may be referred to as a reference view or the like. That is, the source view/reference view may be interpreted as views for various viewpoints. A view corresponding to the central viewpoint among the source views/reference views may be referred to as a central view or the like.

The overall structure of the 3DoF+360 video image compression transmission device and reception device according to the embodiments has been described. Hereinafter, each component/operation will be described in detail with reference to each figure. Each component/operation may be referred to as a method/device according to embodiments.

In a video transmission method according to the embodiments, the pre-processing operation may include packing one or more source views included in the video data into a packed picture.

A video reception method according to embodiments may include unpacking a packed picture included in decoded video data into one or more source views.

The video data according to the embodiments may be interpreted as the same/similar term as image data and the like in a complementing manner.

A view according to embodiments may be interpreted as the same/similar term as an image, a picture, and the like in a complementing manner.

Further, the pre-processing operation according to the embodiments may include removing redundancy of one or more source views included in the video data, and/or packing the one or more source views into a packed picture.

The packing operation of the video transmission method according to the embodiments may include generating metadata about a region included in the packed picture.

The video transmission/reception method/device according to the embodiments may selectively merge blocks of multiple 3DoF+ high-definition images based on the above-described embodiments, and additionally meet the threshold according to a bandwidth condition, thereby providing flexible and adaptive 3DoF+ services.

Based on the structural diagram of the drawings, in order to further decrease the size of a final merged image to minimize the transmission bandwidth, it is proposed that the method/device according to the embodiments apply a threshold in selecting a block such that a block may not be selected.

In a sparse view image, redundant and meaningless information is represented in gray. When a gray area in the block occupies most of the block, a method/device (e.g. a packer, an encoder, etc.) according to embodiments determines that the block is unnecessary information and excludes the block from selection candidates. Specifically, when a region other than the gray area is less than a threshold (k %), the block is excluded from the selection candidates, and writing of metadata is also excluded. The method/device according to the embodiments may reduce the size of the merged image to be transmitted by selectively merging blocks based on the image information ratio. Accordingly, the transmission bandwidth may be reduced.

The method according to the embodiments may conform to a basic scheme of retrieving all image information without considering the size of the merged image. Further, when the image transmission bandwidth is prioritizes, the method/device according to the embodiments may reduce the size of the image according to the selection.

A basic conceptual diagram of a 3DoF+360 video image compression system according to embodiments is illustrated in FIG. 22. A transmission method/device according to embodiments generates a central view using source views, performs encoding and decoding, and then removes redundancy between the source views and the central view by performing pruning. If the original central view is used, there may be a difference between the results of pruning performed by the server and the client because the client performs pruning based on the encoded central view. As a result, the image quality may deteriorate. In subsequent packing, meaningful parts are extracted from the source views obtained by removing redundancy and merged into a packed view, and related metadata is transmitted to the client. The central view and packed view are encoded by the HEVC encoder and sent to and decoded by the client. In the unpacking operation, the source view without redundancy is reconstructed based on the metadata and the decoded images. Thereafter, the viewing position of the user wearing the HMD is checked and a virtual view image is generated based on the reconstructed source view.

In the video transmission method according to embodiments, the pre-processing may include: packing one or more source views contained in video data into a packed picture.

The method/device according to the embodiments may address the following issues based on the operations according to the configuration of FIG. 22 and the embodiments of other drawings. For example, when video transmission to support the 3DoF+ service is performed using the existing HEVC codec, overlapping parts between images are not removed, and thus more bandwidth than is needed is required, and multiple bitstreams must be decoded at the same time. Accordingly, the amount of computation required for the client increases sharply. Although codecs such as MV-HEVC have been proposed to efficiently compress multi-view images, they operate as a separate decoder and thus are not widely used due to platform fragmentation and hardware support issues. A system for 3DoF+360 image transmission/reception corresponding to the method/device according to the embodiments of the present disclosure requires a method for increasing compression efficiency based on the HEVC codec, which is widely used, and metadata supporting the method. Thus, after removing redundancy between multiple high-definition images for the 3DoF+ service, regions may be merged to use less bandwidth than before and require fewer decoders from clients, enabling flexible and adaptive service for 3DoF+.

Figure 23:
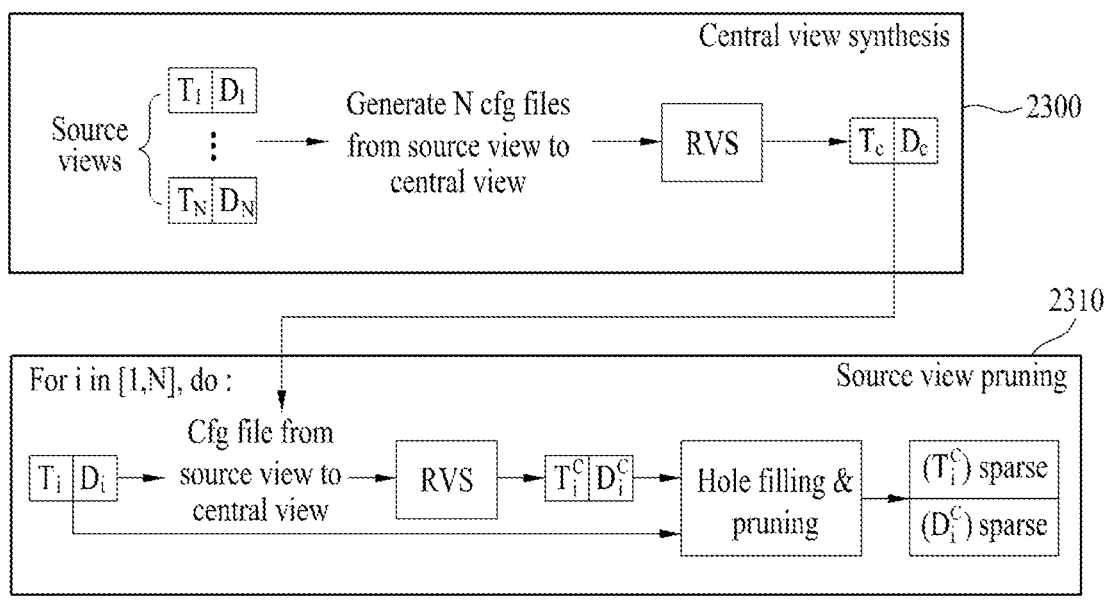
FIG. 23 illustrates an example of multi-viewpoint 360 video pruning according to embodiments.

FIG. 23 illustrates an example of multi-view 360 video pruning according to embodiments.

The figure shows the pruner 2200 according to embodiments in more detail.

A central view synthesizer 2300 may receive one or more source views. When there is a plurality of source views (which may be referred to as first to N-th source views), each source view may include texture (T) and depth (D). The central view synthesizer 2300 may generate N cfg files for the N source views. A configuration file may include metadata related to the operation of generating a central view from a source view. For example, the cfg file may represent a configuration file, and may include metadata (e.g., position, size, width, height, etc.) related to configuration for the central view synthesis.

The RVS, which is a reference view synthesizer, represents an element configured to receive a source view (which has the same meaning as a reference view (RV) and generate a central view from the reference view. In the present disclosure, the RVS corresponds to a view synthesizer (VS) and may be interpreted as a synthesizer configured to synthesize all types of views. The central view synthesizer 2300 may generate a central view. The central view may include texture (T) and/or depth (D) for the central view.

A source view pruner 2310 may apply pruning to each of one or more source views, for example, N source views. For example, reference views may be synthesized based on an I-th source view as a central view among the N source views and/or a cfg file. Hole filling and/or pruning between the reference views may be applied based on the I-th source view and the central view generated by synthesizing the I-th source view. By filling the holes of the reference views and removing an overlapping region of the reference views, a sparse view may be generated. The source view pruner 2310 may generate one or more sparse views by removing the redundant data of the reference views removed based on the central view containing data that may be the most redundant.

Referring to the figure, the source view pruner 2310 performs the following operation on N source views (wherein each of the source view includes a texture/depth). When the texture/depth for the i-th view is input, Tci/Dci are generated based on the parameter (cfg, which is the above-described configuration file). Here, Tci/Dci denotes the texture and depth for the i-th view estimated based on the central view. That is, the sparse view generated for view i is the difference (pruning) between the original Ti/Di and the estimated Tci/Dci, and this operation is performed for each of the N textures/depths.

In other words, the 3DoF+360 video image transmission/reception method/device may include a pruner/reconstructor and a packer/unpacker. Regarding pruning according to the embodiments, the pruner receives a multi-viewpoint 360 image and generates a central view including the most common points of all images. After encoding and decoding the generated central view, the viewpoint is moved from the central view to each source view using warping. Regions that are not well warped are parts that cannot be represented by the central view. The RVS may process these parts by interpolation and inpainting, regarding the same as artifacts. In contrast, the pruner according to the embodiments takes these regions (the parts for which viewpoint movement cannot be represented) from the source view and maps the same to textures, while removing the other regions. The bitrate required varies depending on the pixel value of the removed region, and the RVS may process the removed part in gray, which is the median. Alternatively, the pruner according to the embodiments may determine the average value of the unremoved region as the pixel value of the removed part, thereby saving the bandwidth. This operation is called hole filling. After this process, a pruned source view (which may be referred to as a sparse view) is output as a final result.

The source view pruner according to the embodiments may leave the texture (T) included in a region of the I-th source view to map the texture to a region where it is difficult to represent the viewpoint movement of the central view, prune (remove) the remaining region of the I-th source view, and perform hole filling based on the average of the pixel values used for mapping, thereby generating a sparse view.

The pre-processing of the video transmission method according to the embodiments may include: generating a central view from one or more source views contained in video data; and pruning the one or more source views based on the central view.

Figure 24:
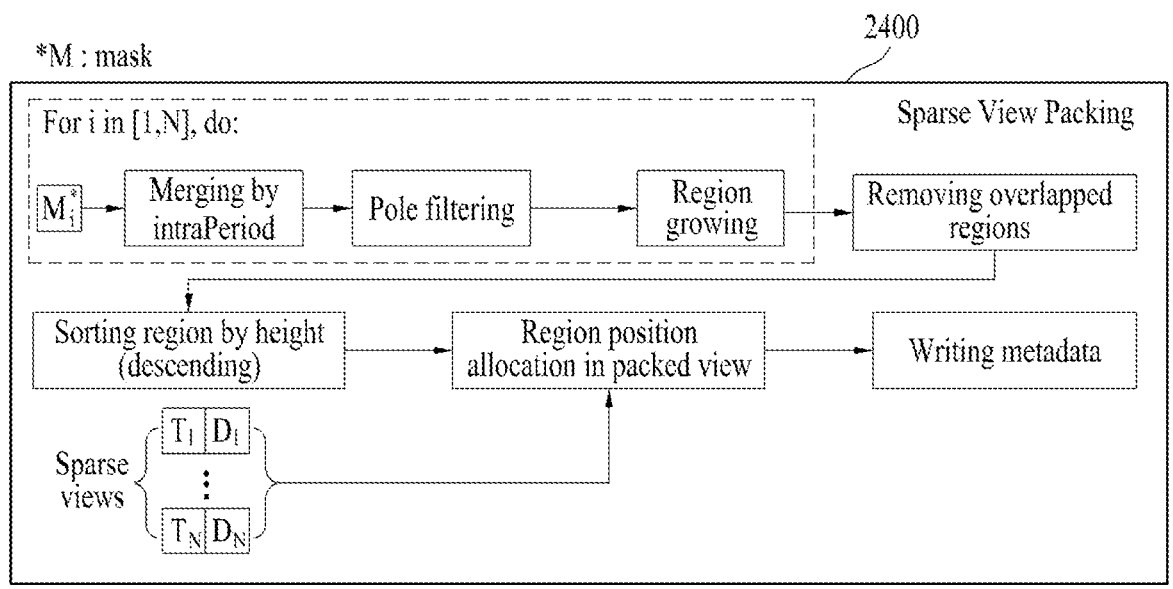
FIG. 24 illustrates an example of multi-viewpoint 360 video packing according to embodiments.

FIG. 24 illustrates an example of multi-viewpoint 360 video packing according to embodiments.

The packer 2210 of FIG. 22 may be specifically represented as the sparse view packer 2400 of FIG. 24. The sparse view packer 2400 may be referred to simply as a packer or the like.

The sparse view packer 2400 may receive one or more sparse views, pack the sparse views, and generate metadata related to the packing process.

As described above, the pruner may generate a pruned source view (or sparse view) by removing the redundancy of the source views (or reference views), and the packer 2210, 2400 may extract only meaningful parts in the process of reconstructing the source view and merge the same into (or generate) a packed view. Furthermore, the packer may create (write) metadata related to the packing (merging).

A part (region) extracted from the sparse view in the packing may have rectangular region units.

The sparse view packer 2400 performs masking on the I-th source view. A mask may refer to a unit forming the basis of examination of a region performed to extract a region of a view. For example, the mask may correspond to a result of determining whether there is valid information for every pixel (or for every unit area). A part having valid information for the entire region of the image for a specific view may be indicated in black (as a dark shaded part), and a part having invalid information (i.e., a part that may be inferred from the central view, and thus does not need to be transmitted separately)) may be indicated in white (as a bright part).

Base on the mask, the sparse view packer may distinguish between a region to which a texture for representation of viewpoint movement of the central view through warping is mapped and other regions in the pruned source view. Also, in order to prevent a decrease in compression efficiency when the position of the same region changes among the frames, masks may be merged every predetermined intra period. The sparse view packer may perform pole filtering on the pruned source view (sparse view) to remove distortion included in the pruned source view.

The sparse view packer may mask the sparse view (region extraction), remove distortion (pole filtering), and variably adjust the size of a region (which may be referred to as a block), which is the unit for dividing the data included in the sparse view. To implement efficient packing, the size of the region may be increased (Region Growing).

The sparse view packer may remove region(s) including redundant data among the regions included in the sparse view. This is because not all overlapping regions need to be encoded and transmitted.

The sparse view packer may sort regions to maximize packing efficiency. The sorting may be performed based on, for example, height. The regions may be sorted in ascending order of height or descending order of height.

The sparse view packer may generate a packed view by aggregating regions. In addition, the sparse view packer may generate information on regions necessary for unpacking, for example, position information about the regions, as metadata, and deliver the same to the reception method/device.

The pre-processing of the video transmission method according to the embodiments may further include packing one or more pruned source views. In the packing operation, a packed view may be generated by mapping the textures included in the one or more pruned source views.

FIG. 25 illustrates an example of a method for removing a region overlapping with region growing according to embodiments.

In packing according to embodiments, a pruned source view may be examined and extracted based on a specific region (or block) in order to generate a packed view. Also, when there is an overlapping region between blocks, the sparse view packer may remove the overlapping region.

Also, since the size of the blocks may be variably changed, there may be an overlapping region between blocks having different sizes.

Referring to the upper part of the figure, a first block R1 and a second block R2 may completely overlap each other. In this case, one block may be included in the other block. In this case, the issue of overlapping may be resolved by using only the block of the larger region (R1 in the figure) for packing.

Referring to the lower part of the figure, when the first block and the second block partially overlap each other, the overlapping region between the first block and the second block may be excluded. Thus, the first block R1 may be entirely packed, and the second block R2 may be packed except the region of the second block overlapping with the first block.

The lower part of the figure also illustrates a process in which the size of a block (which may be referred to as length, width, size, etc.) is variably changed. For example, the size of the block may change from 1×1 to 3×3 to 3×5, and the like. In this case, the metadata may include information about the maximum width and maximum height of the block. For example, when the maximum width (max_region_width) of a block (which may be referred to as a region) is signaled as 5 and the maximum height (max_region_height) of the block is signaled as 3, the size of the block may be variously changed within the maximum range.

The method/device according to the embodiments may use a region growing method to variably change the block size according to the image information. As the block size increases, more encoder-friendly continuous image information may be acquired, but the size of the merged image may increase because the gray area (an area containing a lot of information that is less significant) increases. On the other hand, as the size of the block decreases, the image information may become discontinuous, which is disadvantageous in terms of efficiency in the encoder.

In order to address such issues, the method/device according to the embodiments may variably select a block size according to the image information, check adjacent image information on a block-by-block basis, and merges points other than the gray area into one point, thereby removing overlapping regions and providing blocks of a variable size.

The packing according to the embodiments may reduce encoding/decoding complexity by transmitting only non-overlapping data rather than transmitting all regions including the overlapping region in consideration of continuity between blocks, as shown in the figure.

According to embodiments, regions 1 and 2 may be interpreted as terms referring to some regions included in one sparse view.

The video transmission/reception method/device according to the embodiments may selectively merge blocks of multiple 3DoF+ high-definition images based on the above-described embodiments, and additionally meet the threshold according to a bandwidth condition, thereby providing flexible and adaptive 3DoF+ services. In addition, by processing the overlapping region, the burden on the data/system may be effectively reduced.

Figure 26:
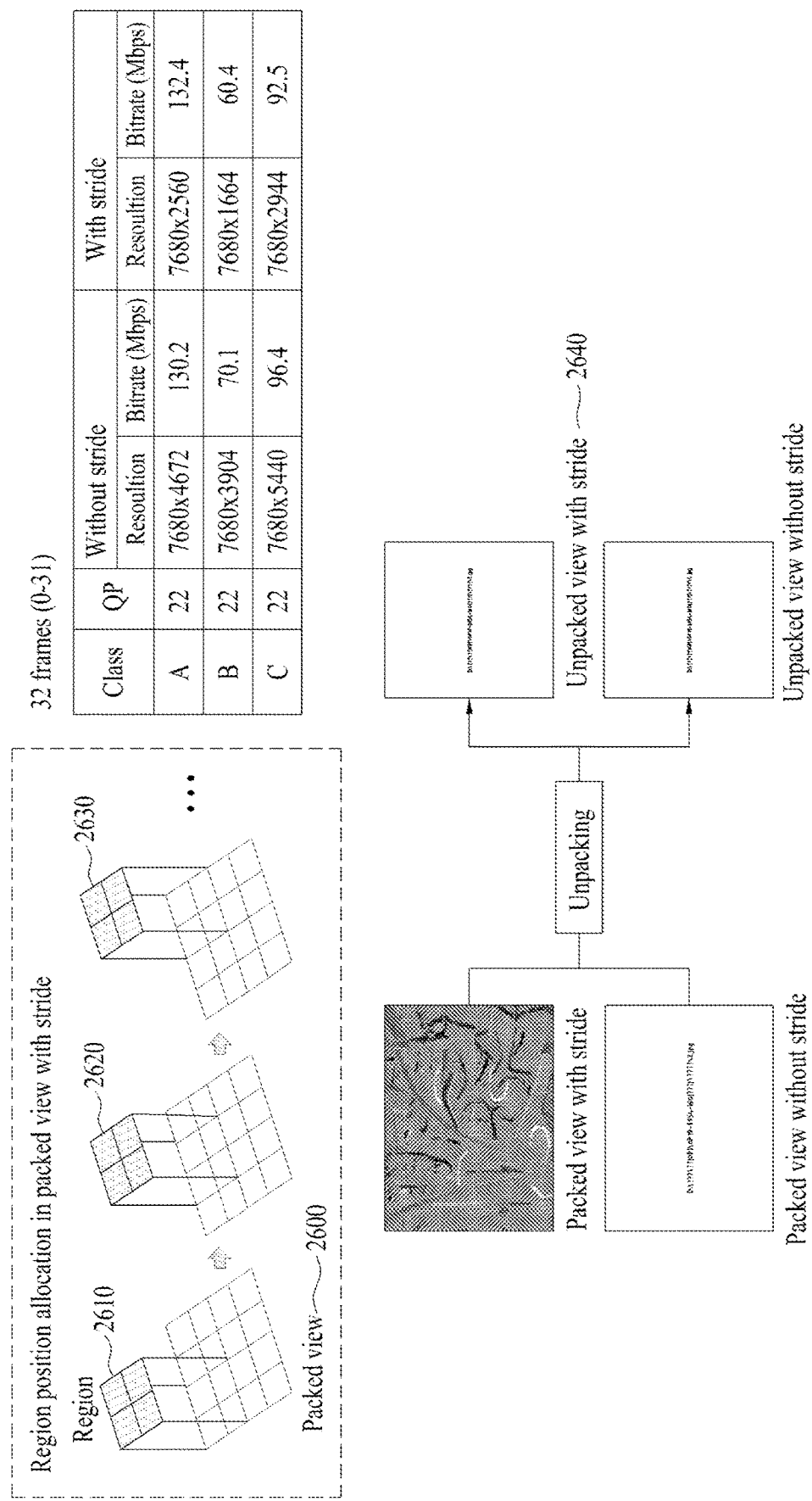
FIG. 26 illustrates an example of a stride technique according to embodiments.

FIG. 26 illustrates an example of a stride technique according to embodiments.

The packers 2210, 2400 according to the embodiments may perform packing based on a stride technique.

When sorting (allocating) regions (or blocks) in a packed view, the packer according to the embodiments may generate a position in the packed view based on the stride technique. Thus, the packer according to the embodiments may generate a packed view with optimized compression performance.

Specifically, in merging the regions extracted from the sparse view into the packed view, the packer may search the position of a view in the packing for each region (which is referred to as a stride).s For example, the search may be performed to determine whether a region can be merged into a first position 2610, a second position 2620, or a third position 2630 within the packed view 2600. By sequentially performing the search within the view, it may be checked whether a position corresponds to a place to which the region can be allocated.

The stride according to the embodiments may maximize spatial efficiency of the packing. Frames 0 to 31 frames, that is, 32 frames may be divided into classes A, B, and C. In this case, referring to the resolutions and bitrates obtained when the stride technique is applied and when the stride technique is not applied according to the quantization parameter (QP), it may be seen that the spatial efficiency is increased when the stride technique is applied.

The stride according to the embodiments may be selectively applied to each packed view according to a region configuration of the packed view.

The reception method/device according to the embodiments may perform stride-based unpacking corresponding to the stride-based packing of the transmission method/device according to the embodiments.

The unpacker 2240 according to the embodiments may receive one or more packed views, wherein the packed views include a view to which the stride is applied and/or a view to which the stride is not applied. The unpacker 2240 may extract the view to which the stride is applied and/or the view to which the stride is not applied from the packed view.

The view 2640 to which the stride is applied may have higher spatial efficiency than the view to which the stride is not applied because regions including the data of the view are sorted.

The packer may concatenate the regions (blocks) by putting one block next to another in order of one parameter, e.g. height. Furthermore, every time a block is concatenated, the packer may search the region and set a skipping unit called a stride. Here, the unit may be variable according to the data configuration of the view, and the search direction may be set to various directions, such as up, down, left, and right within the view. The packer may put a smaller block in an invalid space of another block. Depending on the configuration, the blocks may have similar internal shapes, and thus the stride scheme may not significantly affect the encoding performance as a result, but may dramatically reduce the size of the packed view, thereby allowing one encoder to encode all test sequences.

Based on the region growing technique according to the embodiments, the sparse view packer according to the embodiments may collect the position and/or size of a region in the pruned source view. Region growing is one of image segmentation methods by which pixels around a starting point pixel are searched and the region is grown for similar pixels, and is not grown for dissimilar pixels.

The method/device according to the embodiments may search not only 4 pixels on the top, bottom, left, and right of the region. It may search 8 surrounding pixels simultaneously as shown in FIG. 25, thereby saving time for region growing. This process is repeated to search for texture-mapped parts in all pruned source views on a region-by-region basis. Also, as shown in FIG. 25, there may be an overlapping region between searched regions, and the packer may remove this redundancy, thereby reducing the size of the packed view and saving bandwidth.

The packing of the video transmission method according to the embodiments may include searching for a position in the packed view where the region for the texture is to be inserted. If the region can be inserted at the searched position, the region may be inserted at the position. This search process may be referred to as stride/striding.

A video reception method/device according to embodiments, for example, an unpacker for reception corresponding to packing for the transmission may unpack a packed picture based on the stride technique.

For example, when the reception method/device according to the embodiments receives information about the position of the sparse view as metadata, the sparse view may be reconstructed from the packed view without the stride process. In the case where the information about the position of the sparse view is not given, the unpacker may reconstruct the view based on the stride technique in the reverse process of the operation at the transmitting side.

FIG. 27 illustrates an example of a depth map according to embodiments.

The packer 2220, 2400 according to the embodiments may further increase the gain of the depth map bitrate. For example, a depth map indicating the depth D for the pruned source view may be merged into the packed view like the texture T for the pruned source view. In this case, the bitrate may increase in the process of merging the depth. This is because, in the case of the depth/depth map, blocks (regions) in most views have similar pixel values, and edges may have excessively different pixel values.

Accordingly, in order to optimize the bitrate of the depth map in an encoder-friendly manner, the packer according to the embodiments may flatten the edge. For example, a 3×3 median filter may be applied to the edge. As a result, a gain for the depth map bitrate from 28.8% to 43.2% may be obtained depending on the sequence. The operation of flattening the edge may be referred to as refinement.

FIG. 27 shows an example of comparing a case where refinement is applied with a case where refinement is not applied. When refinement is applied, the values for the edge portion of the depth map may be flattened. Accordingly, the bitrate for each class/quantization value of the frame may be reduced according to the refinement, as shown in the figure.

Figure 28:
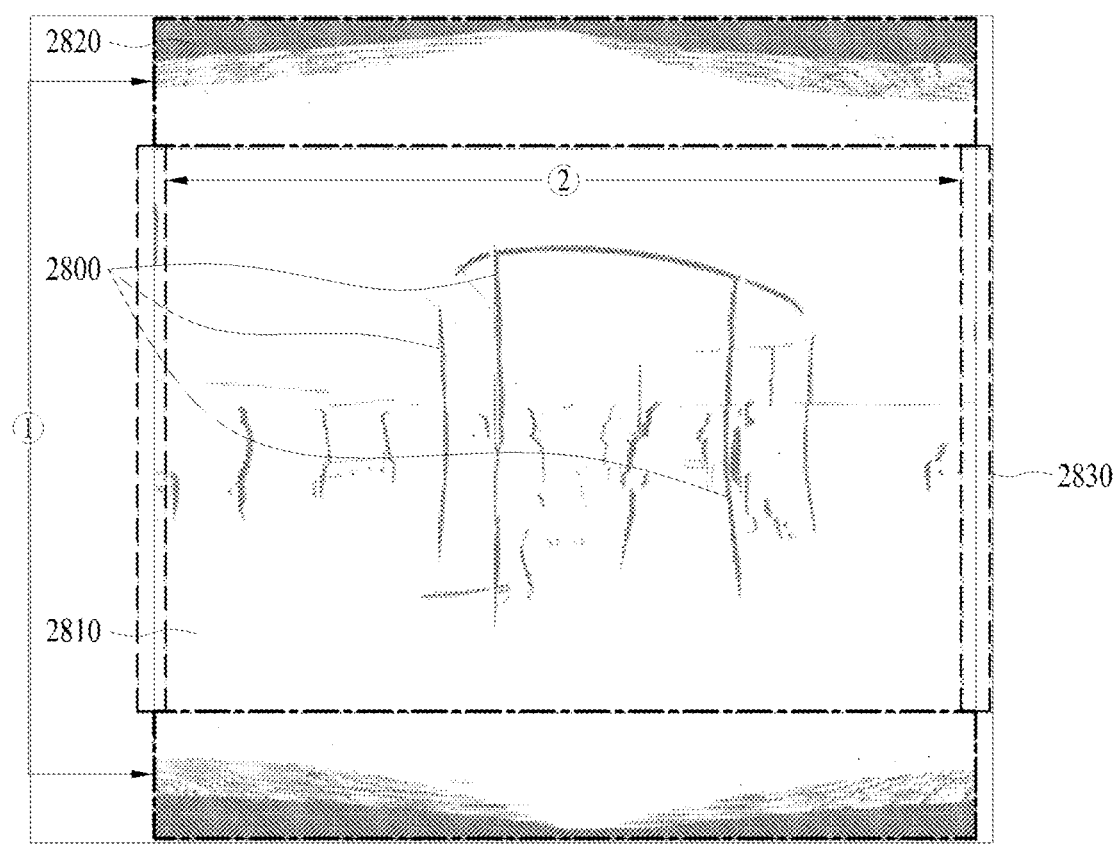
FIG. 28 illustrates an example of pole filtering according to embodiments.

FIG. 28 illustrates an example of pole filtering according to embodiments.

An error (distortion) may occur in a view (image) while the pruner 2200, 2310 prunes the central view and/or sparse views. As described above, the image generated through projection may contain distortion according to an equirectangular projection (ERP) format, which is a projection type. Therefore, due to such distortion, there may be distortion remaining in the uppermost, lowermost, and left and right edge regions of the image even in the pruning process. Although 3DoF+ standard view synthesis tools, such as the reference view synthesizer (RVS), may handle this distortion to some extent, the region containing the distortion has a large influence on the size of the merged image. Accordingly, the method/device, pruner, partitioner, packer, and the like according to the embodiments may additionally perform a filtering operation before merging regions containing distortion. Filtering may exclude (remove) a region containing distortion, and may effectively reduce the data bandwidth of the transmission/reception method/device system by reducing the size of the image. The filtering process according to the embodiments may be referred to as pole filtering. According to embodiments, the filtering may be performed by a filter connected between the pruner, the partitioner, and the packer, or may be performed by the packer.

Region 1 in the figure represents the range of the image of the sparse view. Region 1 contains distortion at the top and bottom. The sparse view of region 1 may be filtered into an image with distortion filtered out as shown in region 2 in the figure by a filtering process. A merging/packing process may be performed based on the images of region 2 formed with distortion removed.

The video transmission/reception method/device according to the embodiments may selectively merge blocks of multiple 3DoF+ high-definition images based on the above-described embodiments, and may additionally adjust the threshold according to a bandwidth condition, thereby providing flexible and adaptive 3DoF+ services. In addition, by removing a distorted, data robust to errors and an encoder/decoder with low complexity may be provided.

In particular, FIG. 28 shows a mask for the pruned source view. In the mask, the parts to which texture is mapped (dark shaded parts 2800 in the figure) are indicated in black, and the other parts (bright parts 2810 in the figure) are indicated in white. The black regions (texture regions) 2800 represent regions that can be presented only in the source view, not in the central view. Region 1 starts from the top and bottom edges, a large part thereof (dark shaded region 2820) is indicated in black. The top and bottom regions have fewer portions hidden by objects, and are included in the central view. Accordingly, except for a few cases, they do not need to be sent redundantly. However, top and bottom regions are included unnecessarily. This is because it is determined that sagging occurs in the top and bottom regions in the equirectangular projection (ERP) and causes an error in warping, and thus the central view cannot present the corresponding portions. Also, referring to region 2 in FIG. 28, there are some black regions (dark shaded parts 2830) on the left and right edges. These parts may not be considered by the RVS (view synthesizer). However, when these regions are not included in the packed view by filtering, the packer according to the embodiments may reduce the size of the packed view, thereby saving bandwidth. This process is called pole filtering.

After pole filtering, the obtained areas are sorted in descending order of height respect to height, and the positions of the regions are allocated to the packed view. As a result, source views are merged into one image. Then, when the client receiving the merged packed view is required to reconstruct the pruned source view. Accordingly, the metadata is written to indicate where each region belonging to the packed view has been positioned in the original pruned source view. Finally, metadata necessary for unpacking and the packed view are encoded and transmitted. Thereby, efficient 3DoF+360 video transmission requiring a smaller bandwidth than the existing method may be implemented.

Figure 29:
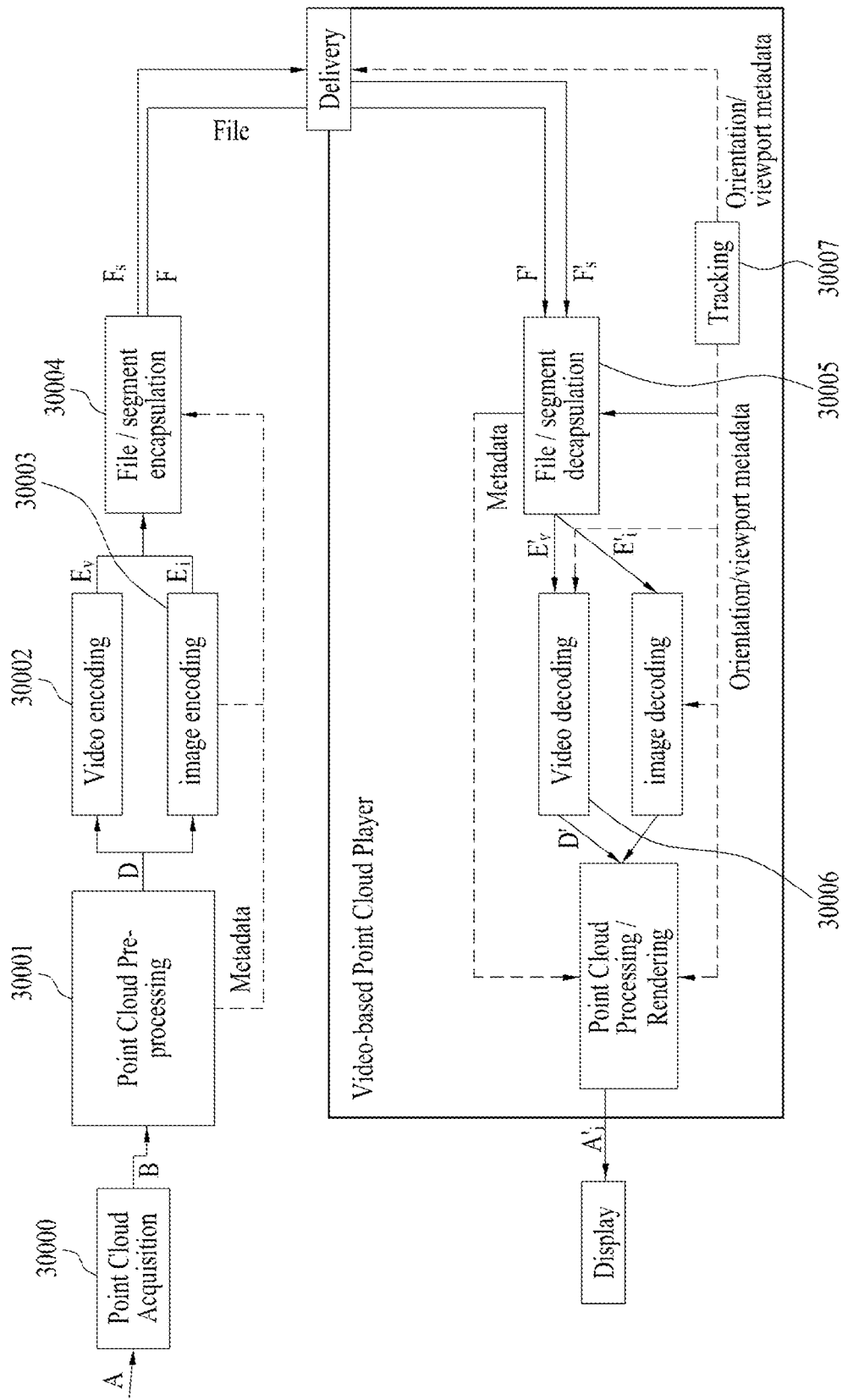
FIG. 29 illustrates an example of an architecture for storing and streaming of V-PCC-based point cloud data in association with a 360 video transmission/reception device according to embodiments.

FIG. 29 illustrates an example of an architecture for storing and streaming of V-PCC-based point cloud data in association with a 360 video transmission/reception device according to embodiments.

The entirety/part of the system in the figure may correspond to the 360 video transmission/reception method/device (which may be referred to as a video transmission/reception method/device) described with reference to FIGS. 2 to 4, 11, 13 to 15, and 18 to 20. Each component in the figure may correspond to software, hardware, a processor, and/or a combination thereof.

Video data according to the embodiments may be processed as shown in the figure in order to provide VR/AR services to users in association with point cloud data.

Point cloud content according to the embodiments may represent data in which objects are represented as points, and may be referred to as a point cloud, point cloud data, point cloud video data, point cloud image data, or the like.

Also, the video data according to the embodiments may be included in a type of point cloud content.

The figure is a diagram showing the entire architecture for storing or streaming point cloud data compressed based on video-based point cloud compression (V-PCC). The process of storing and streaming point cloud data may include an acquisition process, an encoding process, a transmission process, a decoding process, a rendering process, and/or a feedback process.

The embodiments propose a method of effectively providing point cloud media/content/data.

In order to effectively provide point cloud media/content/data, a point cloud acquisition unit 20000 first acquires a point cloud video. For example, point cloud data may be acquired through the process of capturing, synthesizing, or generating a point cloud through one or more cameras. Through this acquisition process, a point cloud video including the 3D position (which may be represented by x, y, and z position values, hereinafter referred to as geometry) of each point and the attributes (color, reflectance, transparency, etc.) of each point may be acquired and, for example, a Polygon File format (PLY) (or the Stanford Triangle format) file including the same may be generated. For point cloud data with multiple frames, one or more files may be acquired. In this process, metadata related to the point cloud (e.g., metadata related to capture, etc.) may be generated.

The captured point cloud video may need to be post-processed to improve the quality of the content. In the video capture process, the maximum/minimum depth value may be adjusted within the range provided by the camera equipment. Even after the adjustment, point data of an unwanted region may be present. Accordingly, post-processing may be performed to remove the unwanted region (e.g., background) or to recognize a connected space and fill the spatial hole. In addition, point clouds extracted from the cameras sharing the spatial coordinate system may be integrated into one piece of content through the process of transformation of the coordinates into the global coordinate system for each point based on the position coordinates of each camera acquired through the calibration process. Thereby, a point cloud video with a high density of points may be acquired.

A point cloud pre-processor (point cloud pre-processing) 30001 may generate one or more pictures/frames of the point cloud video. Here, a picture/frame may generally mean a unit representing one image in a specific time period. When the points constituting the point cloud video are divided into one or more patches (a set of points constituting the point cloud, wherein points belonging to the same patch are adjacent to each other in a 3D space, and are mapped in the same direction among 6-face bounding box planes in the process of mapping to a 2D image) and mapped to a 2D plane, a picture/frame of an occupancy map, which is a binary map indicating whether there is data at the corresponding position in the 2D plane with a value of 0 or 1, may be generated. In addition, a geometry picture/frame, which takes the form of a depth map that presents position information (geometry) about each point constituting a point cloud video on a patch-by-patch basis, may be generated. Also, a texture picture/frame, which represents the color information about each point constituting a point cloud video on a patch-by-patch basis, may be generated. In this process, metadata needed to reconstruct the point cloud from the individual patches may be generated. The metadata may include information about the patches, such as the position and size of each patch in the 2D/3D space. These pictures/frames may be generated continuously in temporal order to construct a video stream or metadata stream.

A point cloud video encoder 30002 may encode one or more video streams related to a point cloud video. One video may include multiple frames, and one frame may correspond to a still image/picture. In the present disclosure, the point cloud video may include a point cloud image/frame/picture, and the term "point cloud video" may be used interchangeably with the point cloud video/frame/picture. The point cloud video encoder may perform a video-based point cloud compression (V-PCC) procedure. The point cloud video encoder may perform a series of procedures such as prediction, transform, quantization, and entropy coding for compression and coding efficiency. The encoded data (encoded video/image information) may be output in the form of a bitstream. Based on the V-PCC procedure, the point cloud video encoder may encode point cloud video by dividing the same into a geometry video, an attribute video, occupancy map video, and metadata, for example, information about patches, as described below. The geometry video may include a geometry image, the attribute video may include an attribute image, and the occupancy map video may include an occupancy map image. The patch data, which is auxiliary information, may include patch related information. The attribute video/image may include a texture video/image.

A point cloud image encoder 30003 may encode one or more images related to a point cloud video. The point cloud image encoder may perform a video-based point cloud compression (V-PCC) procedure. The point cloud image encoder may perform a series of procedures such as prediction, transform, quantization, and entropy coding for compression and coding efficiency. The encoded image may be output in the form of a bitstream. Based on the V-PCC procedure, the point cloud image encoder may encode the point cloud image by dividing the same into a geometry image, an attribute image, an occupancy map image, and metadata, for example, information about patches, as described below.

The point cloud video encoder and/or the point cloud image encoder according to the embodiments may generate a PCC bitstream (G-PCC and/or V-PCC bitstream) according to the embodiments.

According to embodiments, the video encoder 20002, the image encoder 20003, the video decoding 20006, and the image decoding may be implemented by one encoder/decoder as described above, and may be carried out along separate paths as shown in the figure.

In file/segment encapsulation 30004, the encoded point cloud data and/or point cloud-related metadata may be encapsulated into a file or a segment for streaming. Here, the point cloud-related metadata may be received from the metadata processor or the like. The metadata processor may be included in the point cloud video/image encoder or may be configured as a separate component/module. The encapsulation processor may encapsulate the corresponding video/image/metadata in a file format such as ISOBMFF or in the form of a DASH segment or the like. According to an embodiment, the encapsulation processor may include the point cloud metadata in the file format. The point cloud-related metadata may be included, for example, in boxes at various levels on the ISOBMFF file format or as data in a separate track within the file. According to an embodiment, the encapsulation processor may encapsulate the point cloud-related metadata into a file.

The encapsulation or encapsulator according to the embodiments may divide the G-PCC/V-PCC bitstream into one or multiple tracks and store the same in a file, and may also encapsulate signaling information for this operation. In addition, the atlas stream included on the G-PCC/V-PCC bitstream may be stored as a track in the file, and related signaling information may be stored. Furthermore, an SEI message present in the G-PCC/V-PCC bitstream may be stored in a track in the file and related signaling information may be stored.

A transmission processor may perform processing of the encapsulated point cloud data for transmission according to the file format. The transmission processor may be included in the transmitter or may be configured as a separate component/module. The transmission processor may process the point cloud data according to a transmission protocol. The processing for transmission may include processing for delivery over a broadcast network and processing for delivery through a broadband. According to an embodiment, the transmission processor may receive point cloud-related metadata from the metadata processor as well as the point cloud data, and perform processing of the point cloud video data for transmission.

The transmitter may transmit a point cloud bitstream or a file/segment including the bitstream to the receiver of the reception device over a digital storage medium or a network. For transmission, processing according to any transmission protocol may be performed. The data processed for transmission may be delivered over a broadcast network and/or through a broadband. The data may be delivered to the receiving side in an on-demand manner. The digital storage medium may include various storage media such as USB, SD, CD, DVD, Blu-ray, HDD, and SSD. The transmitter may include an element for generating a media file in a predetermined file format, and may include an element for transmission over a broadcast/communication network. The receiver may extract the bitstream and transmit the extracted bitstream to the decoder.

The receiver may receive point cloud data transmitted by the point cloud data transmission device according to the present disclosure. Depending on the transmission channel, the receiver may receive the point cloud data over a broadcast network or through a broadband. Alternatively, the point cloud data may be received through the digital storage medium. The receiver may include a process of decoding the received data and rendering the data according to the viewport of the user.

The reception processor may perform processing on the received point cloud video data according to the transmission protocol. The reception processor may be included in the receiver or may be configured as a separate component/module. The reception processor may reversely perform the process of the transmission processor above described so as to correspond to the processing for transmission performed at the transmitting side. The reception processor may deliver the acquired point cloud video to a decapsulation processor, and the acquired point cloud-related metadata to a metadata parser.

A decapsulation processor (file/segment decapsulation) 30005 may decapsulate the point cloud data received in the form of a file from the reception processor. The decapsulation processor may decapsulate files according to ISOBMFF or the like, and may acquire a point cloud bitstream or point cloud-related metadata (or a separate metadata bitstream). The acquired point cloud bitstream may be delivered to the point cloud decoder, and the acquired point cloud video-related metadata (metadata bitstream) may be delivered to the metadata processor. The point cloud bitstream may include the metadata (metadata bitstream). The metadata processor may be included in the point cloud decoder or may be configured as a separate component/module. The point cloud video-related metadata acquired by the decapsulation processor may take the form of a box or track in the file format. The decapsulation processor may receive metadata necessary for decapsulation from the metadata processor, when necessary. The point cloud-related metadata may be delivered to the point cloud decoder and used in a point cloud decoding procedure, or may be transferred to the renderer and used in a point cloud rendering procedure.

The point cloud video decoder 30006 may receive the bitstream and decode the video/image by performing an operation corresponding to the operation of the point cloud video encoder. In this case, the point cloud video decoder may decode the point cloud video by dividing the same into a geometry video, an attribute video, an occupancy map video, and auxiliary patch information as described below. The geometry video may include a geometry image, the attribute video may include an attribute image, and the occupancy map video may include an occupancy map image. The auxiliary information may include auxiliary patch information. The attribute video/image may include a texture video/image.

The 3D geometry may be reconstructed based on the decoded geometry image, the occupancy map, and auxiliary patch information, and then may be subjected to a smoothing process. The color point cloud image/picture may be reconstructed by assigning a color value to the smoothed 3D geometry based on the texture image. The renderer may render the reconstructed geometry and the color point cloud image/picture. The rendered video/image may be displayed through the display. All or part of the rendered result may be shown to the user through a VR/AR display or a typical display.

A sensor/tracker (sensing/tracking) 30007 acquires orientation information and/or user viewport information from the user or the receiving side and delivers the orientation information and/or the user viewport information to the receiver and/or the transmitter. The orientation information may represent information about the position, angle, movement, etc. of the user's head, or represent information about the position, angle, movement, etc. of a device through which the user is viewing a video/image. Based on this information, information about the area currently viewed by the user in a 3D space, that is, viewport information may be calculated.

The viewport information may be information about an area in a 3D space currently viewed by the user through a device or an HMD. A device such as a display may extract a viewport area based on the orientation information, a vertical or horizontal FOV supported by the device, and the like. The orientation or viewport information may be extracted or calculated at the receiving side. The orientation or viewport information analyzed at the receiving side may be transmitted to the transmitting side on a feedback channel.

Based on the orientation information acquired by the sensor/tracker and/or the viewport information indicating the area currently viewed by the user, the receiver may efficiently extract or decode only media data of a specific area, i.e., the area indicated by the orientation information and/or the viewport information from the file. In addition, based on the orientation information and/or viewport information acquired by the sensor/tracker, the transmitter may efficiently encode only the media data of the specific area, that is, the area indicated by the orientation information and/or the viewport information, or generate and transmit a file therefor.

The renderer may render the decoded point cloud data in a 3D space. The rendered video/image may be displayed through the display. The user may view all or part of the rendered result through a VR/AR display or a typical display.

The feedback process may include transferring various kinds of feedback information that may be acquired in the rendering/displaying process to the transmitting side or the decoder of the receiving side. Through the feedback process, interactivity may be provided in consumption of point cloud data. According to an embodiment, head orientation information, viewport information indicating an area currently viewed by a user, and the like may be delivered to the transmitting side in the feedback process. According to an embodiment, the user may interact with what is implemented in the VR/AR/MR/self-driving environment. In this case, information related to the interaction may be delivered to the transmitting side or a service provider in the feedback process. According to an embodiment, the feedback process may be skipped.

According to an embodiment, the above-described feedback information may not only be transmitted to the transmitting side, but also be consumed at the receiving side. That is, the decapsulation processing, decoding, and rendering processes at the receiving side may be performed based on the above-described feedback information. For example, the point cloud data about the area currently viewed by the user may be preferentially decapsulated, decoded, and rendered based on the orientation information and/or the viewport information.

The video transmission/reception method/device according to the embodiments may encode/decode multiple 3DoF+ high-definition images using the V-PCC technique and provide the same to the user based on the above-described embodiments.

The video transmission/reception method/device according to the embodiments may generate and transmit metadata (signaling information) related to the operations of the above-described embodiments. The reception method/device may process the reception operation of the above-described embodiments based on the metadata. The metadata, which will be described below, may be generated in the encoding process of FIG. 1, the metadata processor of FIG. 2, and the like, and may be provided for a transmission operation based on feedback information received from the reception method/device. In the reception method/device of FIG. 3, the metadata transmitted in a bitstream is parsed (by a metadata parser), and the feedback processor may provide feedback information necessary for processing of 360 video data to each component of the reception device. Metadata generated at the transmitting side and metadata used at the receiving side as shown in FIG. 4 will be described below. The metadata related to FIGS. 5 to 7 may be generated, or metadata may be generated as shown in FIG. 8 and transmitted to the receiving side. More specifically, referring to FIG. 11, when metadata is generated by the source and delivered as a bitstream/file, and the sink may use the received metadata. FIGS. 13 and 14 show component devices which use the metadata/feedback information. FIG. 15 illustrates an operation of generating and encapsulating metadata, delivery, and an operation of providing decapsulated metadata for decoding/post-processing/rendering. The process for the metadata is applied to FIGS. 18 to 20 as well.

Also, as shown in FIG. 22, metadata related to pruning/packing may be generated by the pruner/packer. The metadata may be delivered to the receiving side, and operations of the embodiments may be processed by the unpacker/reconstructor/renderer or the like based on the metadata. Metadata related to the embodiments of FIGS. 23 to 29 may also be generated by the transmission device and used by the reception device.

The metadata according to the embodiments may be referred to as signaling information or the like. In addition, it may be described in the metadata level, SEI message, XML format, or the like.

An example of signaling information according to embodiments is described below.

Packer/unpacker related parameters in the metadata level according to the embodiments are listed below.

PackedViewWidth Width of the packed view
PackedViewHeight Height of the packed view
PrunedViewWidth Width of the pruned view
PrunedViewHeight Height of the pruned view
RegionWidth Width of the region
RegionHeight Height of the region
RegionPackedViewX X coordinate of the region in the packed view
RegionPackedViewY Y coordinate of the region in the packed view
RegionPrunedViewX X coordinate of the region in the pruned view
RegionPrunedViewY Y coordinate of the region in the pruned view
RegionPrunedViewIndex Index of the pruned view to which the region belongs
IntraPeriod Frame unit to merge mask into
StartFrame Start frame
NumberOfFrames Number of frames to be executed The SEI message in the high-level syntax is configured as follows.

The parameters related to the operation of the packer/unpacker according to the embodiments are shown below.

TABLE 1

| | Descriptor |
|---|---|
| packing_op( region_width, region_height, packed_view_width, packed_view_height, packed_view_offset_x, packed_view_offset_y, payload) { if( (packed_view_offset_x + region_width) > packed_view_width) packed_view_offset_x = 0 packed_view_offset_y += region_height .......... else ( (packed_view_offset_x + region_width) <= packed_view_width) packed_view_offset_x += region_width .......... select(payload) | | region_width: Indicates the width of the region in packing.

region_height: Indicates the height of the region in packing.

packed_view_width: Indicates the width of the packed view.

packed_view_height: Indicates the height of the packed view.

packed_view_offset_x: Indicates the X offset of the packed view.

packed_view_offset_y: Indicates the Y offset of the packed view.

payload: Indicates a payload. For detailed information on the payload, refer to the following description.

The syntax of the payload according to the embodiments is configured as shown below.

TABLE 2

| | Descriptor |
|---|---|
| select(payload) { | |
| packed_view_width | u(32) |
| packed_view_height | u(32) |
| pruned_view_width | u(32) |
| pruned_view_height | u(32) |
| region_pruned_view_index | u(32) |
| region_width | u(32) |
| region_height | u(32) |
| region_packed_view_x | u(32) |
| region_packed_view_y | u(32) |
| region_pruned_view_x | u(32) |
| region_pruned_view_y | u(32) |
| intra_period | u(32) |

TABLE 2-continued

| | Descriptor |
|---|---|
| start_frame | u(32) |
| number_of_frames | u(32) |
|   for(i=0; i < ceil((NumberOfFrames − StartFrame) /<br>  IntraPeriod); i++) {<br>    write_metadata<br>  } | | packed_view_width: Indicates the width of the packed view.

packed_view_height: Indicates the height of the packed view.

pruned_view_width: Indicates the width of the pruned view (sparse view).

pruned_view_height: Indicates the height of the pruned view.

region_pruned_view_index: Indicates the index of the region of the pruned view.

region_width: Indicates the width of the region.

region_height: Indicates the height of the region.

region_packed_view_x: Indicates the X value of the region of the packed view.

region_packed_view_y: Indicates the Y value of the region of the packed view.

region_pruned_view_x: Indicates the X value of the region of the pruned view.

region_pruned_view_y: Indicates the Y value of the region of the pruned view.

intra_period: Indicates an intra period. It may be used as a merging period of the mask M.

start_frame: Indicates the start frame.

number_of_frames: Indicates the number of frames.

write_metadata: Indicates metadata related to packing.

Metadata according to embodiments may be signaled in XML format as follows.

<packed_view_region_info>
<packed_view_width="4096" packed_view_height="4096"
pruned_view_width="4096" pruned_view_height="2048"
region_pruned_view_index="0"
region_width="64" region_height="32"
region_packed_view_x="0" region_packed_view_y="0"
region_pruned_view_x="0" region_pruned_view_y="0"
intra_period="32"
start_frame="0" number_of_frames="120">
</packed_view_region_info> packed_view_region_info: Indicates information about the packed view region.

For example, when packed_view_width is equal to 4096 and packed_view_height is equal to 4096, pruned_view_width may be equal to 4096 and pruned_view_height may be equal to 2048. In this case, when the index of the region of the pruned view is 0, region_width is equal to 64 and region_height is equal to 32. The X offset of the region of the packed view may be 0, the Y offset of the region of the packed view may be 0, the X offset of the region of the pruned view may be 0, and the Y offset of the region of the pruned view may be 0. In this case, the intra period may be 32. The start frame may be 0, and the total number of frames may be 120.

Figure 30:
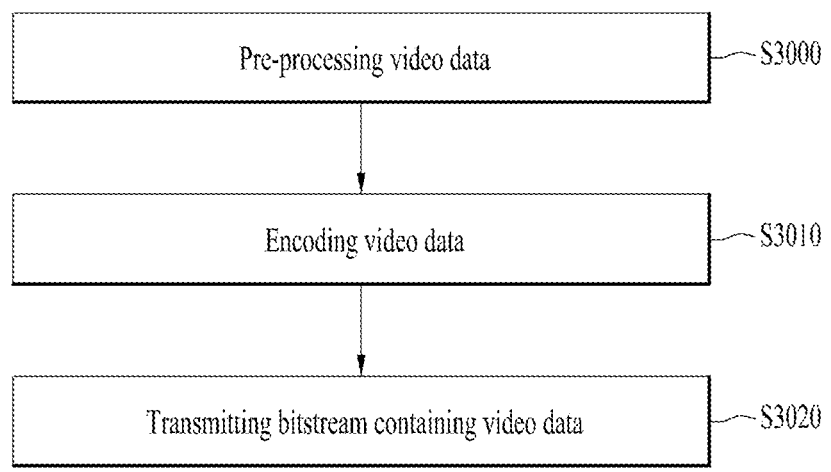
FIG. 30 illustrates an exemplary video data transmission method according to embodiments.

FIG. 30 illustrates an exemplary video data transmission method according to embodiments.

S3000: A method for transmitting video data according to embodiments includes pre-processing video data. For details of the pre-processing operation, reference may be made to the descriptions of the acquisition and preparation in FIG. 1, the input to projection processes in FIG. 2, the acquisition, pre-processing, stitching/projection/mapping/packing, and the like in FIG. 4, the pre-processing in FIG. 10, the video pre-processor 1101 in FIG. 11, the composition information processor 1301, data input unit 1300, viewpoint/viewing position/viewing orientation and metadata processor 1302, stitcher 1304, feedback processor 1303, projection processor 1305, packing processor 1306, and sub-picture processor 1307 in FIG. 13, the image stitching/projection/region-wise packing in FIG. 15, the acquisition/pre-processing in FIG. 17, the data input unit to packing processor in FIG. 18, the acquisition/stitching/projection/mapping/depth data sensing and estimation/view segment and packing/point cloud extraction in FIG. 20, the pruning 2200 and packing 2210 in FIG. 22, the central view synthesis 2300, source view pruning 2310, and sparse view packing 2400 in FIG. 23, the stride in FIG. 26, the depth map refinement in FIG. 27, the pole filtering in FIG. 28, and the point cloud processing 30001 in FIG. 29.

S3010: The method for transmitting video data according to the embodiments further includes encoding the video data. For details of the encoding operation, reference may be made to the descriptions of the encoding in FIG. 1, the data encoder and encapsulator (encapsulation processor) in FIG. 2, the audio/video/image encoder and file/segment encapsulator in FIG. 4, the encoding in FIG. 10, the text encoder 1109, video/image encoder 1111, audio encoder 1110, and file/segment encapsulator 1112 in FIG. 11, the data encoder 1308 in FIG. 13, the audio/video/image encoder and file/segment encapsulator in FIG. 15, the data encoder in FIG. 18, the primary view encoder and secondary view encoder, light field encoder, point cloud encoder, audio encoder, and file encapsulator in FIG. 20, the encoder 2220 in FIG. 22, and the video encoder 30002, image encoder 30003, and the like in FIG. 29.

S3020: The method for transmitting video data according to the embodiments further includes transmitting a bitstream containing the video data. For details of the transmitting operation, reference may be made to the descriptions of the delivery in FIG. 1, the encapsulator, transmission processor, and transmitter in FIG. 2, the delivery in FIG. 4, the delivery in FIG. 10, the file/segment encapsulator and delivery in FIG. 11, the encapsulator 1309, file extractor 1310, transmission processor 1311, and transmitter 1312 in FIG. 13, the file/segment encapsulator and delivery in FIG. 15, the delivery in FIG. 17, the encapsulator, transmission processor, and transmitter in FIG. 18, the file encapsulator and delivery in FIG. 20, the transmission process between the encoder 2220 and the decoder 2230 in FIG. 22, and the delivery in FIG. 29.

Figure 31:
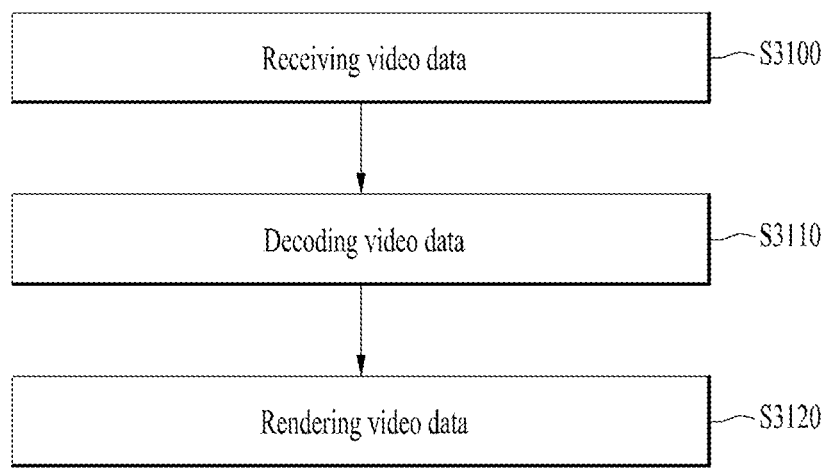
FIG. 31 illustrates an exemplary video data reception method according to embodiments.

FIG. 31 illustrates an exemplary video data reception method according to embodiments.

S3100; A method for receiving video data according to embodiments includes receiving video data. For details of the reception process, reference may be made to the descriptions of the delivery in FIG. 1, the receiver and reception processor, metadata parser, and decapsulator in FIG. 3, the delivery and file/segment decapsulator in FIG. 4, the delivery in FIG. 10, the delivery and file/segment decapsulator in FIG. 11, the receiver 1400, reception processor/file extractor 1401, metadata parser 1403, decapsulator 1402, and feedback processor 1404 in FIG. 14, the delivery and file/segment decapsulator in FIG. 15, the delivery in FIG. 17, the receiver, reception processor, metadata parser, decapsulator, and feedback processor in FIG. 19, the delivery and file decapsulator in FIG. 20, the bitstream reception process in FIG. 22, the process of receiving the pruned/packed data in FIGS. 23 and 24, the delivery and file/segment decapsulator in FIG. 29.

S3110: The method for receiving video data according to the embodiments further includes decoding the video data. For details of the decoding process, reference may be made to the descriptions of the processing (image processing/decoding/upscaling/re-projection) in FIG. 1, the data decoder and re-projector in FIG. 3, the audio/video/image decoder in FIG. 4, the decoding/post-processing (upscaling/selection/re-projection) in FIG. 10, the audio/video/image/text decoding 1114, 1115, 1116 and upscaling/selector 1118 in FIG. 11, the data decoder 1405 and unpacker/selector 1406 in FIG. 14, the audio/video/image decoder in FIG. 15, the data decoder, re-projector, and virtual view generator/synthesizer in FIG. 19, the PV decoder, SV decoder, light field decoder, point cloud decoder, image composition, and virtual view synthesizer in FIG. 20, and the video/image decoder 30006 and point cloud processing in FIG. 29.

S3120: The method for receiving video data according to the embodiments further includes rendering the video data. For details of the rendering process, reference may be made to the descriptions of the rendering in FIG. 1, the renderer in FIG. 2, the audio/video renderer and display in FIG. 3, the renderer/composer in FIG. 10, the composer 1122, viewport generator 1123, and displayer 1124 in FIG. 11, the renderer 1407, composer 1408, and viewport generator 1409 in FIG. 14, the audio/image renderer and displayer in FIG. 15, the renderer in FIG. 17, the renderer in FIG. 19, the image renderer, point cloud renderer, and displayer in FIG. 20, the point cloud processor/renderer and displayer in FIG. 29.

Embodiments have been described in terms of a method and/or device. The description of the method and/or the description of the device may be interpreted in a complementing manner.

Although embodiments have been described with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it also falls within the scope of the appended claims and their equivalents. The apparatuses and methods may not be limited by the configurations and methods of the embodiments described above. The embodiments described above may be configured by being selectively combined with one another entirely or in part to enable various modifications. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the apparatuses of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "/"and"," should be interpreted as indicating "and/or." For instance, the expression "A/B" may mean "A and/or B." Further, "A, B" may mean "A and/or B." Further, "AB/C" may mean "at least one of A, B, and/or C." Also, "A, B, C" may mean "at least one of A, B, and/or C." Further, in the document, the term "or" should be interpreted as "and/or." For instance, the expression "A or B" may mean 1) only A, 2) only B, and/or 3) both A and B. In other words, the term "of" in this document should be interpreted as "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/of" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

MODE FOR DISCLOSURE

As described above, related details have been described in the best mode for carrying out the embodiments.

INDUSTRIAL APPLICABILITY

The present invention is used in VR related fields.

It will be apparent to those skilled in the art that various modifications and variations can be made in the present disclosure without departing from the spirit or scope of the invention. Thus, it is intended that the present disclosure cover the modifications and variations of this invention provided they come within the scope of the appended claims and their equivalents.

The invention claimed is:

1. A method for transmitting a video, comprising:
pre-processing video data, wherein pre-processing the video data comprises:
generating a central view from one or more source views included in the video data, and
pruning the one or more source views based on the central view, and
packing the pruned one or more source views based on a stride scheme,
wherein packing the pruned one or more source views comprises:
searching a position for packing the pruned one or more source views,
generating a packed view by mapping a texture included in the pruned one or more source views, wherein a position of a first region and a position of a second region are searched in the packed view, and
putting the first region next to the second region by allocating the first region in an invalid region in the packed view;
encoding the video data; and
transmitting a bitstream including the video data,
wherein pre-processing the video data includes packing the video data into packed regions,
wherein the packed regions for the video data have position information, and
wherein the position information is generated for packing the video data.

2. The method of claim 1, wherein the bitstream includes metadata related to the video data.

3. A device for transmitting video, comprising:
a pre-processor configured to pre-process video data, wherein the pre-processor is configured to:
generate a central view from one or more source views included in the video data, and
prune the one or more source views based on the central view,
wherein the pre-processor comprises:
a packer configured to pack the pruned one or more source views based on a stride scheme,
wherein the packer is configured to:
search a position for packing the pruned one or more source views, wherein a position of a first region and a position of a second region are searched in the packed view,
generate a packed view by mapping a texture included in the pruned one or more source views, and
put the first region next to the second region by allocating the first region in an invalid region in the packed view;
an encoder configured to encode the video data; and
a transmitter configured to transmit a bitstream including the video data,
wherein the pre-processor is configured to perform packing the video data into packed regions,
wherein the packed regions for the video data have position information, and
wherein the position information is generated for packing the video data.

4. The device of claim 3, wherein the bitstream includes metadata related to the video data.

5. A method for receiving video, comprising:
receiving a bitstream including video data;
decoding the video data; and
post-processing the video data, comprising:
unpacking a packed view in the video data into a sparse view based on a stride scheme,
wherein post-processing the video data further comprises:
reconstructing a source view from the sparse view based on a central view included in the bitstream,
wherein unpacking the packed view comprises:
searching a position of a first region and a position of a second region are searched in the packed view, wherein the first region is next to the second region in an invalid region in the packed view, and
unpacking a stridden packed view in the video data into the sparse view,
wherein the stridden packed view is unpacked into a stridden sparse view,
wherein post-processing the video data includes unpacking the video data into projected regions,
wherein the projected regions for the video data have position information, and
wherein the position information is generated for unpacking the video data.

6. The method of claim 5, wherein the bitstream includes metadata related to the video data.

7. A device for receiving video, comprising:
a receiver configured to receive a bitstream including video data;
a decoder configured to decode the video data; and
a post-processor configured to post-process the video data, the post-processing comprising:
unpacking a packed view in the video data into a sparse view based on a stride scheme,
wherein post-processing the video data further comprises:
reconstructing a source view from the sparse view based on a central view included in the bitstream,
wherein unpacking the packed view comprises:
searching a position of a first region and a position of a second region are searched in the packed view, wherein the first region is next to the second region in an invalid region in the packed view, and
unpacking a stridden packed view in the video data into the sparse view,
wherein the stridden packed view is unpacked into a stridden sparse view,
wherein the post-processor is configured to perform unpacking the video data into projected regions,
wherein the projected regions for the video data have position information, and
wherein the position information is generated for the unpacking the video data.

8. The device of claim 7, wherein the bitstream includes metadata related to the video data.

* * * * *